(12) United States Patent
Ehrenberg et al.

(10) Patent No.: US 8,500,960 B2
(45) Date of Patent: Aug. 6, 2013

(54) MULTI-PHASE SELECTIVE MASS TRANSFER THROUGH A MEMBRANE

(75) Inventors: Scott G. Ehrenberg, Port Richey, FL (US); Brian Johnson, Land O'Lakes, FL (US); Liwei Cao, Odessa, FL (US); Hung Huynh, Port Richey, FL (US); Timothy Tangredi, Odessa, FL (US)

(73) Assignee: Dais Analytic Corporation, Odessa, FL (US)

( * ) Notice: Subject to any disclaimer, the term of this patent is extended or adjusted under 35 U.S.C. 154(b) by 776 days.

(21) Appl. No.: 12/523,470

(22) PCT Filed: Jan. 22, 2008

(86) PCT No.: PCT/US2008/051684
§ 371 (c)(1),
(2), (4) Date: Feb. 22, 2010

(87) PCT Pub. No.: WO2008/089484
PCT Pub. Date: Jul. 24, 2008

(65) Prior Publication Data
US 2010/0170776 A1 Jul. 8, 2010

Related U.S. Application Data

(60) Provisional application No. 60/881,690, filed on Jan. 20, 2007, provisional application No. 60/917,037, filed on May 9, 2007.

(51) Int. Cl.
*B01D 1/28* (2006.01)
*B01D 17/09* (2006.01)
*B01D 3/40* (2006.01)

(52) U.S. Cl.
USPC ........ 202/168; 202/185.1; 210/176; 210/642; 210/774; 203/10

(58) Field of Classification Search
USPC .............. 202/168, 180, 202, 185.1; 210/176, 210/640, 642, 650, 774; 203/10, 22, 25
See application file for complete search history.

(56) References Cited

U.S. PATENT DOCUMENTS

| | | |
|---|---|---|
| 2,283,236 A | 5/1942 | Soday |
| 2,475,886 A | 7/1949 | Goebel |

(Continued)

FOREIGN PATENT DOCUMENTS

| | | |
|---|---|---|
| CN | 1331557 A | 1/2002 |
| DE | 580366 | 7/1933 |

(Continued)

OTHER PUBLICATIONS

International Search Report and Written Opinion dated Jun. 23, 2008 from related International Patent Application No. PCT/US2008/051684, 12 pgs.

(Continued)

*Primary Examiner* — Jason M Greene
(74) *Attorney, Agent, or Firm* — Mueting, Raasch & Gebhardt, P.A.

(57) ABSTRACT

Disclosed herein are embodiments relating to particular systems comprising a selective transfer membrane that can be utilized in material separation. In certain embodiments, the membrane assembly comprises part of a desalination, distillation, liquid purification, and/or heating and cooling system. Other particular embodiments allow for a high rate of thermal capture by way of the system utilizing a selective transfer membrane. Certain preferred embodiments include a selective transfer membrane comprising an ionomeric polymer that is permeable to high dipole materials.

22 Claims, 24 Drawing Sheets

U.S. PATENT DOCUMENTS

| | | | |
|---|---|---|---|
| 2,533,211 | A | 12/1950 | Baer |
| 4,032,440 | A | 6/1977 | Yasuda |
| 4,051,898 | A | 10/1977 | Yoshino et al. |
| 4,248,821 | A | 2/1981 | Van Dellen |
| 4,460,473 | A | 7/1984 | Curtin |
| 5,239,010 | A | 8/1993 | Balas et al. |
| 5,348,691 | A | 9/1994 | McElroy et al. |
| 5,468,574 | A | 11/1995 | Ehrenberg et al. |
| 5,679,482 | A | 10/1997 | Ehrenberg et al. |
| 5,840,387 | A | 11/1998 | Berlowitz-Tarrant et al. |
| 6,110,616 | A | 8/2000 | Sheikh-Ali et al. |
| 6,306,419 | B1 | 10/2001 | Vachon et al. |
| 6,383,391 | B1 | 5/2002 | Ehrenberg et al. |
| 6,413,294 | B1 | 7/2002 | Spencer |
| 6,413,298 | B1 | 7/2002 | Wnek et al. |
| 6,584,801 | B2 | 7/2003 | Erickson |
| 6,679,991 | B1 | 1/2004 | Van Andel |
| 6,699,941 | B1 | 3/2004 | Handlin et al. |
| 6,716,355 | B1 * | 4/2004 | Hanemaaijer et al. ........ 210/640 |
| 6,841,601 | B2 | 1/2005 | Serpico et al. |
| 6,998,053 | B2 | 2/2006 | Awerbuch |
| 7,001,950 | B2 | 2/2006 | Handlin, Jr. et al. |
| 7,067,589 | B2 | 6/2006 | Bening et al. |
| 7,169,848 | B2 | 1/2007 | Bening et al. |
| 7,169,850 | B2 | 1/2007 | Handlin, Jr. et al. |
| 7,179,860 | B2 | 2/2007 | Cao et al. |
| 7,186,779 | B2 | 3/2007 | Joly et al. |
| 2003/0106680 | A1 | 6/2003 | Serpico et al. |
| 2003/0118887 | A1 | 6/2003 | Serpico et al. |
| 2004/0142910 | A1 | 7/2004 | Vachon et al. |
| 2004/0242810 | A1 | 12/2004 | Bell et al. |
| 2005/0154144 | A1 | 7/2005 | Atwood et al. |
| 2005/0178720 | A1 | 8/2005 | Pluester et al. |
| 2005/0215728 | A1 | 9/2005 | Cao et al. |
| 2005/0217303 | A1 | 10/2005 | Gillan et al. |
| 2006/0292208 | A1 | 12/2006 | Vachon |
| 2007/0004830 | A1 | 1/2007 | Flood et al. |
| 2007/0020473 | A1 | 1/2007 | Umana et al. |
| 2007/0021569 | A1 | 1/2007 | Willis et al. |
| 2007/0026251 | A1 | 2/2007 | Umana |
| 2007/0037927 | A1 | 2/2007 | Yang |
| 2007/0055015 | A1 | 3/2007 | Flood et al. |
| 2008/0316678 | A1 | 12/2008 | Ehrenberg et al. |
| 2010/0031817 | A1 | 2/2010 | Ehrenberg et al. |
| 2010/0261799 | A1 | 10/2010 | Vachon et al. |
| 2012/0178834 | A1 * | 7/2012 | Linder et al. .................... 521/27 |

FOREIGN PATENT DOCUMENTS

| | | |
|---|---|---|
| WO | WO 99/61397 A2 | 12/1999 |
| WO | WO 2005/030812 | 4/2005 |
| WO | WO 2006/017245 | 2/2006 |
| WO | WO 2008/089484 A1 | 7/2008 |
| WO | WO 2008/141179 A1 | 11/2008 |

OTHER PUBLICATIONS

Gilbert, Everett, "The Reactions of Sulfur Trioxide, and of its Adducts, with Organic Compounds," *Chemical Review*, Dec. 1962; 62(6): 549-589.

Jenkins et al., "Glossary of Basic Terms in Polymer Science," *International Union of Pure Applied Chemistry*, 1996; 68(12);2287-2311.

Odian, G.; "Principles of Polymerization"; $3^{rd}$ Edition; 1991; 16 pgs. Table of Contents and pp. 352-353.

Ring et al., "Source-Based Nomenclature for Copolymers," *International Union of Pure Applied Chemistry*, 1985;57(10):1427-1440.

Samms et al., "Thermal Stability of Proton Conducting Acid Doped Polybenzimidazole in Simulated Fuel Cell Environments," *J Electrochem Soc.*, Apr. 1996;143(4):1225-1232.

Wainright et al., "Acid-Doped Polybenzimidazoles: A New Polymer Electrolyte," *J Electrochem Soc.*, Jul. 1995;142(7):L121-L123.

Wang et al., "Real-Time Mass Spectrometric Study of the Methanol Crossover in a Direct Methanol Fuel Cell," *J Electrochem Soc.*, Apr. 1996; 143(4): 1233-1239.

Weng et al., "Electro-osmotic Drag Coefficient of Water and Methanol in Polymer Electrolytes at Elevated Temperatures," *J Electrochem Soc.*, Apr. 1996; 143(4): 1260-1263.

Zecevic et al., "Kinetics of $O_2$ Reduction on a Pt Electrode Covered with a Thin Film of Solid Polymer Electrolyte," *J Electrochem Soc.*, Sep. 1997; 144(9):2973-2982.

Zhang and Jiang, "Heat and mass transfer in a membrane-based energy recovery ventilator," *J Membrane Sci*, Oct. 1, 1999;163(1):29-38.

Khayet et al., "Porous hydrophobic/hydrophilic composite membranes Application in desalination using direct contact membrane distillation," *Journal of Membrane Science*, 2005; 252:101-113.

Extended European Search Report including Supplementary European Search Report and European Search Opinion for European Application No. 08728059; 10 pgs., 2011.

\* cited by examiner

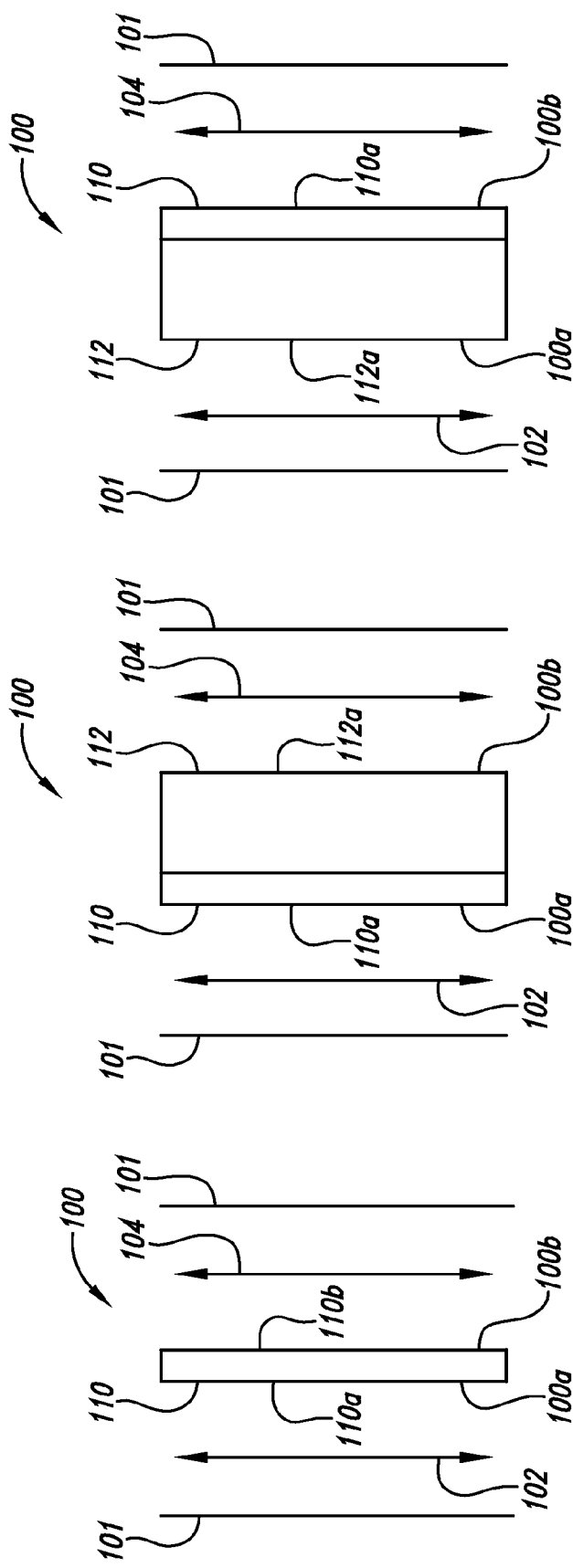

MULTI-PHASE SELECTIVE MASS TRANSFER THROUGH A MEMBRANE

CROSS REFERENCE TO RELATED APPLICATIONS

This application is the §371 U.S. National Stage of International Application No. PCT/US2008/051684, filed 22 Jan. 2008, which claims the benefit of U.S. Provisional Application Ser. No. 60/881,690, filed Jan. 20, 2007, and U.S. Provisional Application Ser. No. 60/917,037, filed May 9, 2007, each of which are incorporated by reference herein in their entireties.

BACKGROUND OF THE INVENTION

1. Field of the Invention

The present invention relates generally to the field of selective mass transfer through a membrane and is useful, inter alia, for heating, ventilation, and air conditioning (HVAC), gas conditioning, desiccation, distillation, desalination, fluid separation, and purification.

2. Description of the Related Art

The acquisition of a desired concentration of a particular dipole (e.g., high-dipole) moment material from a material containing the dipole moment material is a common problem faced in many applications. For example, desalination is the acquisition of a nearly 100% concentration of a high-dipole moment material, namely liquid water, from a material, namely salt water (such as seawater), containing the liquid water. Further, desiccation is the acquisition of a nearly 0% concentration of a high-dipole moment material, namely liquid water, from a material, such as moist air, containing the liquid water.

Similarly, many other applications are concerned with the acquisition of a desired concentration one or more selected materials such as dissolved ions, oxides, and the like from a material containing the one or more selected material. For example, $CO_2$ extraction from flue gas is the acquisition of a nearly 0% concentration of one or more selected materials, namely $CO_2$, from a material, namely flue gas, containing $CO_2$.

A large portion of thermal energy and electrical energy is devoted to the acquisition of desired concentrations of a particular material. Therefore, a need exists for efficient systems and processes for obtaining such concentrations. Even a small improvement in efficiency may aggregate into a large energy savings.

Prior art methods of acquiring potable water from salt water, such as brackish water, seawater, and the like, include distilling the salt water through a hydrophobic porous membrane. These membranes are typically constructed from hydrophobic materials, such as PTFE or polypropylene that have been formed into a single highly porous thin layer containing a high density of very small pores. Membranes constructed in this manner are often referred to as micro-porous membranes.

Micro-porous membranes are typically used when thermally created concentration differences across the membrane allow liquid water on a first side of the membrane to evaporate through the membrane into a colder environment that is in contact or in close proximity with the opposite side of the membrane. Membrane material surrounding the pores at the liquid interface on the first side of the membrane has a low surface energy and will not allow liquid to enter. Instead, the surface tension of the water forms a meniscus or "bridge" over the entrance to these pores. Water molecules transition from a low-entropy liquid state to a high-entropy vapor state within this meniscus. The water vapor diffuses into the bulk of the membrane and transits to the other face of the membrane, where it comes in contact with the lower temperature liquid and re-condenses. In this type of membrane, the dissolved ions in the water are left within the water meniscus covering the pores at the liquid interface.

These membranes experience several failure mechanisms during use. The liquid meniscus, where the conversion to vapor occurs, concentrates the dissolved ions. Eventually the dissolved ion concentration increases to the point where the dissolved ions precipitate. These precipitated ions form a barricade over the pores curtailing the further conversion of liquid water to vapor. It is extremely difficult to re-dissolve these precipitated ions once they form the barricade. The second failure mechanism occurs when water vapor condenses within the pores of the membrane. Once enough liquid water has condensed into the pores to form a path connecting one face of the membrane to the other, dissolved ions are free to diffuse into the membrane. These dissolved ions foul the membrane internally and are difficult, if not impossible to remove.

Existing salt-water desalination plants typically use reverse osmosis membranes. These membranes are constructed from hydrophobic polymers and have a porosity and pore size such that only water can pass through the membrane leaving behind dissolved salts and minerals contained in the salt water. Because the materials used to construct these membranes are hydrophobic, a pressure differential is required to force the water through the membrane. Therefore, the salt water is pressurized to force it through the membrane.

Unfortunately, the pressure also forces contaminants that would otherwise be too large to pass through the membrane into the pore structure reducing the efficacy of the membrane. Therefore, the membrane must be cleaned by periodic back-flushing, surface scouring, and the like to remove these contaminants. In order to maintain a desired production rate of desalinated water, a reverse osmosis plant must be constructed with at least some excess capacity to allow for membrane cleaning.

Such prior art reverse osmosis processes require a considerable amount of energy to force the water through the membrane. Further, such plants are expensive due to the complexity of the piping necessary to support the pressurized operation with the necessary membrane cleaning. The reverse osmosis process is also considered unstable because it is sensitive to type and amount of dissolved ions, organic proteins, and biota in the salt water.

Therefore, a need also exists for desalination processes that are more cost-effective, more robust, and/or less energy intensive than the reverse osmosis process.

SUMMARY OF THE INVENTION

Certain embodiments of the present disclosure relate to a desalinization system comprising a membrane assembly disposed between a flow of a first material having a first temperature and comprising a high-dipole moment liquid and a plurality of dissolved ions and a flow of a second material having a second temperature, the second temperature being lower than the first temperature, the membrane assembly comprising a membrane coupled to a support, the membrane being in contact with the flow of the first material and the support being in contact with the flow of the second material, the membrane assembly being configured to allow at least a portion of the high-dipole moment first material to pass through the membrane assembly into the second material, wherein the membrane assembly comprises a non-porous selective transfer membrane comprising ionomeric polymer domains, the membrane permeable to high dipole materials while precluding passage of dissolved ions through the membrane assembly.

In certain instances, the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane. The ionomeric polymer domains of the selective transfer membrane may form contiguous conduits suitable to provide for travel of high-dipole liquids or gases from one face of the membrane to the other face. Additionally, the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly (methyl methacrylate) (PMMA), acrylonitrile butadiene styrene (ABS), polyamide (PA), polytetrafluoroethylene (PTFE) (such as Gore-Tex®), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, Nafion® (sulfonated tetrafluorethylene copolymer), and any combination thereof.

As disclosed herein, the selective transfer membrane comprises a barrier layer comprising a polymer or polymer composite that is permeable to high dipole moment material. In certain instances, the membrane assembly comprises a selective transfer membrane having a first surface and a second surface and further comprising a porous support having a first surface and a second surface, the second surface of the selective transfer membrane being positioned adjacent to the first surface of the porous support, the first surface of the membrane assembly being the first surface of the selective transfer membrane and the second surface of the membrane assembly being the second surface of the porous support, which may be hydrophilic.

In certain embodiments, the plurality of dissolved ions comprise sodium ions and/or chloride (or chlorine) ions. As disclosed herein, in certain instances, the first material is brackish water or seawater. In other instances, the first material is seawater discharged from an electric power plant.

In other embodiments, the system further comprises a heat exchanger configured to heat the flow of the first material to the first temperature, and when the high-dipole moment liquid joins with the second material, the high-dipole moment liquid transfers thermal energy to the second material increasing the second temperature, the system further comprising: a heat exchanger configured to transfer at least a portion of the thermal energy transferred to the second material to a portion of the flow of the first material before the portion of the flow of the first material contacts the membrane.

In certain embodiments, when the high-dipole moment liquid joins with the second material, the high-dipole moment liquid transfers thermal energy to the second material increasing the second temperature to a third temperature, the system further comprising: a heat exchanger configured to lower the third temperature of the second material to the second temperature. In other embodiments, when the high-dipole moment liquid joins with the second material, the high-dipole moment liquid transfers thermal energy to the second material increasing the second temperature to a third temperature, the system further comprising: a reservoir containing the second material at a fourth temperature, the third temperature being greater than the fourth temperature; and a heat exchanger configured to transfer at least a portion of the thermal energy transferred to the second material by the high-dipole moment liquid to a portion of the second material in the reservoir thereby lowering the third temperature of the second material to the second temperature.

In certain embodiments, a first portion of the flow of the first material that contacted the membrane comprises the plurality of dissolved ions and is prohibited from passing through the membrane assembly also comprises thermal energy, the system further comprising a heat exchanger configured to transfer at least a portion of the thermal energy of the first portion of the flow of the first material to a second portion of the flow of the first material before the second portion of the flow of the first material contacts the membrane.

Particular embodiments described herein include a vacuum assist evaporator comprising a housing having a hollow portion bifurcated into a first chamber and a second chamber by a membrane assembly, the first chamber comprising a partial vacuum, a condensation surface, and a port, the second chamber comprising an inlet and an outlet, the inlet being configured to allow a flow of a first material comprising a high-dipole moment liquid and a plurality of dissolved ions to flow into the second chamber, the membrane assembly being configured to allow at least a portion of the high-dipole moment first material to pass through the membrane assembly into the first chamber, the membrane assembly comprising a non-porous selective transfer membrane comprising ionomeric polymer domains, the membrane permeable to high dipole materials while precluding passage of dissolved ions through the membrane assembly, the outlet of the second chamber being configured to allow the plurality of dissolved ions to flow out of the second chamber, the condensation surface being configured to condense the vaporized high-dipole moment liquid in the first chamber, and the port being configured to allow the condensed high-dipole moment liquid to exit the first chamber.

In certain instances, the membrane assembly comprises a selective transfer membrane having a first surface and a second surface, the first surface of the mass exchanger being the first surface of the selective transfer membrane and the second surface of the mass exchanger being the second surface of the selective transfer membrane. As disclosed herein, the membrane assembly comprises a membrane coupled to a support, the membrane being in contact with the first material in the second chamber and the support being in contact with the partial vacuum in the first chamber.

Also disclosed herein is a vacuum assisted evaporator system comprising: a membrane assembly comprising a membrane coupled to a support, the membrane being in contact with a flow of the first material having a first pressure in a first chamber and the support being in contact with a partial vacuum having a second pressure in a second chamber, the first pressure being greater than the second pressure, the first material comprising a high-dipole moment liquid, the membrane assembly being configured to allow at least a portion of the high-dipole moment first material to pass through the membrane assembly into the second chamber, the membrane assembly comprising a non-porous selective transfer membrane comprising ionomeric polymer domains, the membrane permeable to high dipole materials while precluding passage of dissolved ions through the membrane assembly;

and a condenser configured to receive and condense the vaporized high-dipole moment liquid. In certain instances, the system further comprises a compressor configured to collect the vaporized high-dipole moment liquid from the second chamber and direct it into the condenser.

In other instances, a portion of the flow of the first material is not vaporized by the membrane assembly and the first chamber includes an outlet through which the portion exits the first chamber, the system further comprising a heat exchanger configured to transfer thermal energy from the condensed high-dipole moment liquid to the portion of the flow of the first material exiting the first chamber through the outlet.

In other embodiments, the system further comprises a vacuum pump configured to maintain at least a portion of the partial vacuum inside the second chamber. In still other embodiments, the system further comprises: a compressor configured to collect the vaporized high-dipole moment liquid from the second chamber and direct it into the condenser; and a vacuum pump coupled to the second chamber, the compressor and vacuum pump being configured to maintain the partial vacuum inside the second chamber. In still other embodiments, the condenser further comprises: a condensation surface having a temperature configured to condense the vaporized high-dipole moment liquid; and a flow of the first material configured to determine the temperature of the condensation surface.

As disclosed herein, the system may further comprise a plurality of serially-arranged evaporation chambers configured between the membrane assembly and the condenser, each evaporation chamber having two evaporation sub-chambers comprising a compressor element, the two sub-chambers communicating through the compressor elements.

Also disclosed herein is a vacuum assisted desalinization system comprising: a first vacuum assist evaporator configured to receive salt water and extract a first portion of water therefrom to create a first concentrated salt water solution, the evaporator having a membrane assembly comprising a non-porous selective transfer membrane comprising ionomeric polymer domains, the membrane permeable to high dipole materials while precluding passage of dissolved ions through the membrane assembly; a second vacuum assist evaporator configured to receive the concentrated salt water solution created by the first vacuum assist evaporator and extract a second portion of water therefrom to create a second concentrated salt water solution; a first condenser having a condensation surface having a temperature, the first condenser being configured to receive the first portion of water extract by the first vacuum assist evaporator and the second concentrated salt water solution, the first condenser being further configured to use the condensation surface to condense the first portion of water and to use the second concentrated salt water solution to determine the temperature of the condensation surface; a second condenser having a condensation surface having a temperature, the second condenser being configured to receive the second portion of water extract by the second vacuum assist evaporator and the second concentrated salt water solution, the second condenser being further configured to use the condensation surface to condense the second portion of water and to use the second concentrated salt water solution to determine the temperature of the condensation surface; a heat exchanger configured to receive the first portion of water extracted by the first vacuum assist evaporator, the second portion of water extracted by the second vacuum assist evaporator, and the second concentrated salt water solution and transfer thermal energy from the first portion of water and the second portion of water to the second concentrated salt water solution before the second concentrated salt water solution is received by either the first condenser or the second condenser; and may further comprise a compressor configured to collect the second portion of water extracted by the second vacuum assist evaporator and direct it into the second condenser.

Also disclosed herein is a gas conditioning system comprising: a desiccator comprising a first chamber, a second chamber, and a membrane assembly, the first chamber being configured to receive a flow of gas having a first pressure, the second chamber comprising a partial vacuum having a second pressure, the membrane assembly comprising a membrane coupled to a support, the membrane being in contact with the flow of gas in a first chamber and the support being in contact with the partial vacuum in a second chamber, the first pressure being greater than the second pressure, the gas comprising water vapor, the membrane assembly comprising a non-porous selective transfer membrane comprising ionomeric polymer domains, the membrane permeable to high dipole materials and suitable to transport at least a portion of the water vapor in the flow of the gas through the membrane assembly into the second chamber leaving a portion of the flow of the gas behind in the first chamber; and a condenser configured to receive the water vapor from the desiccator, condense the water vapor into liquid water, and output the condensed water as a flow of liquid water having a third pressure, and an evaporator comprising a first chamber, a second chamber, and a membrane assembly, the first chamber being configured to receive the flow of liquid water from the condenser, the second chamber comprising a partial vacuum having a fourth pressure, the membrane assembly comprising a membrane coupled to a support, the membrane being in contact with the flow of liquid water in a first chamber and the support being in contact with the partial vacuum in a second chamber, the third pressure being greater than the fourth pressure, the membrane assembly being configured to allow a first portion of the liquid water flow through the membrane assembly into the second chamber, a second portion of the liquid water being left behind in a portion of the flow of the liquid water in the first chamber, the condenser being further configured to receive the vaporized water from the second chamber of the evaporator, condense the vaporized water into liquid water, and output the condensed water in the flow of liquid water; and a heat exchanger configured to receive the portion of the flow of the gas left behind in the first chamber of the desiccator and the portion of the flow of the liquid water left behind in the first chamber of the evaporator, and transfer thermal energy from the flow of the gas to the flow of the liquid water.

Other embodiments relate to an evaporator comprising: a plurality of tubular cartridges, each cartridge of the plurality comprising a closed end portion opposite an open end portion and a membrane assembly comprising a barrier layer and a support, the barrier layer being disposed around the outside surface of the cartridge and encasing the support inside the cartridge; a divider having a plurality of apertures, the plurality of apertures comprising an aperture for each cartridge of the plurality of tubular cartridges, each aperture being configured to receive the open end portion of a cartridge; a housing bifurcated by the divider into a first chamber and a second chamber, the first chamber comprising an inlet through which a flow of a first material may enter the first chamber and an outlet through which the flow of the first material may exit the first chamber, the second chamber comprising a port; and a compressor coupled to the port of the second chamber and configured to provide a partial vacuum to the second chamber that extends through the apertures formed in the divider and into each cartridge of the plurality of tubular cartridges through the open end portion thereof introducing the partial vacuum into each of the cartridges.

Still other embodiments relate to a vacuum assisted system for extracting water from a solution comprising alcohol and water, the system comprising: a first evaporator comprising a first chamber, a second chamber, and a membrane assembly, the first chamber being configured to receive a flow of the solution having a first pressure, the second chamber comprising a partial vacuum having a second pressure, the membrane assembly comprising a membrane coupled to a support, the membrane being in contact with the flow of the solution in a first chamber and the support being in contact with the partial vacuum in the second chamber, the first pressure being greater than the second pressure, the membrane assembly comprising a non-porous selective transfer membrane comprising ionomeric polymer domains, the membrane permeable to high dipole materials and suitable to allow transport of at least a portion of the alcohol and a first portion of the water in the flow of the solution through the membrane assembly into the second chamber, a second portion of the water being left behind in a portion of the flow of the solution in the first chamber; a first condenser configured to receive the vaporized alcohol and water from the first evaporator, condense the vaporized alcohol and water into a liquid comprising alcohol and water, and output the liquid comprising alcohol and water as a flow of liquid alcohol and water having a third pressure; and a second evaporator comprising a first chamber, a second chamber, and a membrane assembly, the first chamber being configured to receive the flow of liquid alcohol and water from the first condenser, the second chamber comprising a partial vacuum having a fourth pressure, the a membrane assembly comprising a membrane coupled to a support, the membrane being in contact with the flow of liquid alcohol and water in a first chamber and the support being in contact with the partial vacuum in the second chamber, the third pressure being greater than the fourth pressure, the membrane assembly being configured to allow transport of a first portion of the liquid water in the flow of the liquid alcohol and water through the membrane assembly into the second chamber, a second portion of the liquid alcohol and water being left behind in a portion of the flow of the liquid alcohol and water in the first chamber, the first chamber being configured to output the portion of the flow of the liquid alcohol and water left behind in the first chamber.

In certain embodiments, the membrane of the membrane assembly of the second evaporator comprises a coating rendering the membrane impervious to alcohol. In still other embodiments, the system further comprises a molecular sieve configured to receive the portion of the flow of the liquid alcohol and water left behind in the first chamber and output by the first chamber of the second evaporator and remove at least a portion of the liquid water therefrom. Still other embodiments include a heat exchanger configured to heat the flow of the solution inside the first chamber of the first evaporator, and may further comprise a heat exchanger configured to heat the flow of the solution inside the first chamber of the first evaporator using waste heat from an industrial process. Other embodiments of the system may include a heat exchanger configured to heat the flow of the liquid alcohol and water inside the first chamber of the second evaporator. In certain instances, the system includes a heat exchanger configured to heat the flow of the liquid alcohol and water inside the first chamber of the second evaporator using waste heat from an industrial process. Still other embodiments include a second condenser configured to receive the first portion of the vaporized liquid water transported through the membrane assembly into the second chamber and condense the first portion of the vaporized liquid water into liquid water.

The system described may further include a fermentation reactor configured to supply the flow of the solution to the first evaporator, optionally wherein the first chamber of the first evaporator is configured to output the portion of the flow of the solution in the first chamber, the system further comprising: a fermentation reactor configured to supply the flow of the solution to the first evaporator and to receive the portion of the flow of the solution in the first chamber of the first evaporator; and a second condenser configured to receive the first portion of the vaporized liquid water transported through the membrane assembly into the second chamber of the second evaporator and condense the first portion of the vaporized liquid water into liquid water, the fermentation reactor being further configured to receive the liquid water from the second condenser.

Also disclosed herein is a dryer having a drying chamber comprising heated air, the dryer comprising: a vacuum assist evaporator configured to extract water from the heated air and output a portion of the heated air from which the water was extracted, the evaporator having a membrane assembly comprising a non-porous selective transfer membrane comprising ionomeric polymer domains, the membrane permeable to high dipole materials; a compressor configured to receive the extracted water from the evaporator and compress the extracted water to raise its temperature; and a heat exchanger configured to receive the portion of the heated air from which the water was extracted by the evaporator and the compressed extracted water from the compressor, heat the portion of the heated air by transferring thermal energy from the compressed extracted water to the portion of the heated air, and return the heated air to the drying chamber of the dryer.

Also disclosed herein is a system for extracting a selected material from flue gas, the system comprising: a vacuum assist evaporator comprising a first chamber, a second chamber, and a membrane assembly, the first chamber being configured to receive a flow of flue gas having a first pressure, the second chamber comprising a partial vacuum having a second pressure, the membrane assembly comprising a membrane coupled to a support, the membrane being in contact with the flow of flue gas in the first chamber and the support being in contact with the partial vacuum in the second chamber, the first pressure being greater than the second pressure, the membrane assembly comprising a non-porous selective transfer membrane comprising ionomeric polymer domains, the membrane permeable to high dipole materials and suitable to allow the passage of the selected material through the membrane assembly and into the second chamber, the first chamber being configured to output a portion of the flue gas from which the selected material was extracted; and a compressor configured to receive the selected material from the second chamber of the evaporator and concentrate the selected material.

As is understood from review of the instant application, any system described herein may include a nonporous selective transfer membrane wherein the ionomeric polymer domains of the selective transfer membrane form contiguous conduits suitable to provide for travel of high-dipole liquids or gases from one face of the membrane to the other face.

As disclosed herein, the non-porous selective transfer membrane comprises an ionomeric polymer, wherein the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polytetrafluoroethylene (PTFE) (such as Gore-Tex®), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, Nafion® (sulfonated tetrafluorethylene copolymer), and any combination thereof.

BRIEF DESCRIPTION OF THE SEVERAL VIEWS OF THE DRAWING(S)

FIG. 5 is a schematic view of the mass exchanger of FIG. 1 in a membrane-only implementation.

FIG. 6 is a schematic view of the mass exchanger of FIG. 1 in a first material-side membrane implementation of a dual layer version of the mass exchanger of FIG. 1.

FIG. 7 is a schematic view of the mass exchanger of FIG. 1 in a second material-side membrane implementation of a dual layer version of the mass exchanger of FIG. 1.

Figure 24:
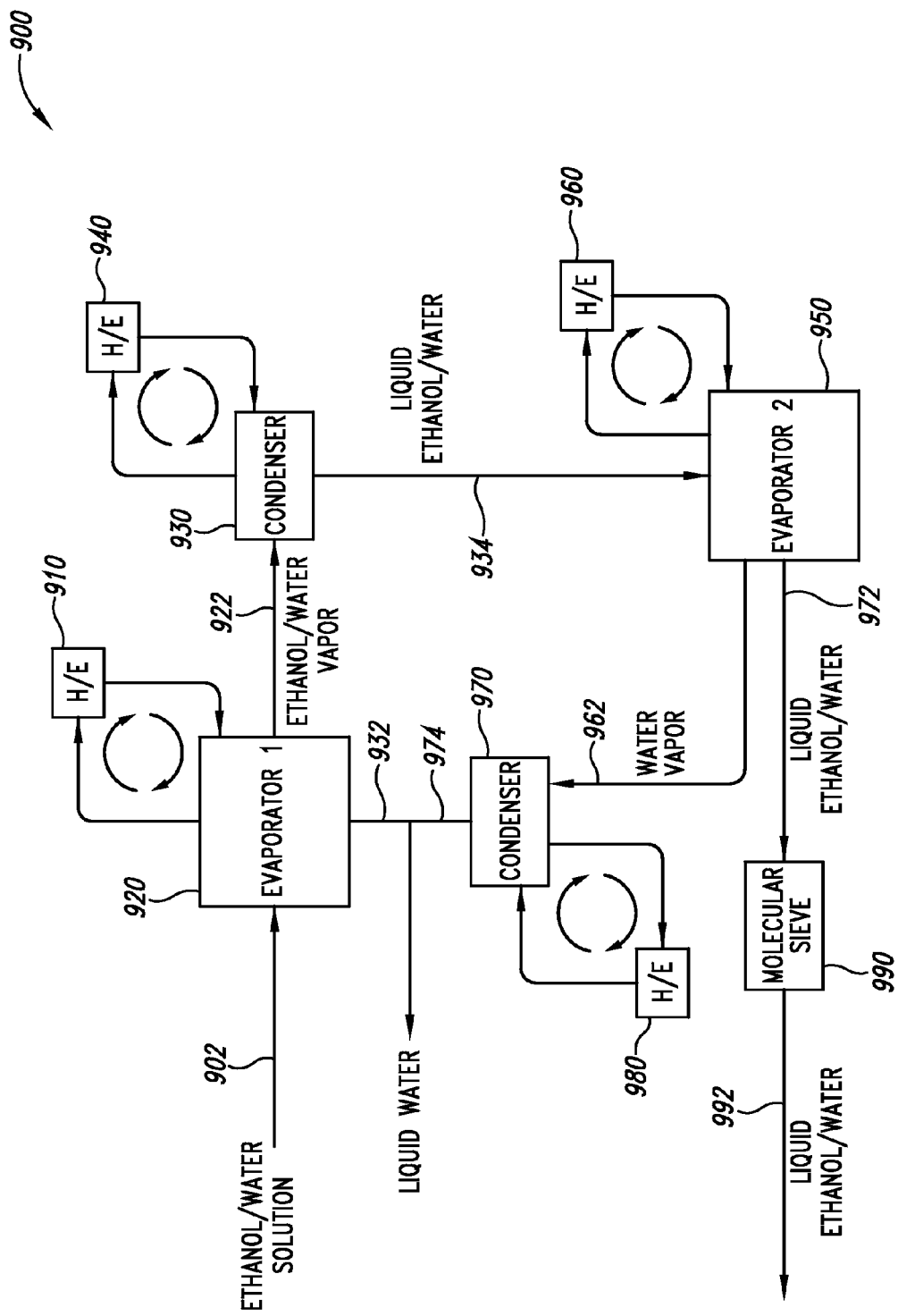

FIG. 24 is a schematic view of an embodiment of a system incorporating a pair of mass exchangers arranged in series, the first mass exchanger being configured to receive an ethanol and water solution, to extract the ethanol and a first portion of water from the solution, and to output the extracted ethanol and first portion of the water to the second mass exchanger, and the second mass exchanger being configured to receive the output of the first mass exchanger, extract a second portion of water from the output of the first mass exchanger, and output the output of the first mass exchanger less the extracted second portion of water.

Figure 25:
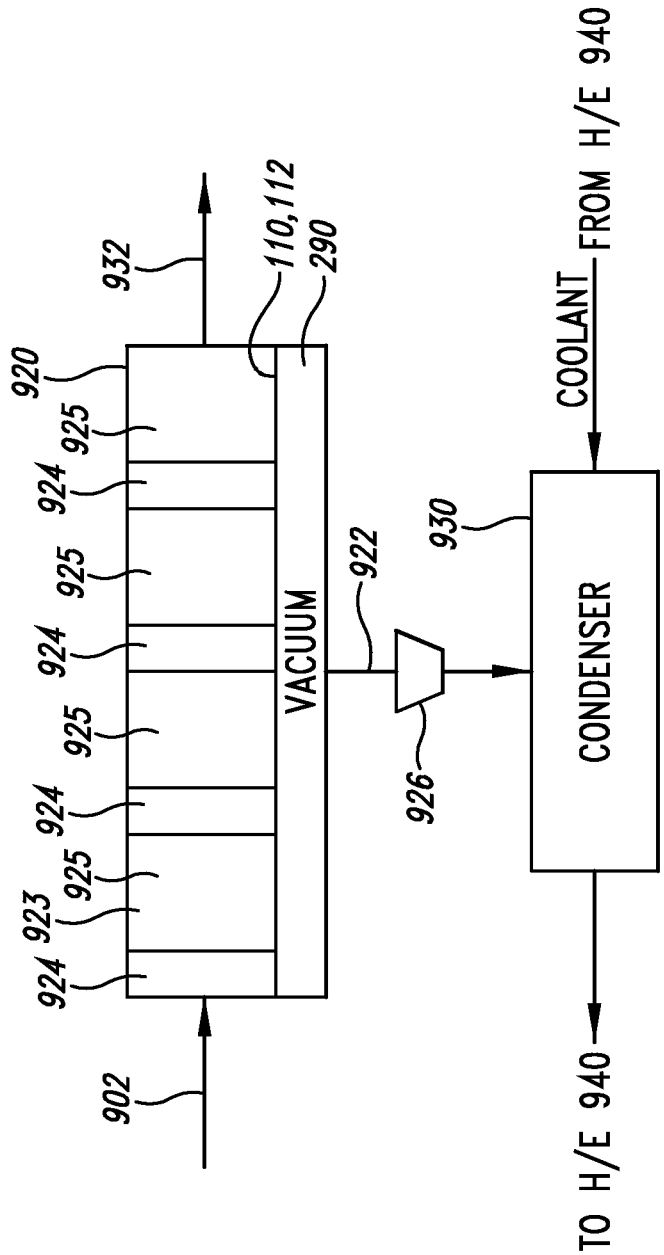

FIG. 25 is a schematic view of an exemplary embodiment of an evaporator for use in the system depicted in FIG. 24.

Figure 26:
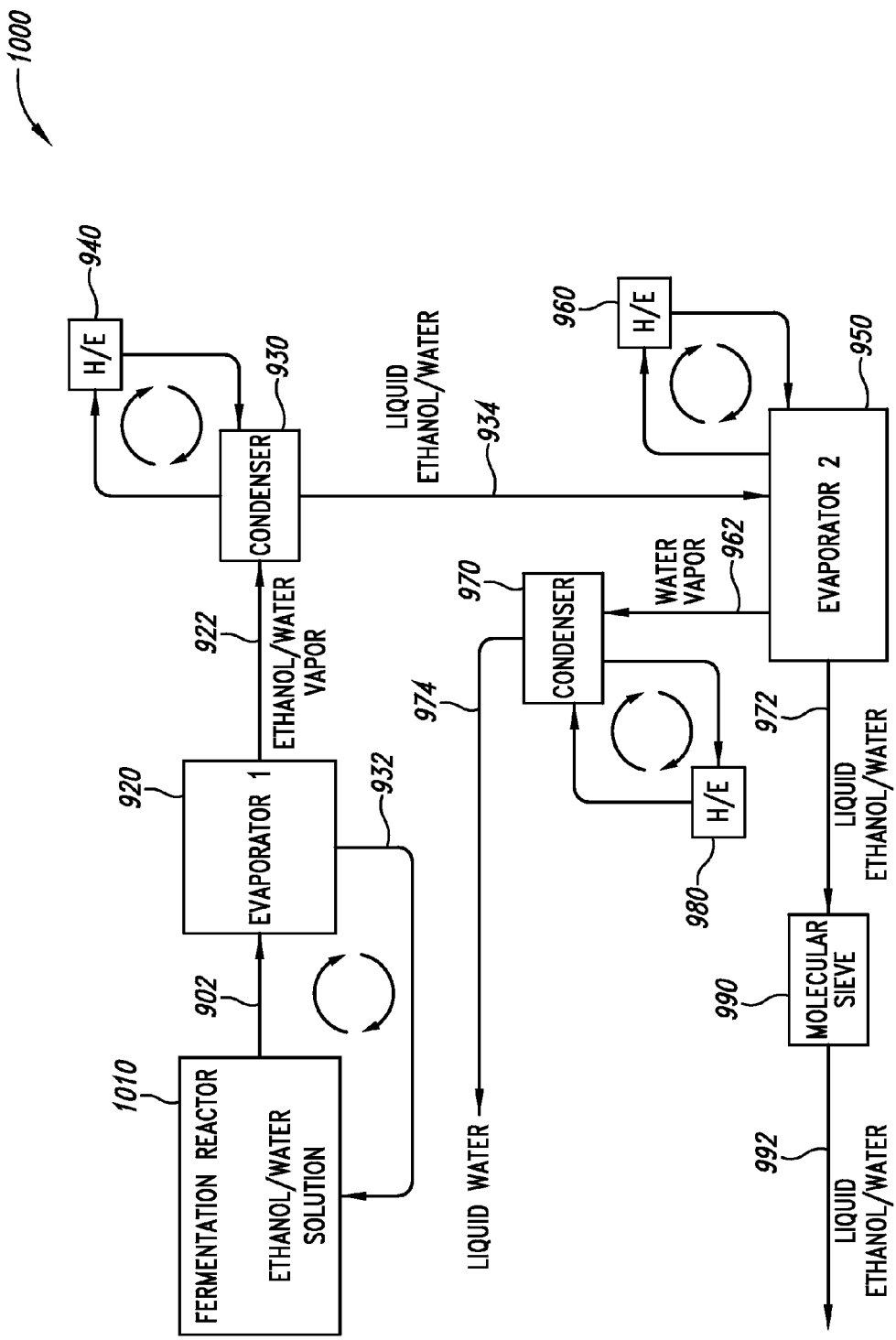

FIG. 26 is a schematic view of an alternate embodiment of the system of FIG. 24 configured to receive the ethanol and water solution directly from a fermentation reactor and to return both the ethanol and water solution less the ethanol and the first portion of water extracted by the first mass exchanger and the second portion of water extracted by the second mass exchanger to the fermentation reactor.

Figure 27:
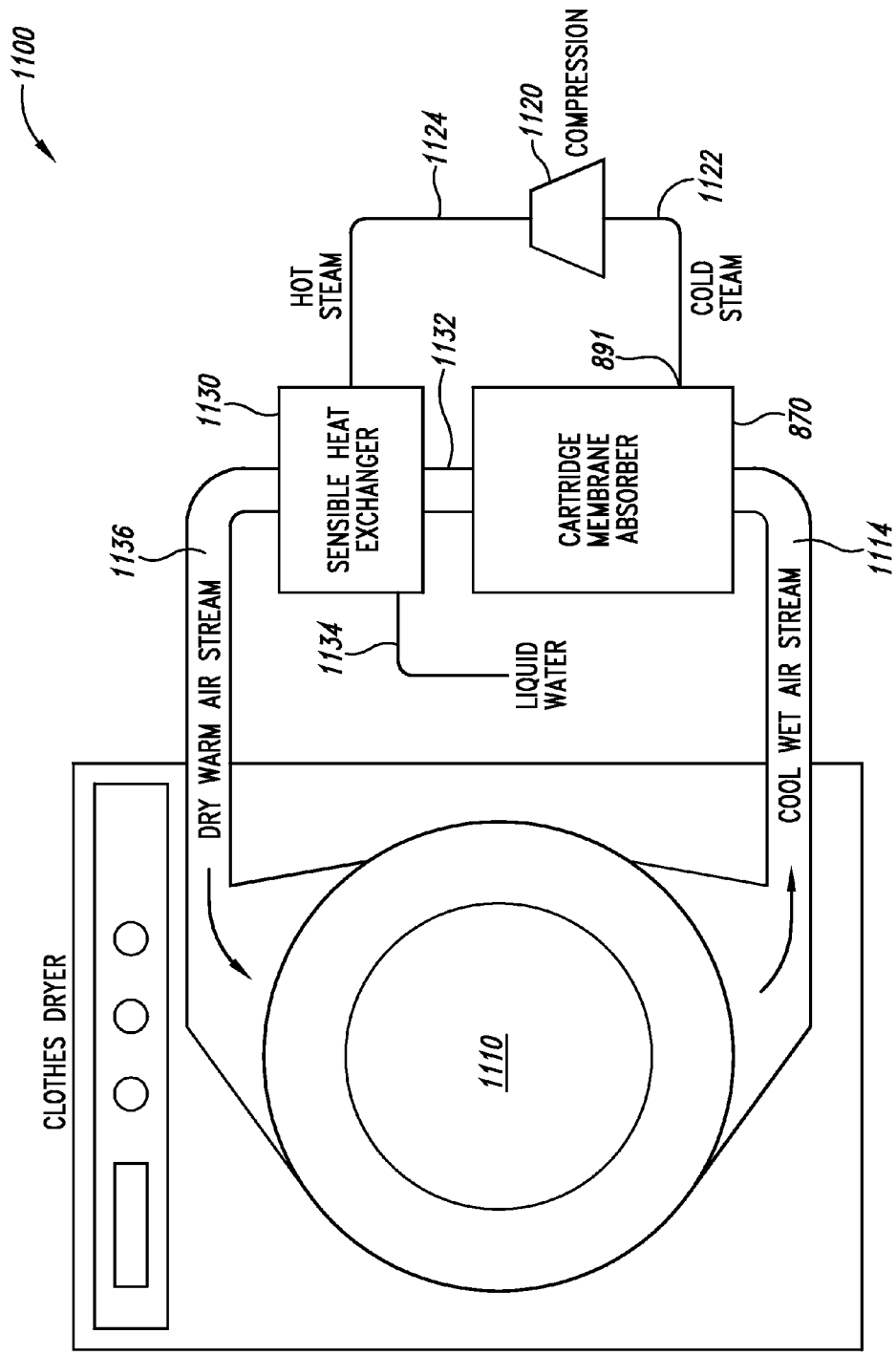

FIG. 27 is a schematic view of a dryer having a drum and incorporating an embodiment of a vacuum assist mass exchanger configured to received air from the drum, extract water from the received air, heat the air, and return the heated air to the drum.

Figure 28:
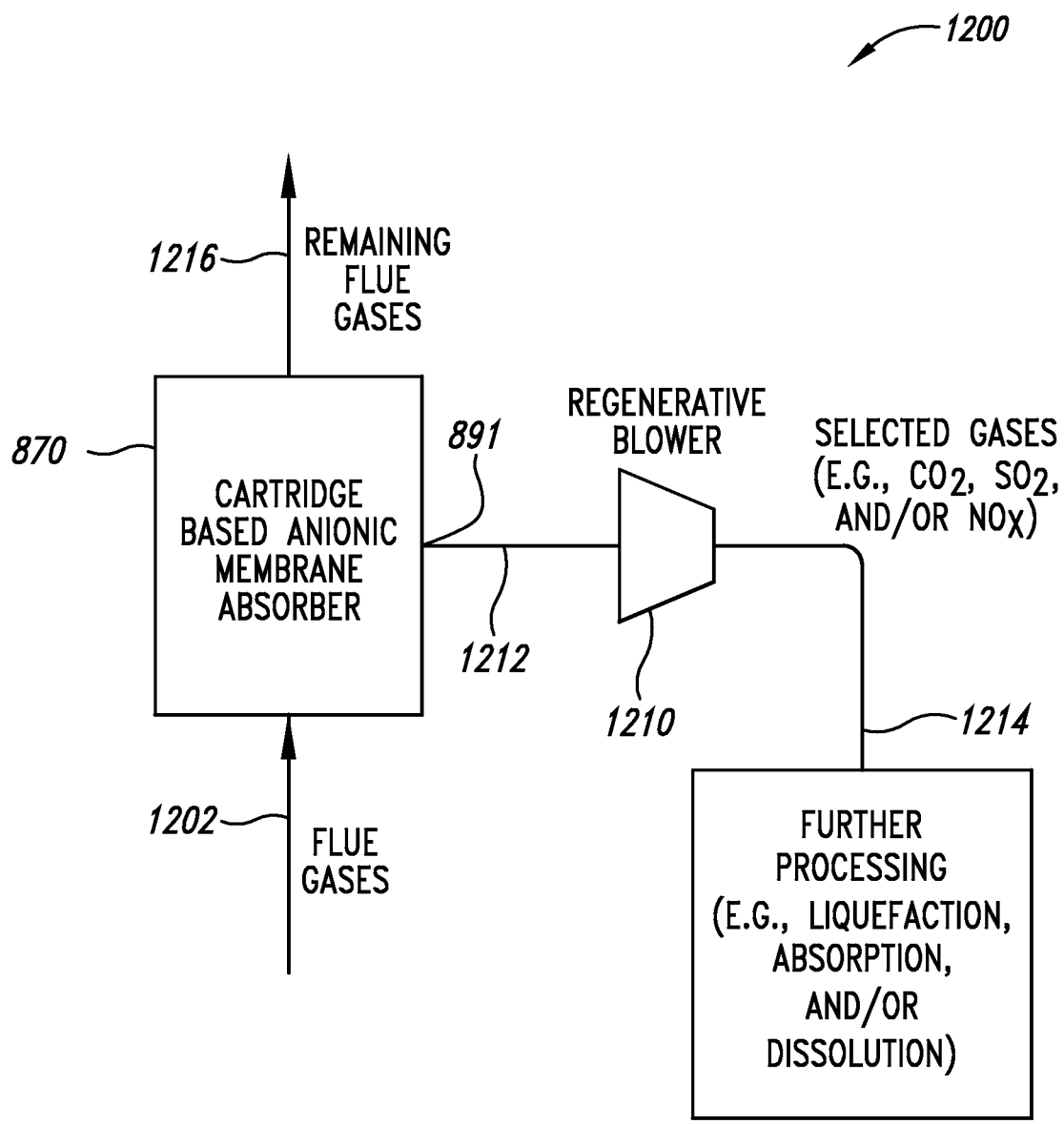

FIG. 28 is a schematic view of a flue gas processing device incorporating an embodiment of a vacuum assist mass exchanger configured to extract one or more selected gases from flue gas.

DETAILED DESCRIPTION OF THE INVENTION

Aspects of the present invention relate to a mass exchanger 100 and systems and methods using the mass exchanger 100.

Mass Exchanger 100

Figures 1, 2:
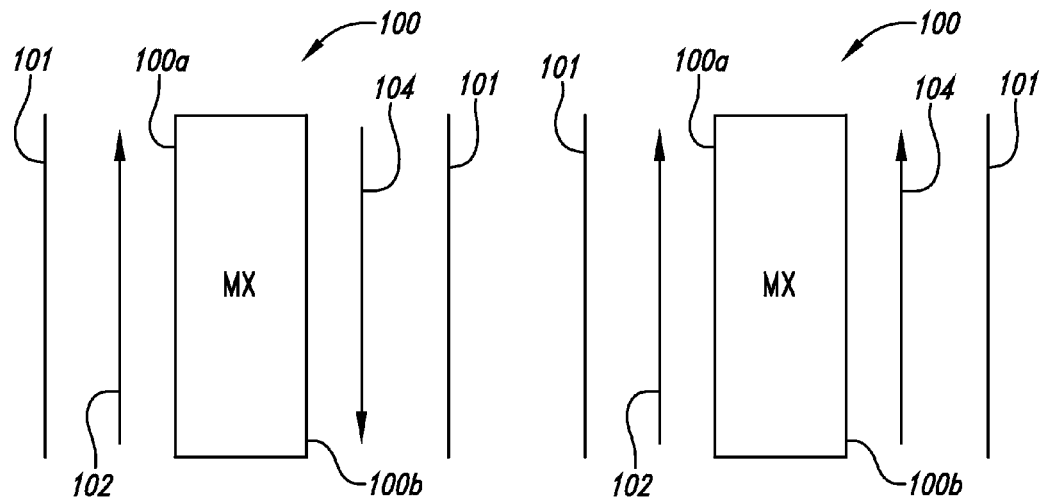
FIG. 1 is a schematic view of a membrane based mass exchanger according to the present invention showing a first flow configuration of a flow of a first material and a flow of a second material.
FIG. 2 is a schematic view of the mass exchanger of FIG. 1 showing a second flow configuration of a flow of a first material and a flow of a second material.

An exemplary mass exchanger 100 is shown in FIG. 1 as having a first surface 100a and a second surface 100b opposite the first surface. The mass exchanger 100 is depicted as being exposed to counter-directional flows directed by flow structures 101, such as channels, piping, plenums, and the like, with the first surface 100a being exposed to a first material flow 102 and the second surface 100b being exposed to a second material flow 104 in a direction substantially opposite to the flow of the first material. The first material flow 102 and the second material flow 104 may each include a liquid, a gas, a combination thereof, and the like.

The mass exchanger 100 is depicted in FIG. 2 as being exposed to common-directional flows directed by the flow structures 101 with the first surface 100a being exposed to the first material flow 102 and the second surface 100b being exposed to the second material flow 104 in a direction substantially the same as the first material flow.

Figures 3, 4:
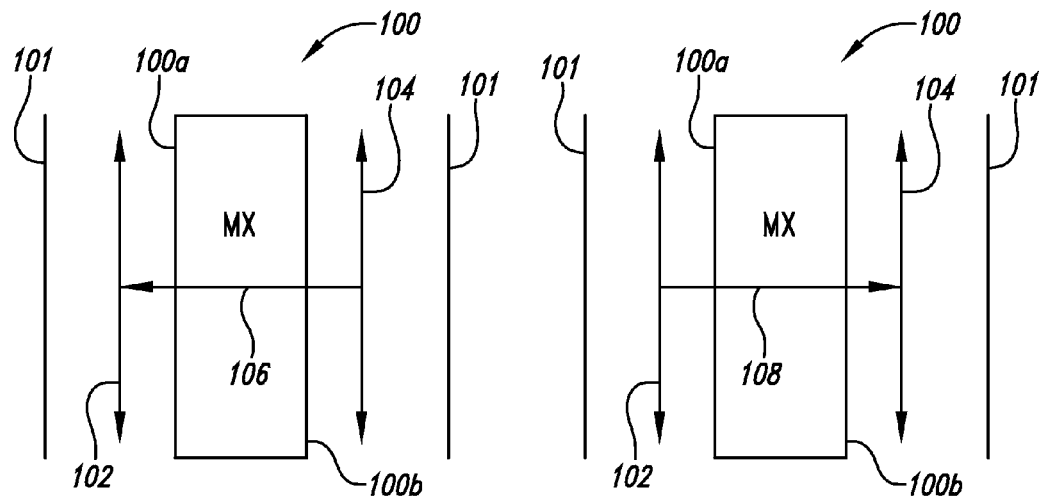
FIG. 3 is a schematic view of the mass exchanger of FIG. 1 used in a second material-to-first material exchange mode.
FIG. 4 is a schematic view of the mass exchanger of FIG. 1 used in a first material-to-second material exchange mode.

The mass exchanger 100 is depicted in FIG. 3 as being in a second material-to-first material exchange mode in which the second material from the second material flow 104 passes through the mass exchanger (as a gas 106) to join with the first material flow 102.

The mass exchanger 100 is depicted in FIG. 4 as being in a first material-to-second material exchange mode in which the first material from the first material flow 102 passes through the mass exchanger (as a gas 108) to join with the second material flow 104.

The mass exchanger 100 is depicted in FIG. 5 as being in a membrane-only implementation of the mass exchanger having a selective transport membrane 110 with a first surface 110a of the membrane being the first surface 100a of the mass exchanger and a second surface 110b of the membrane being the second surface 100b of the mass exchanger. The first surface 100a is shown being exposed to the first material flow 102 and the second surface 100b is shown being exposed to the second material flow 104 with the first material flow and the second material flow shown as either counter-directional or common-directional flows.

The mass exchanger 100 is depicted in FIG. 6 as being in a first material-side membrane implementation of a dual layer version of the mass exchanger with the selective transport membrane 110 coupled, such as through a hermetic seal, with a support 112. In such embodiments, the membrane 110 may be referred to as a barrier layer 110. The first surface 110a of the membrane 110 is the first surface 100a of the mass exchanger and a first surface 112a of the support 112 is the second surface 100b of the mass exchanger. The first surface 100a is shown being exposed to the first material flow 102 and the second surface 100b is shown being exposed to the second material flow 104 with the first material flow and the second material flow shown as either counter-directional or common-directional flows.

The mass exchanger 100 is depicted in FIG. 7 as being in a second material-side membrane implementation of a dual layer version of the mass exchanger with the selective transport membrane 110 coupled, such as through a hermetic seal, with a support 112. A first surface 112a of the support 112 is the first surface 100a of the mass exchanger and the first surface 110a of the membrane 110 is the second surface 100b of the mass exchanger. The first surface 100a is shown being exposed to the first material flow 102 and the second surface 100b is shown being exposed to the second material flow 104 with the first material flow and the second material flow shown as either counter-directional or common-directional flows.

Figure 8:
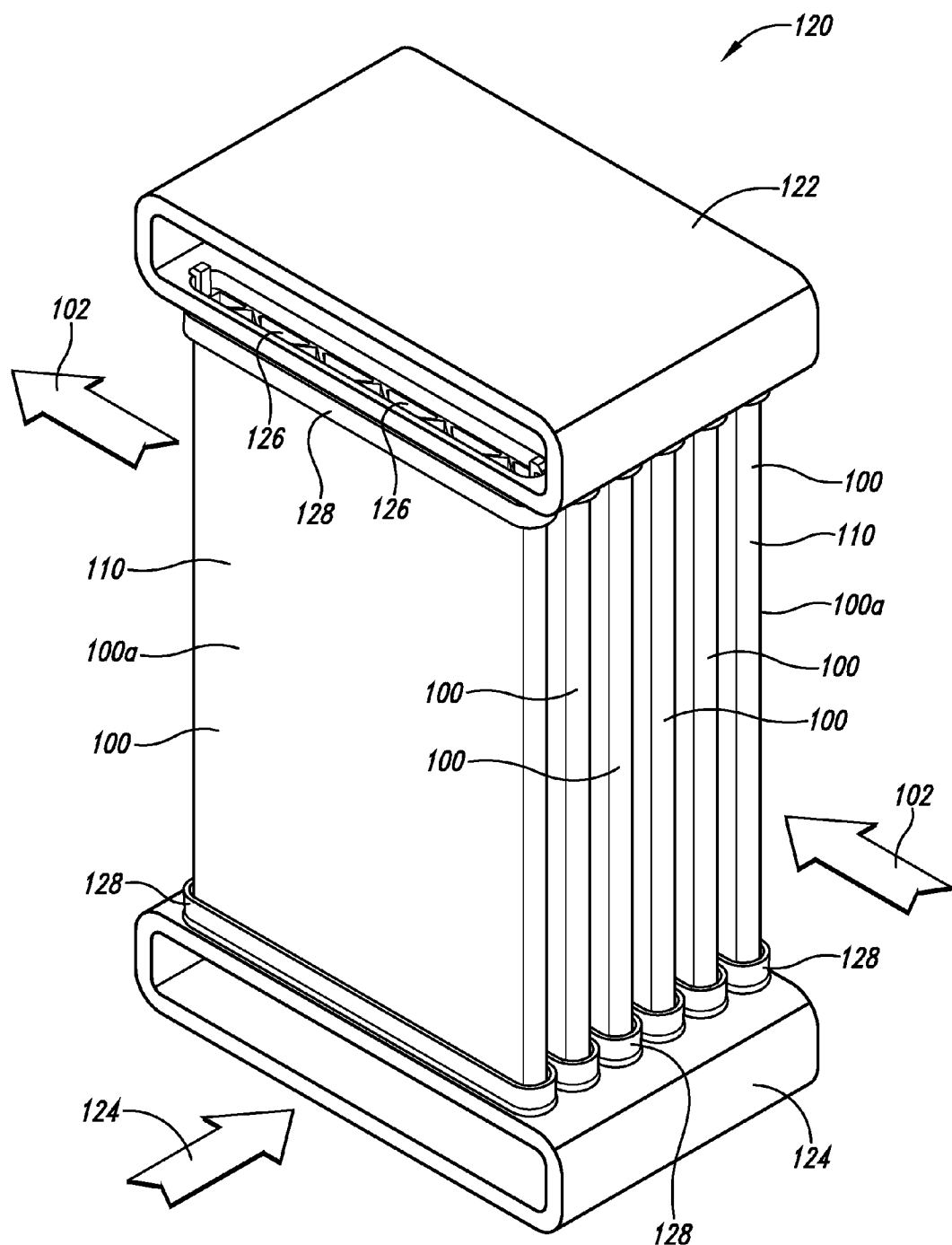
FIG. 8 is a perspective view of a manifold style of mass exchanger using multiple tubular cartridges.
Figure 9:
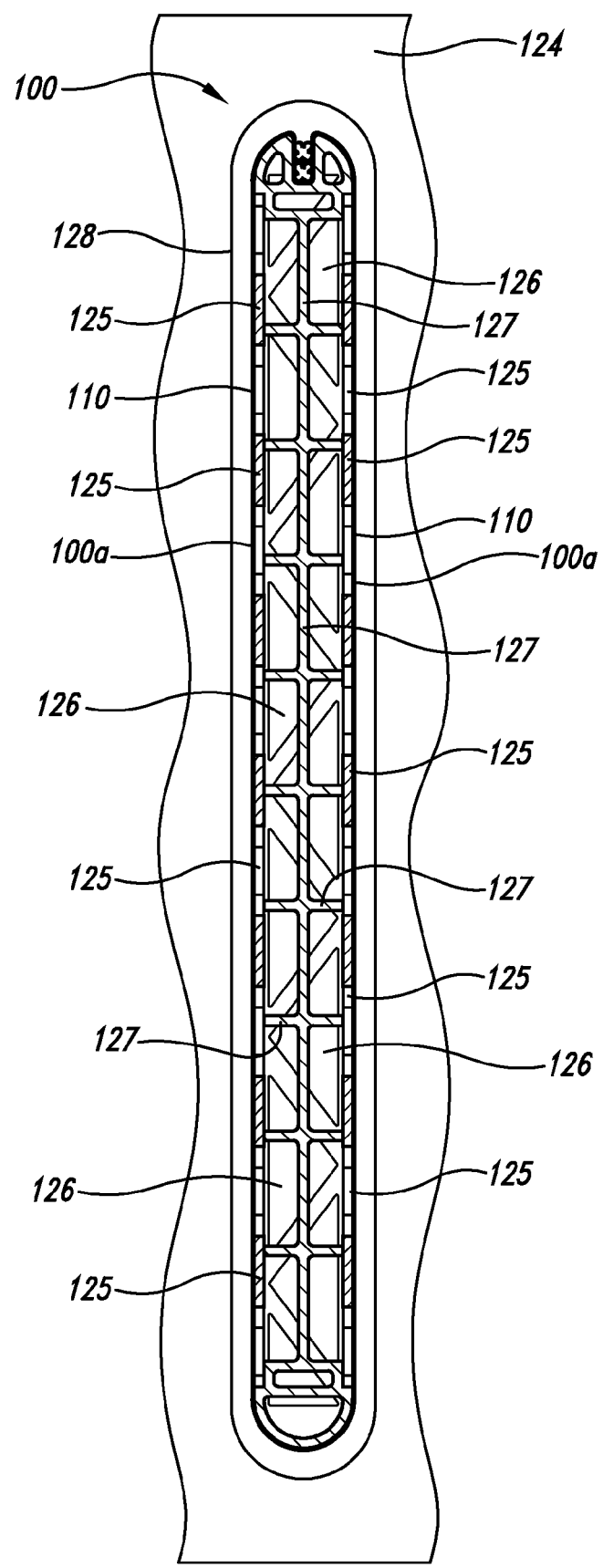
FIG. 9 is a top plan cross-sectional view of an individual tubular cartridge from the mass exchanger of FIG. 8.
Figure 9A:
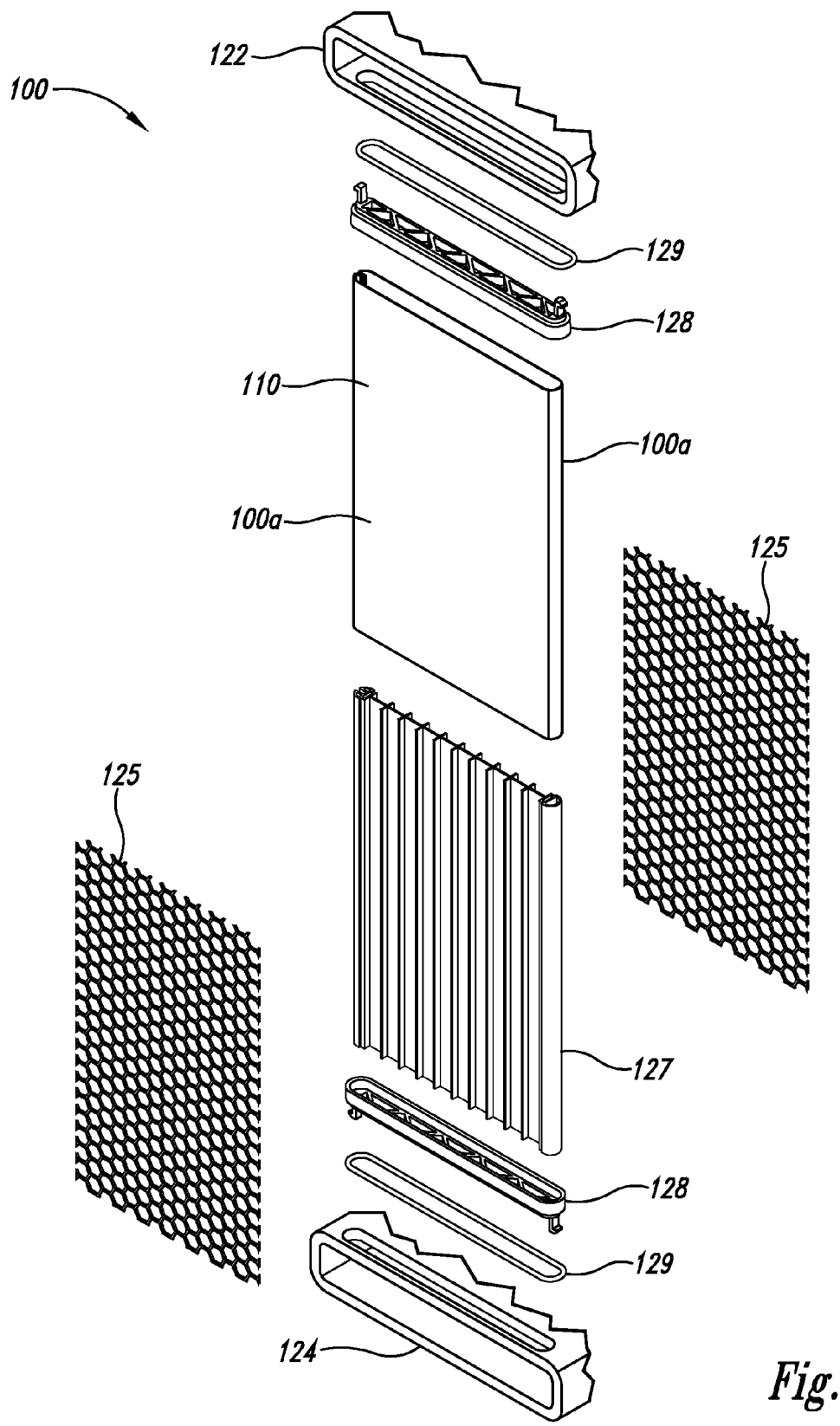
FIG. 9A is an exploded perspective view of FIG. 9.

Referring to FIG. 8, a manifold style mass exchanger 120 is provided. The mass exchanger 120 incorporates plural first material-side membrane dual layer mass exchangers 100. The plurality of the mass exchangers 100 are coupled with an intake fluid manifold 122 and an exit manifold 124. Each of the mass exchangers 100 has its own separate membrane 110. As shown in FIGS. 9 and 9A, the membrane 110 is exteriorly located, with its first surface 110a facing outwardly. A lattice 125 may be included to provide rigidity where needed. The channels 126 receive a respective portion of the second material flow 104 from the intake manifold 122 channel the second material flow to the exit manifold 124. The mass exchangers 100 are spaced sufficiently apart to allow for passage of the first material flow 102 therebetween. An optional divider 127 may be present, as well as an optional coupler 128 for each of the mass exchangers 100 that may couple the mass exchanger 100 and the intake fluid manifold 122. One or more gaskets, o-rings 129, and the like may be disposed between the optional coupler 128 and the intake fluid manifold 122. Another optional coupler 128 may be used to couple the mass exchanger 100 and the exit manifold 124. One or more gaskets, o-rings 129, and the like may be disposed between the optional coupler 128 and the exit manifold 124.

Figure 10:
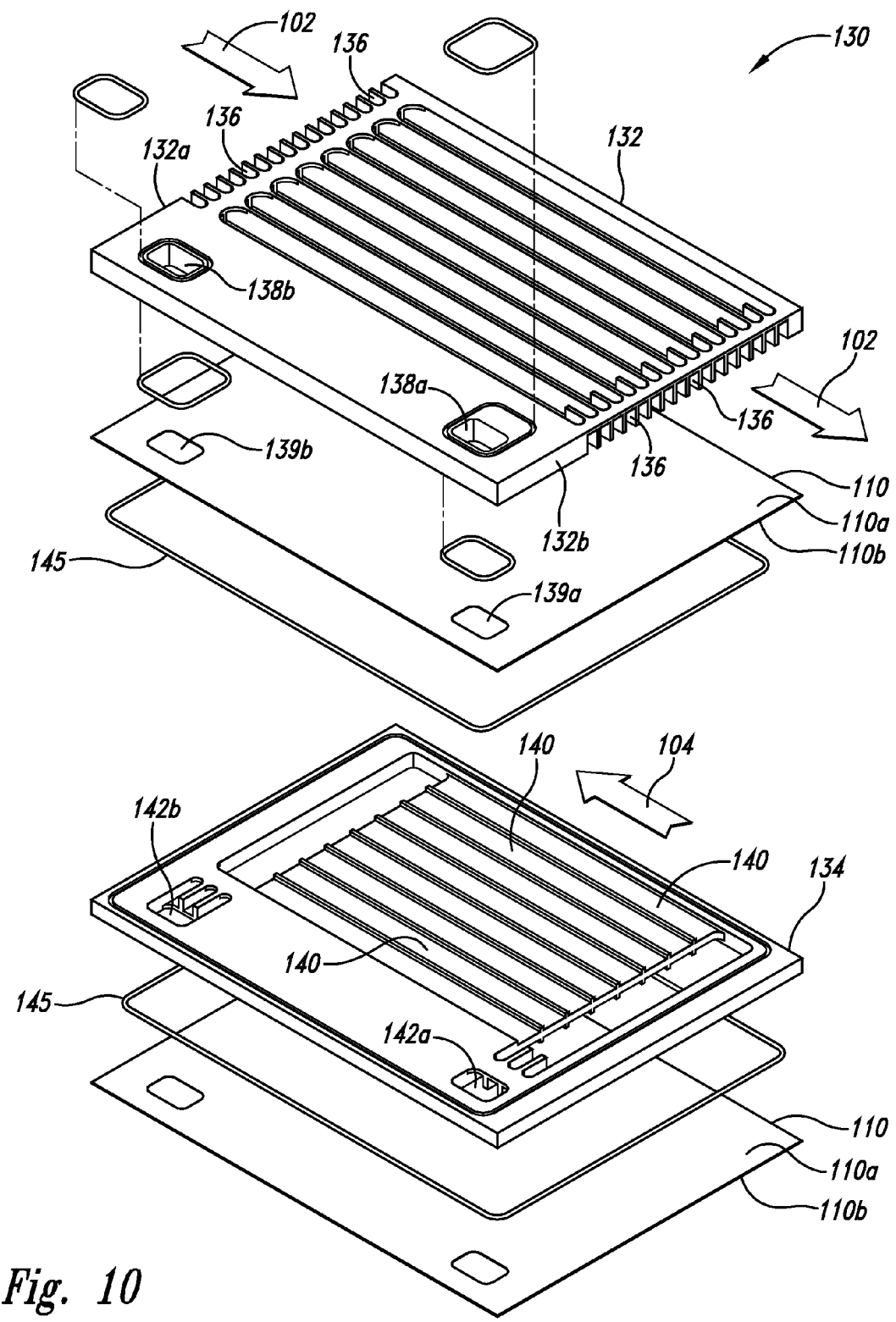
FIG. 10 is an exploded perspective view of a plate style of a membrane-only implementation of the mass exchanger.

A plate-style mass exchanger 130 including a membrane-only implementation of the mass exchanger 100 is shown in FIG. 10 as having a first material plate 132, a second material plate 134, and the membrane 110 therebetween. The depicted plate style of the mass exchanger 100 allows for stacking together of a plurality of such mass exchangers so that in an alternating fashion an instance of the first material plate 132 is positioned in juxtaposition with an instance of the second material plate 134 (with an instance of the membrane 110 positioned therebetween), which is positioned in juxtaposition with another instance of the first material plate 132 (with another instance of the membrane positioned therebetween) and so on.

The first material plate 132 has channels 136 to allow for the first material flow 102 to move past the first surface 110a of the two instances of the membrane 110 positioned on either side of the first material plate and exit therefrom. The first material plate 132 further includes an intake plenum aperture 138a and an exit plenum aperture 138b that pass the second material flow 104 therethrough to allow for stacking of a plurality of the depicted plate style mass exchanger 100. The membrane 110 also includes an intake plenum aperture 139a and an exit plenum aperture 139b that pass the second material flow 104 therethrough to allow for stacking of a plurality of the depicted plate style mass exchanger 100.

Each of the second material plates 134 in a stack of the depicted plate style mass exchangers 100 has channels 140 to allow the second material flow 104 to move past the second surface 100b of both of the membranes 110 adjacent to the second material plate. Each of the second material plates 134 in a stack of the depicted plate style mass exchangers 100 has an intake plenum aperture 142a and an exit plenum aperture 142b. The intake plenum aperture 142a receives the second material flow 104 from one or both of the intake plenum apertures 139a of the membranes 110 adjacent to the second material plate. The exit plenum aperture 142b delivers the second material flow 104 to one or both of the exit plenum apertures 139b of the membranes 110 adjacent to the second material plate. The intake plenum aperture 142a of the second material plate 134 delivers the second material flow 104 to the channels 140 that in turn deliver the second material flow 104 to the other of the exit plenum aperture 142b of the second material plate. The optional gaskets 145 may seal the plates.

Membrane 110

Certain embodiments disclosed herein relate to membrane-based selective mass transfer. The non-porous selective transfer membrane 110 disclosed herein preferably comprises a polymer electrolyte layer that forms a barrier layer 110. The barrier layer 110 is substantially impermeable to low-dipole moment gases and liquids, including oxygen, nitrogen, and cyclohexane. The barrier layer 110 is permeable to high-dipole moment liquid or gases such as water and/or alcohols such that the membrane provides for travel of high-dipole liquids or gases from one face of the membrane to the other face.

As is known in the art, high-dipole moment materials have unevenly distributed electric charges at a molecular level. This unevenly distributed charge can differ in polarity or in amount of charge of the same polarity. The uneven charge polarity and distribution give these materials a high dielectric constant (and thus are polar materials). A high dielectric constant allows for a substance to concentrate electrostatic flux lines relative to what happens in a vacuum. High-dipole moment materials are charge compatible with other high-dipole moment materials such as the polymer electrolytes within the barrier layer 110. Thus, high-dipole moment materials can permeate through other high-dipole materials, but high-dipole materials repel low-dipole materials.

Without wishing to be bound by any particular mechanism of action, the barrier layer 110 may comprise areas of charged and non-charged moieties. In certain preferred embodiments, the membrane 110 includes high-dipole moment materials or domains. In certain aspects, the domains made from charged polymer moieties form contiguous conduits, or selective transfer paths, where the high-dipole liquids and gases such as water, can travel from one face of the barrier layer 110 to the other. These conduits or selective transfer paths greatly reduce the required energy to move the materials across the barrier, without loss of material. In particular compositions, the domains may be approximately 1 nm, approximately 2 nm, approximately 3 nm, approximately 4 nm, approximately 5 nm, approximately 10 nm, approximately 15 nm, approximately 20 nm, approximately 30 nm, approximately 40 nm, approximately 50 nm, approximately 60 nm, approximately 70 nm, approximately 80 nm, approximately 90 nm, approximately 100 nm, or any value therebetween or greater.

In certain embodiments, the membrane 110 is impermeable to gases and permeable to liquids (such as water). In particular embodiments, at least one membrane 110 includes a modified (for example, sulfonated, hydrogenated, dehydrogenated, reduced, imidated and/or amidated) macromolecule. The molecules (including macromolecules) included in the at least one membrane 110 include, but are not limited to, nucleic acids (nucleotides), amino acids, peptides, polypeptides, proteins, glycoproteins, biopolymers, oligomers and/or polymers and/or copolymers containing, for example, either alkene and/or arene moieties.

A macromolecule, as used herein, generally refers to a molecule of high relative molecular mass, the structure of which typically comprises multiple repetition of segments derived from other molecules, such as for certain oligomers, polymers, or co-polymers. The molecules utilized in at least one membrane 110 may be naturally occurring, artificial, or any combination thereof. The molecules disclosed may be isolated or in a mixture or solution and/or may be chemically synthesized.

As described inter alia, the molecules utilized in at least one membrane 110 disclosed herein may include, but are not limited to, bio-polymers, oligomers and/or polymers, such as multiphase large molecular chain polymers and/or copolymers. Particular embodiments include, but are not limited to, (a) oligomers and/or polymers and/or copolymers comprising an ion-containing polymer, (b) biopolymers, or (c) block copolymers. In certain embodiments, molecules utilized in at least one membrane 110 described herein comprise an ion-containing oligomeric segment or co-oligomeric segment (ionomer). Typically, ionomers utilized in the present invention relate to polyelectrolyte polymers or copolymers that contain both nonionic repeat units and at least a small amount of ion containing repeating units.

Polymers of various degrees of polymerization are also included in the membrane 110 disclosed herein. As one of skill in the art would readily appreciate, the degree of polymerization generally refers to the number of repeat units or segments in an average polymer chain at a particular time in a polymerization reaction, where length is measured by monomer segments or units. Preferable lengths include, but are not limited to, approximately 500 monomer units, 1000 monomer units, 5000 monomer units, 10,000 monomer units, 25,000 monomer units, 50,000 monomer units, 100,000 monomer units, 200,000 monomer units, 300,000 monomer units, 500,000 monomer units, 700,000 monomer units, or greater or any value there between.

The degree of polymerization may also be a measure of the polymer's molecular weight. Thus, the degree of polymerization is equal to the total molecular weight of the polymer divided by the total molecular weight of the repeating unit or segment. Polymers with different total molecular weights but identical composition may exhibit different physical properties. Generally, the greater the degree of polymerization correlates with the greater melting temperature and greater mechanical strength.

In certain embodiments, the oligomer and/or polymer and/or co-polymer comprises a multiphase large molecular chain molecule. In some embodiments the multiphase large molecular chain oligomers and/or polymers and/or copolymers comprise one or more arene-containing linear side chains, non-arene-containing linear side chains, saturated linear side chains, unsaturated linear side chains, or flexible hydrocarbon linear side chains.

For purposes of this invention, an "alkene moiety" refers to a hydrocarbon chain containing at least one carbon-carbon double bond. An "arene moiety" refers to a monovalent or divalent aryl or heteroaryl group. An aryl group refers to hydrocarbon ring system comprising hydrogen, 6 to 18 carbon atoms and at least one aromatic ring. For purposes of this invention, the aryl group may be a monocyclic, bicyclic, tricyclic or tetracyclic ring system, which may include fused or bridged ring systems. Aryl groups include, but are not limited to, aryl groups derived from aceanthrylene, acenaphthylene, acephenanthrylene, anthracene, azulene, benzene, chrysene, fluoranthene, fluorene, as-indacene, s-indacene, indane, indene, naphthalene, phenalene, phenanthrene, pyrene, and triphenylene. Preferably, an aryl group is derived from benzene. A heteroaryl group refers to a 5- to 14-membered ring system comprising hydrogen atoms, one to thirteen carbon atoms, one to six heteroatoms selected from the group consisting of nitrogen, oxygen and sulfur, and at least one aromatic ring. For purposes of this invention, the heteroaryl group may be a monocyclic, bicyclic, tricyclic or tetracyclic ring system, which may include fused or bridged ring systems; and the nitrogen, carbon or sulfur atoms in the heteroaryl radical may be optionally oxidized; the nitrogen atom may be optionally quaternized. Examples include, but are not limited to, azepinyl, acridinyl, benzimidazolyl, benzindolyl, 1,3-benzodioxolyl, benzofuranyl, benzooxazolyl, benzothiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl,
dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8- methano-5,6,7,8-tetrahydroquinazolinyl, naphthyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, quinuclidinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl).

For purposes of this invention, an "arene-containing linear side chain" refers to an unbranched hydrocarbon chain consisting only of hydrogen or carbon, wherein at least one carbon in the chain is replaced with an aryl or heteroaryl group, as defined above. For purposes of this invention, a "non-arene-containing linear side chain" refers to an unbranched hydrocarbon chain consisting only of hydrogen or carbon and containing no aryl or heteroaryl groups within the chain. For purposes of this invention, a "saturated linear side chain" refers to an unbranched hydrocarbon chain consisting only of hydrogen or carbon comprising at least one carbon-carbon double bond or at least one carbon-carbon triple bond. An "unsaturated linear side chain," as used herein, generally refers to an unbranched hydrocarbon chain consisting only of hydrogen or carbon containing no carbon-carbon double bonds and no carbon-carbon triple bonds.

For purposes of this invention, a "flexible hydrocarbon linear side chain" refers to a flexible connecting component as taught by U.S. Pat. Nos. 5,468,574 and 5,679,482, of which the disclosures of both are hereby incorporated by reference in their entireties.

The weight of the molecules utilized in the disclosed membrane 110 are preferably at least approximately 10,000 Daltons, 15,000 Daltons, 20,000 Daltons, 25,000 Daltons, 30,000 Daltons, 40,000 Daltons, 50,000 Daltons, 60,000 Daltons, 70,000 Daltons, 80,000 Daltons, 90,000 Daltons, 1 KiloDalton, 2 KiloDaltons, 3 KiloDaltons, 4 KiloDaltons, 5 KiloDaltons, or greater or any value there between. Preferably, the size of the molecules is at least approximately 20,000 Daltons, 50,000 Daltons, 75,000 Daltons, 1 KiloDalton, 2 KiloDaltons, or any value there between.

In other embodiments, the measurement of molecular weight may be important. The average range of molecular weight (Mw) of the molecules disclosed herein includes from about 20,000 grams/mole to about 1,000,000 grams/mole, and preferably from about 50,000 grams/mole to 900,000 grams/mole.

In general, ionomers utilized in the membrane 110 contain both polar and non-polar moieties. The nonpolar moieties of an ionomer are grouped together, while the polar ionic moieties tend to cluster together and separate from the nonpolar polymer backbone moieties. This ionic moiety clustering allows for thermoplasticity of the ionomers. Generally, when ionomers are heated, the ionic moieties will lose their attraction for each other and the moieties will freely move, thus allowing for thermoplastic elastomeric qualities of the ionic polymer or copolymer.

Various types of copolymers, including block copolymers, exist that may be used with the membrane 110. For example, alternating copolymers comprise regular alternating A and B chemical or constitutional units; periodic copolymers contain A and B units arranged in a repeating sequence (e.g. (A-B-A-B-B-A-A-A-B-B)$_n$); random copolymers comprise random sequences of monomer A and B units; statistical copolymers comprise an ordering of distinct monomers within the polymer sequence that obeys statistical rules; block copolymers that are comprised of two or more homopolymer subunits linked by covalent bonds and may be diblock, tri-block, tetra-block or multi-block copolymers. (IUPAC, *Pure Appl. Chem.*, 68: 2287-2311 (1996)).

Additionally, any of the copolymers described may be linear (comprising a single main chain), or branched (comprising a single main chain with one or more polymeric side chains). Branched copolymers that have side chains that are structurally distinct from the main chain are known as graft copolymers. Individual chains of a graft copolymer may be homopolymers or copolymers, and different copolymer sequencing is sufficient to define a structural difference. For example, an A-B diblock copolymer with A-B alternating copolymer side chains is considered a graft copolymer. Other types of branched copolymers include star, brush and comb copolymers. Any one of these copolymers, or any mixture thereof, may be utilized with certain embodiments disclosed herein.

In certain embodiments disclosed herein, the molecule(s) utilized in the membrane 110 disclosed herein comprises a polymer comprised of at least one block. In certain embodiments, the molecule is a thermoplastic block copolymer. In other embodiments, the molecule is a block copolymer that comprises differentiable monomeric units. Preferably, at least one of the monomeric units of the block copolymer comprises an arene moiety-containing unit. In other preferred embodiments, at least one block comprises a non-arene moiety-containing unit. In certain embodiments, the block copolymer comprises at least two monomeric units arranged in statistically random order. In other embodiments, the block copolymer comprises at least two monomeric units arranged in ordered sequence. In certain embodiments, the molecule utilized in the processes disclosed herein includes not only polymers or block copolymers, but also copolymers with other ethylenically unsaturated monomers (such as acrylonitrile, butadiene, methyl methacrylate, etc.).

In certain embodiments disclosed herein, a block copolymer refers to a block copolymer having at least a first block of one or more mono alkene-arene moiety, such as styrene, ring-substituted styrene, α-substituted styrene, and any combination thereof; and a second block of a controlled distribution copolymer of a diene moiety and a mono alkene-arene moiety. The block copolymer can be any configuration of "A" and "B" blocks, and such block copolymers can be generated by methods known in the art.

For purposes of this invention, a "mono alkene-arene moiety" refers to one or more alkene moieties, as defined above, covalently bonded to an arene moiety, as defined above. An example of a "mono alkene-arene moiety" is styrene. A "poly alkene-arene moiety" refers to a two or more mono alkene-arene moieties, as defined above, covalently bonded to each other to form a chain comprising two or more mono alkene-arene moieties. An example of a "poly alkene-arene moiety" is polystyrene. A "diene moiety" refers to a hydrocarbon chain containing two carbon-carbon double bonds. In certain embodiments, the diene moiety may be conjugated, unconjugated, or cumulated.

Some specific examples of block copolymers include those described in U.S. Pat. Nos. 4,248,821; 5,239,010; 6,699,941; 7,186,779; 7,169,850; 7,169,848; 7,067,589; 7,001,950 and 6,699,941 and U.S. Patent Application Publication Nos.: 20070021569; 20050154144; 20070004830; 20070020473;

20070026251; 20070037927; and 20070055015, all of which are hereby incorporated by reference in their entireties.

In certain embodiments, the molecule comprises a statistical copolymer. A statistical copolymer is used herein consistent with the commonly understood usage in the art (see, for example, G. Odian, Principles of Polymerization, 1991). Statistical copolymers are derived from the simultaneous polymerization of two monomers and have a distribution of the two monomeric units along the copolymer chain, which follows Bernoullian (zero-order Markov), or first or second order Markov statistics. The polymerization may be initiated by free radical, anionic, cationic or coordinatively unsaturated (e.g., Ziegler-Natta catalysts) species. According to Ring et al., (Pure Appl. Chem., 57, 1427, 1985), statistical copolymers are the result of elementary processes leading to the formation of a statistical sequence of monomeric units that do not necessarily proceed with equal probability.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature typically reflects homogeneity at the molecular level. An additional consequence of this homogeneity is that statistical copolymers, such as those of styrene and butadiene, when viewed by electron microscopy, display a single phase morphology with no microphase separation. By contrast, block and graft copolymers of styrene/butadiene, for example, are characterized by two glass transition temperatures and separation into styrene-rich domains and butadiene-rich domains, particularly when unmodified. It should be noted that membrane 110, which are produced from statistical copolymers originally having a single glass transition temperature and a single phase morphology, do not necessarily exhibit a single phase morphology or a single glass transition temperature after sulfonation or other modification.

Pseudo-random copolymers are a subclass of statistical copolymers which result from a weighted change in the monomer incorporation that skews the distribution from a random arrangement (i.e. Bernoullian) is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be monomeric units comprising diblock, triblock, graft-block, multi-arm starblock, multiblock, segmented, tapered block, or any combination thereof.

One particular advantage provided by certain embodiments includes the ability to apply the disclosed process to non-styrenic high molecular weight polymers. Thus, in certain embodiments disclosed herein, the molecules utilized in the membrane 110 disclosed do not comprise a mono alkene—arene moiety or segment, such as a styrene segment. In certain other embodiments disclosed herein, polymers utilized in the processes disclosed do not contain poly alkene—arene moieties or segments, such as polystyrene. In certain such embodiments, the polymer includes moieties or segments comprising unsaturated carbon-carbon double bonds, which are able to be sulfonated. Some examples of such polymers include, but are not limited to polybutadiene or polyisoprene.

In particular, certain embodiments disclosed herein the membrane 110 includes molecules which have been modified (such as by sulfonation, amidization, or other modification), the molecules comprising one or more of the following moieties: alkane, alkene, alkyne, and arene, each of which may be optionally substituted by one or more of the following functional groups: carboxylic acid, urea, ester, urethane (carbamate), alkene, amide, benzene, pyridine, indole, carbonate, thioester, arcylate/acrylic, ether, amidine, ethyl, acid versions of aliphatic compounds that contain alkenes, alkanes or alkynes, imidazole, oxazole, and other possible combinations of heteroatom containing groups susceptible to loss of water and/or disassembly. Each of the terms listed above has its standard definition known to one skilled in the art.

In certain embodiments, the molecules are uniformly modified (preferably sulfonated) from approximately 10%, 20%, 30%, 40%, 50%, 60%, 70%, 80%, 85%, 90%, 91%, 92%, 93%, 94%, 95%, 96%, 97%, 98%, 99% by weight, or greater or any value there between.

In certain preferable embodiments, the membrane 110 has no net charge, but retains a high charge density comprising a balance of covalently bound positive charges and free negative ions (for example, in the case of sulfonation), or covalently bound negative charges and free positive ions (for example, in the case of amidization). In certain preferable embodiments, the membrane 110 includes an ionomeric polymer with an equivalent acid weight of about 2500, about 2000, about 1500, about 1200, about 1000, about 800, about 500, about 300, about 200, about 100, or less, or any value therebetween. In certain embodiments, the ionomeric polymer membranes exhibit high selectivity for water, and form uniform thin structures that can be free standing or laminated to the support 112. In certain embodiments, the ionomer polymers allow radiation or chemical crosslinking to immobilize the molecules within the membrane 110 and confer particular mechanical and/or permeation properties.

In certain preferred embodiments, the ionomeric membranes can exclude many airborne organic and/or inorganic particulates and/or gases such as oxygen, nitrogen, argon, helium, carbon dioxide, and others, while selectively transferring water and/or other liquids (e.g., comprising high-dipolar materials).

Without wishing to be bound to any particular theory of mechanism, in certain embodiments, the membrane 110 acts to discriminate based on size, thus for example in the case of desalination, the membrane 110 allows molecular water to pass through but precludes passage of ions (such as salts) and other impurities. In other embodiments, the membrane 110 acts to have ion/polarity discrimination such that polar molecules (such as water) are allowed through based on electrostatic imbalance. In still other embodiments, the membrane 110 allows passage of a selected material based on a diffusion concentration gradient, and in some embodiments the membrane 110 allows passage of the selected material based on a dielectric discrimination.

Some specific examples of molecules or molecule moieties or segments that may be utilized for membranes 110 disclosed herein include but are not limited to polyethylene (PE), polypropylene (PP), polyethylene oxide (PEO), polystyrene (PS), polyesters, polycarbonate (PC), polyvinyl chloride (PVC), nylon, halogenated polymers or copolymers such as perfluorinated copolymers, poly(methyl methacrylate) (PMMA), acrylonitrile butadiene styrene (ABS), polyamide (PA), polytetrafluoroethylene (PTFE) (such as Gore-Tex®), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, Nafion® (sulfonated tetrafluoroethylene copolymer), and any combination of these or others. In a preferred embodiment, the membrane 110 comprises sulfonated polystyrene co-polymer. In a specifically preferred embodiment, the membrane 110 comprises a statistically random ethylene polystyrene co-polymer sulfonated to at least 10 mole %, at least 20 mole %, at least 30 mole %, at least 35 mole %, at least 40 mole %, at least 50 mole %, at least 60 mole %, or greater or any value therebetween.

Other examples of materials that may be utilized for the membrane 110 described herein are described in the following issued U.S. patents and pending patent applications, all of which are incorporated by reference in their entireties: U.S. Pat. Nos. 5,794,82; 5,468,574; 6,110,616; 6,413,294; 6,383,391; 6,413,298; 6,841,601; 7,179,860; and PCT/US04/30936.

In certain embodiments, the membrane 110 comprises a polymer electrolyte and is ion-conducting and permeable to high-dipole moment liquid or gas. Blends of polymers and/or other materials are also considered, such as anionic exchange materials.

Figure 11:
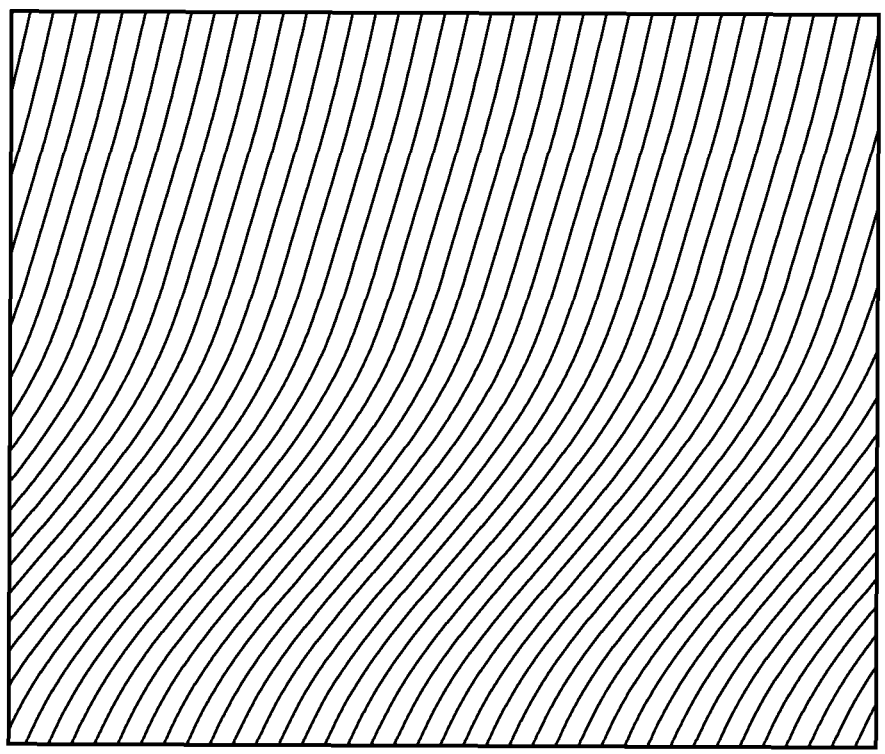
FIG. 11 is an illustration of a scanning electron micrograph of the membrane of the mass exchanger of FIG. 1.

According to particular aspects, the barrier layer 110 is created by any suitable method, including but not limited to, solvent casting or melt extrusion, wherein two types of domains with different chemistries form within the layer. One chemical domain contains the charged polymer moieties and other the non-charged polymer moieties. The domains form to a greater or lesser degree depending on the arrangement of the charge moieties on the polymer chains. Block co-polymers where the charged chemical moieties are segregated along the backbone form distinct well connected domains while statistical or randomly distributed charged chemical moieties co-polymers form smaller and less well connected but still functional domains. The non-charged domains function as the mechanical scaffolding of the barrier layer 110 and make the barrier layer 110 insoluble in high-dipole moment liquids or gases. The charged domains form the high-dipole moment material conduits, or selective transfer paths. High-dipole moment materials such as water are drawn into these domains by the energy of charge solvation. This charge solvation is exothermic; i.e. the absorption will happen spontaneously when a high-dipole moment material such as water is present. An illustration of a scanning electron micrograph of a barrier layer 110 is shown in FIG. 11.

The polymers of the barrier layer 110 are primarily of types described above. However there are hybrids that employ structural aspects of more than one type of co-polymer; i.e. blocks with random chemical arrangements. Non-linear, backbone-less polymers with architectures such as branched chain, star, knedel, or dendomer can also be employed. In certain embodiments, depending on the polymer forming the barrier layer 110, it is necessary that the polymers utilized for the membrane 110 must include charged and uncharged chemical moieties within the aggregation of the charged chemical moieties within the layer. Preferably, the process used, solvents, drying conditions, melt conditions, and extrusion pressures can affect the properties of the layer. If done incorrectly, the barrier layer 110 will have very poor high-dipole moment material transfer characteristics.

Various ion exchange configurations are also suitable as a barrier layer 110. These include an inorganic-organic (hybrid) ion exchange membrane, an amphoteric ion exchange, a mosaic ion exchange membrane (containing both cation and anion charge groups), bipolar membranes (a composition of cation exchange layer and anion exchange layer). The inorganic-organic composite layers have exhibited large variability in mechanical, thermal, electrical, and magnetic properties which can be desirable for certain embodiments. These inorganic-organic hybrid membranes can be made by several routes including sol-gel, intercalation, blending, in-situ polymerization, molecular self-assembly.

For example, a sulfonated styrene-butadiene-styrene (SSBS) triblock copolymer was cross-linked through condensation of sulfonic acid groups with bis(4-aminophenyl) sulfone to form sulfonamide linkages using a coupling agent (carbonyldiimidazole or another suitable agent), which allows for the interaction of silanols and sulfonic acids by hydrogen bonding, as indicated below. In other examples, cross-linking may be conducted utilizing di-vinyl benzene.

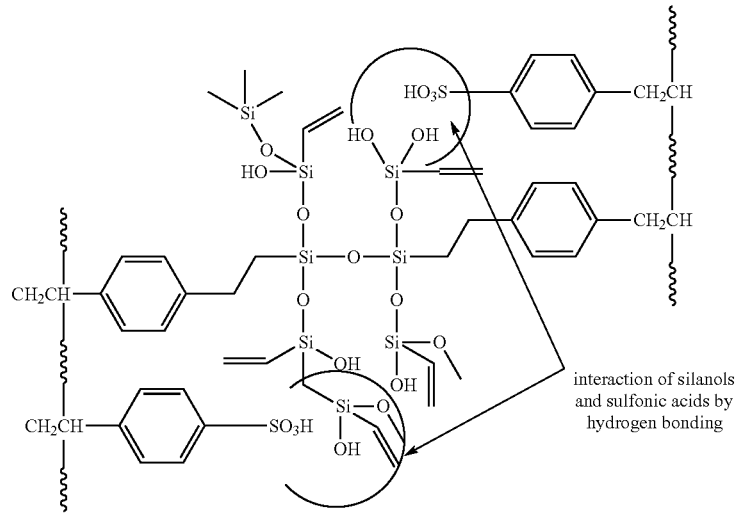

interaction of silanols and sulfonic acids by hydrogen bonding

The charge bearing chemical moieties are typically of two types: cation and anion. Examples of cation charge moieties covalently bonded to the polymer chains are —$SO_3(-)$, —$PO_3(2-)$, —$PO_3H(-)$—$COO(-)$, and —$C_6H_4O(-)$. Examples of anion charge moieties covalently bonded to the polymer chains are —$NH_3(+)$, —$NRH_2(+)$, —$NR_2H(+)$, —$NR_3(+)$—$PR_3(+)$, —$SR_2(+)$. Examples of processes to covalently bond these charge moieties to polymers and form the composite membrane include sulfonation and chloromethylation.

The barrier layer 110 typically has a thin cross-section; preferably about 50 nm, about 100 nm, about 500 nm, about 1 micron, about 2 microns, about 5 microns, about 8 microns, about 10 microns, about 15 microns, about 20 microns, about 30 microns, about 40 microns, about 50 microns, about 60 microns, about 70 microns, about 80 microns, about 90 microns, about 100 microns, about 120 microns, or any value therebetween or lesser. Thin cross-section barrier layers 110 have higher permeabilities. However, typically the thinner the cross-section, the less mechanical stability the membrane 110 (or barrier layer 110) has, so while a simple barrier layer 110 will exhibit high dipole-moment transfer characteristics, its performance will be limited. In certain embodiments, more materials and/or chemistry are added to the barrier layer 110 to make a complete long lasting membrane 110. The additional materials and chemistry typically take the form of one or more support layers 112 and cross-linking chemistry. In certain embodiments, the barrier layer 110 is made thicker resulting in better mechanical stability.

Another means of providing mechanical stability to the barrier layer 110 is to chemically modify the barrier layer with one or more additive. In certain embodiments, the additive covalently cross-links the individual polymer molecules within the barrier layer 110, forming a nano-structured composite membrane. In particular embodiments, the barrier layer 110 can be described as a nano-structured composite. If the additive contains inorganic elements, the barrier layer 110 can be described as a nano-structured inorganic/organic composite. With respect to embodiments that comprise a porous support, it is most preferable that the chemical cross-linking include the porous support 112 to form a continuous membrane that has superior mechanical properties.

The cross-linking additive(s) can modify the transfer characteristics by selectively making the barrier more or less permeable to materials with an intermediate dipole moment. Generally, the lower the dipole moment of a liquid or gas substance the less permeable the membrane 110 is to the particular material. The cross-linking can be combined with additional polymer chemistry to effect changes to selectivity of the barrier. There are many different combinations of cross-linking and chemistries that are available for use.

Support 112

In one particular preferred embodiment, at least one membrane 110 comprises a layer of ionomeric organic-inorganic hybrid polymers optionally joined to at least one hydrophobic and/or hydrophilic support 112 that provides physical and/or chemical reinforcement for the membranes. In certain embodiments, the support 112 is absent. In certain embodiments, at least one support 112 is physically and/or chemically joined to at least one membrane(s) 110. In certain embodiments, the support 112 may be hydrophobic and/or hydrophilic, or any combination of these, depending on the specific requirements of the application and the desired goal.

In certain embodiments, it is preferable to add one or more support 112 in the form of a support layer or layers, which are preferably porous. These porous supports 112 can be of various substances which include hydrocarbon olefins, fluorocarbon olefins, $SiO_2$ (or other chemically similar amorphous substance) fiber, hydrocarbon olefin fiber, and metal oxides ceramics to name a few. The porous support 112 structures may be, including but not limited to woven, non-woven, fibrous, or fibrous voids created by the removal of a liquid or the conversion of a component from solid to gaseous form. If more than one support 112 is present typically these supports will have increasing pore size and differing porosity the further they are from the barrier layer 110. These porous supports 112 can be hydrophobic or hydrophilic depending on the material used in the layer. The support 112 can be mechanically bonded to the barrier layer 110 and to each other in the case of multiple support layers. Other joining techniques such as melt bonding and chemical cross-linking are also useful. The supports 112, in the form of support layers, can be placed on both sides of the barrier layer 110 totally encapsulating the electrolyte material. The encapsulated electrolyte architecture is particularly useful in gas-to-gas applications.

In certain embodiments, the porous supports 112 allow for the transfer of gas(es) across the supports. The porosity of a support 112 may vary from about 5%, about 10%, about 20%, about 30%, about 40%, about 50%, about 60%, about 70%, about 80%, about 90%, about 91%, about 92%, about 93%, about 94%, about 95%, about 96%, about 97%, about 98%, about 99%, or greater or any value therebetween. In one embodiment, the support 112 comprises silica, in another embodiment, the support 112 comprises polyethylene silica. These types of porous materials are available from companies such as W.L. Gore (such as microfiltration media membranes), the Daramic Corporation (polypropylene and polyethylene separators), and Sepro Membranes (microfiltration membrane PVDF-MFB).

The thickness of the nano-structured composite membrane may vary depending on whether the support 112 is utilized, as well as the number of supports and/or membranes 110 employed. Typically, the nano-structured composite membrane will vary in thickness from about 1 micron, about 5 microns, about 10 microns, about 20 microns, about 30 microns, about 40 microns, about 50 microns, about 60 microns, about 70 microns, about 80 microns, about 90 microns, about 100 microns, about 120 microns, about 130 microns, about 140 microns, about 150 microns, about 160 microns, about 170 microns, about 180 microns, about 190 microns, about 200 microns, about 210 microns, about 220 microns, about 230 microns, about 240 microns, about 250 microns, about 260 microns, about 270 microns, about 280 microns, about 290 microns, about 300 microns, about 350 microns, about 400 microns, about 500 microns, about 600 microns, about 700 microns, about 800 microns, about 900 microns, about 1000 microns, or any value therebetween or greater.

All crosslinking schemes apply generally to the sulfonated polymer, which forms the barrier layer. Additionally, certain crosslinking schemes such as the trimethoxysilane will also bond with the support turning the membrane into a single covalently bonded molecule. Bonding with the support also strengthens the membrane.

In one particular embodiment, the composition of the membrane 110 is as follows:
  11% silane (crosslinking agent)
  0.25% TV123
  0.25% Doverphos 613
  0.25% BNX 1010
  0.25% Benefos 1680
  0.1% Amical 48
  With the balance of the nano-structured membrane being sulfonated styrene-ethylene polymer.

The cross-linking schemes presented herein apply generally to a sulfonated polymer forming the barrier layer 110. However, certain cross-linking schemes, such as trimethoxysilane, will also bond with the support 112 to form a single covalently bonded molecule that includes both the membrane 110 and the support 112. Bonding the barrier layer 110 with the support 112 may strengthen the membrane 110.

This particular membrane was produced with a substrate from Daramic and ultraviolet-cured and thermal-cured before use.

Phase-Change Materials

Any gas and/or liquid may be utilized in the selective mass transfer systems disclosed herein. For example, for certain embodiments, phase change materials may include liquid and/or gaseous forms of the following water, ethanol, methanol, ammonia, and others. Certain of these phase change materials may release in the heating and/or cooling process liquids and/or gases that may be harmful to animals, including humans. Thus, certain of these phase-change materials would be used for heating and/or cooling non-habitat airspace (such as for cooling airspace containing electronic equipment).

The membrane 110 with or without one or more support 112 may be used in both direct contact systems and vacuum assist systems. The membrane 110 with or without one or more support 112 is referred to hereafter as the membrane 110/support 112 assembly.

Direct Contact

In direct contact systems, the first material flow 102 and the second material flow 104 are placed in direct contact with opposite surfaces 100a and 100b of the mass exchanger 100. The first material and the second material may include high-dipole moment liquids or gases. The first material may be the same as or different from the second material.

In particular aspects, one of the first material and the second material has a higher temperature than the other. For example, one of the first material and the second material may be heated to a higher temperature than the other material using any heating method known in the art. The higher temperature material may be placed in direct contact with the first surface 110a of the membrane 110 (or the barrier layer 110). By way of a non-limiting example, the mass exchanger 100 arrangement depicted in FIGS. 6 and 7 may be used. If the arrangement depicted in FIG. 6 is used, the first material flow 102 is heated to a higher temperature than the second material flow 104. If the arrangement depicted in FIG. 7 is used, the second material flow 104 is heated to a higher temperature than the first material flow 102.

The higher temperature material, which has a higher pressure than the lower temperature material, absorbs into the barrier layer 110 (membrane 110), permeates through the barrier layer, through one or more supports 112, if any are present, and exits the second surface 100b of the mass exchanger 100 into the other lower temperature material. This process transfers thermal energy from the higher temperature material to the lower temperature material (i.e., the high temperature material cools and the lower temperature material warms).

Without being limited by theory, if the higher temperature material is a liquid it is believed the higher temperature liquid undergoes a phase change into vapor at the barrier layer interface into the micro-porous support 112. The vapor within the support 112 diffuses therethrough and comes in contact with the lower temperature material. The difference in vapor pressure between the higher temperature liquid and the lower temperature material constitutes a difference in concentration across the membrane. Once in contact with the lower temperature material, the vapor may condense.

A direct contact system may be useful when the first material and the second material are both high-dipole moment liquids. For example, a direct contact system may be useful when both the first material and the second material are water based. The process is especially useful when the higher temperature material is brackish water, seawater, and the like.

Direct Contact Desalination

Brackish water, seawater, and the like contain dissolved solids including positive and negative ions. A majority portion of these ions may include sodium and chlorine ions. As mentioned above, the membrane 110 may be configured to allow molecular water to pass through but may prevent or block ions (such as salts) and other impurities from passing through. Without being limited by theory, it is believed the ions are absorbed with the water into the barrier layer 110, but are not converted into vapor at the interface between the barrier layer and the support 112. The result is that all dissolved solids, including ions such as salts, are left behind (i.e., not transported across the support 112) and only water diffuses through the support 112 and exits the second surface 100b of the mass exchanger 100.

An unexpected result using the membrane 110/support 112 assembly to pass a material (e.g., liquid, gas, and the like) while at the same time blocking the passage of ions contained in the material is that the membrane 110 also substantially prevents the formation of a precipitated dissolved ion barricade at the interface between the membrane 110 and the support 112. Without being limited by theory, it is believed that the membrane 110 limits the quantity of dissolved ions allowed to enter the membrane 110 thereby substantially preventing ions from concentrating at the interface between the membrane 110 and the support 112. In this manner, the formation of a precipitated ion barricade is avoided.

First Embodiment

For ease of illustration, the first material flow 102 is a flow of one of brackish water, seawater, and the like and the second material flow 104 is a flow of one of distilled water, deionized water, and the like. In particular aspects, the first material flow 102 is heated to a temperature greater than the second material flow 104, which may be unheated (e.g., the second material flow 102 may be at ambient temperature).

Figure 12:
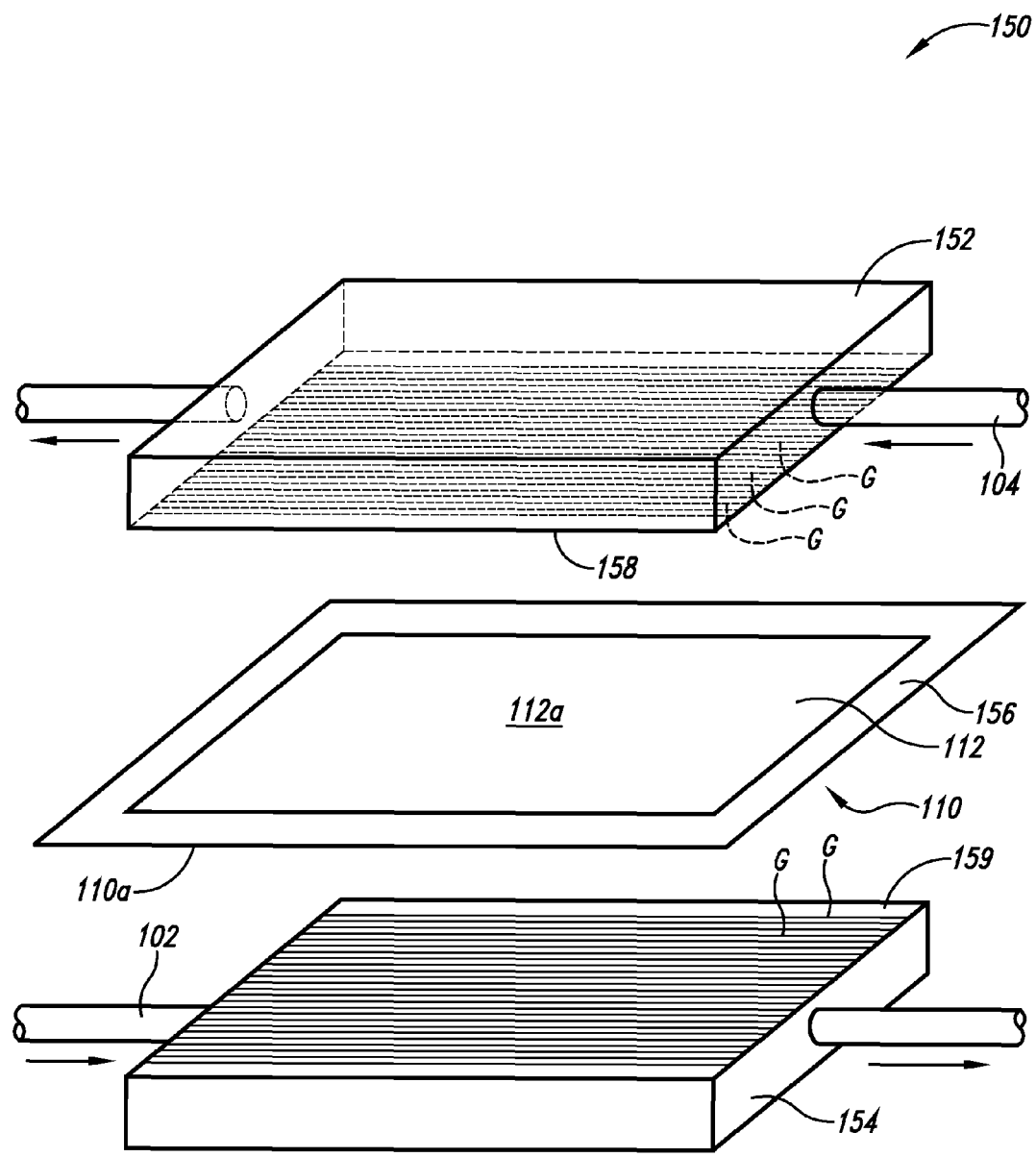
FIG. 12 is an exploded schematic view of an embodiment of a direct contact mass exchanger configured to extract distilled water from seawater.

A first embodiment of a direct contact counter flow mass exchanger 150 configured to desalinate the first material is depicted in FIG. 12. By way of a non-limiting example, the temperature of the first material and/or second material as it flows through the mass exchanger 150 may range from about 95° C. to about 10° C. In many embodiments, the temperature of the first material and/or second material as it flows through the mass exchanger 150 ranges from about 60° C. to about 30° C. As is apparent to those of ordinary skill in the art, the flow rates into, out of, and within the mass exchanger 150 may be a function of the design used to construct the mass exchanger 150. Because in many embodiments the thermal efficiency and electrical efficiency of the processes are scale independent, flow rates into, out of, and within many, if not all, embodiments of the mass exchanger 150 are scalable from a few liters per hour up to many cubic meters per hour.

The mass exchanger 150 includes the membrane 110/support 112 assembly. The first material flow 102 (e.g., heated seawater) is placed in direct contact with the first surface 110a of the membrane 110. The membrane 110/support 112 assembly includes a nano-composite semi-permeable membrane constructed in accordance with the present teachings. The membrane 110/support 112 assembly may include a single microporous support 112. In this embodiment, the membrane 110 is covalently cross-linked to itself and the support 112.

The mass exchanger 150 includes a first grooved Plexiglas plate 152 placed adjacent to the first surface 112a of the support 112 and a second grooved Plexiglas plate 154 placed adjacent to the first surface 110a of the membrane 110. One or more gasket 156, seal, o-ring seal, and the like is used to seal a perimeter portion 158 of the plate 152 against the membrane 110/support 112 assembly to allow the second material to flow through the grooves "G" formed in the plate 152 and contact the first surface 112a of the support 112. One or more gasket 156, seal, o-ring seal, and the like is used to seal a perimeter portion 159 of the plate 154 against the membrane 110/support 112 assembly to allow the first material to flow through the grooves "G" formed in the plate 154 and contact the first surface 110a of the membrane 112. In the embodiment depicted in FIG. 12, a dual o-ring is used to seal both the perimeter portion 158 of the plate 152 and the perimeter portion 159 of the plate 154 against the membrane 110/support 112 assembly. By way of a non-limiting example, the first surface 110a of the membrane 110 may have an area of about 0.035 m$^2$. The gasket 156 may help distribute the first material and the second material evenly over the surfaces 110a and 112a, respectively.

A heater (not shown), an additional heat exchanger (not shown), a combination thereof, and the like may be used to maintain a predetermined temperature of the first material and/or the second material.

Each plate 152 and 154 may be machined with any number of grooves "G" (e.g., 24 grooves), which function as distribution and collection plenums, and fitted with hose connectors (not shown). Each groove may be about 0.184 inches wide, about 0.150 inches deep, and have a cross-sectional area of about 0.028 inches$^2$.

The higher temperature first material is delivered to the plate 154 while the lower temperature second material is delivered to the plate 152 in a counter flow arrangement. By way of a non-limiting example, the first material may flow into the plate 154 at a rate of about 0.117 m/s and at a temperature of about 75° C. and the first material may flow out of the plate 154 at a rate of about 3.0 L/min and at a temperature of about 67° C. By way of a non-limiting example, the second material may flow into the plate 152 at a rate of about 0.076 m/s and at a temperature of about 38.4° C. and the first material may flow out of the plate 152 at a rate of about 2.0 L/min and at a temperature of about 43.1° C. In such an embodiment, vapor transfers through the membrane 110/support 112 assembly in proportion to a pressure difference across the membrane 110/support 112 assembly. A flux rate of about 9.2 kg H$_2$0/m$^2$/hr may be achieved if a 32° C. average temperature difference exits between the higher temperature first material and lower temperature second material and the higher temperature first material has a level of salinity of approximately 3% by weight which can also be expressed in part per million ("ppm"). If the higher temperature first material has a level of salinity of approximately 11% by weight, under the same thermal conditions, a flux rate of about 6.2 kg H$_2$O/m$^2$/hr may be achieved.

The ability of the mass exchanger 150 to discriminate between water molecules and molecules of salt or other contaminants was determined for samples of the second material processed by the mass exchanger 150 using the following method. A dry sample dish was weighed initially to get a base weight. A quantity of the second material processed by the mass exchanger 150 was added to the sample dish and the sample dish and the processed second material were weighed. The sample dish was then placed on a hot plate to allow the processed second material to evaporate. After the processed second material evaporated, the sample dish was weighed again. If the second material in the dish contained dissolved solids they were left behind during the evaporation. Using this method, it was determined the sample dish weighed the same before and after the sample of second material was added. The scale used to weigh the sample dish during the measurement was accurate to 0.0001 gram or 10 ppm. Since the weight of the sample dish did not change, the second material did not contain dissolved solids (e.g., salt) such as other low molecular weight organic materials, inorganic materials, and the like at a level equal to or above 10 ppm.

Scanning electron microscopy images of the membrane 110/support 112 assembly revealed no salt deposits within the hydrophobic micro-porous membrane support 112. SEM/EDAX analysis of a selected point on the membrane 110 showed the presence of low levels of Na and Cl within the nano-structured barrier layer. The membrane 110 (e.g., the sulphonated ionomer, the electrolyte) may absorb ions at least to a limited extent. This absorption converts the membrane 110 (e.g., a cation exchange polymer) into whatever ion form that makes up the majority of the ions absorbed. The ion form may be proportional to the types of ions absorbed. In this embodiment, the barrier layer 110 electrolyte is in sodium ion form due to contact with the seawater. SEM/EDAX analysis of a selected point on the support 112 showed very low residual presence of sodium and Cl within the support 112. In fact, these materials were present at a level within the background level of the microporous material used to construct the support 112.

Second Embodiment

Direct contact desalination may be conducted using the plate-style mass exchanger 130 depicted in FIG. 10. By way of a non-limiting example, the temperature of the first material and/or second material as it flows through the mass exchanger 130 may range from about 95° C. to about 10° C. In many embodiments, the temperature of the first material and/or second material as it flows through the mass exchanger 130 ranges from about 60° C. to about 30° C. As is apparent to those of ordinary skill in the art, the flow rates into, out of, and within the mass exchanger 130 may be a function of the design used to construct the mass exchanger 130. Because in many embodiments the thermal efficiency and electrical efficiency of the processes are scale independent, flow rates into, out of, and within many, if not all, embodiments of the mass exchanger 130 are scalable from a few liters per hour up to many cubic meters per hour.

The plates 132 and 134 may be constructed by machining ABS plastic sheets to form plenums and membrane liquid disbursement fields called flow fields. The ABS flow fields are sealed against the membrane 110/support 112 assembly using compression surfaces built into the flow field. There are two plate types, one corresponding to the saline solution (first material) and one corresponding to the 'distilled' solution (second material) sides of the membrane 110/support 112 assembly, which may be referred to as a saline or salt water plate, and a distillate or clean water plate. The design of the mass exchanger 130 seals the membrane 110/support 112 assembly between the plates 132 and 134. The plates 132 and 134 may be bolted together. Spacers between the plates 132 and 134 position the inside surfaces of the plates into a predetermined proximity with one another. The mass exchanger 130 may be disassembled for cleaning, to replace the membrane 110/support 112 assembly, and the like.

The moisture exchange occurs across the membrane 110/support 112 assembly as the warm seawater and colder distilled flow are guided across the surfaces of the membrane 110/support 112 assembly in a counter-flow arrangement. The water flows are fed from plenums that communicate water between layers without mixing seawater and distilled water. The condensate forms in the distilled water flow, causing its flow rate and the temperature to increase.

By way of a non-limiting example, about ten plates and nine membrane 110/support 112 assemblies may be assembled into a single stacked mass exchanger (not shown) by stacking together of a plurality of the mass exchangers 130 so that in an alternating fashion an instance of the first material plate 132 is positioned in juxtaposition with an instance of the second material plate 134 (with an instance of the membrane 110/support 112 assembly positioned therebetween), which is positioned in juxtaposition with another instance of the first material plate 132 (with another instance of the membrane positioned therebetween) and so on. If such a stacked mass exchanger is used, it may produce distilled water from salt water at any desired rate. In particular embodiments, the rate may be about 1.728 L/hr.

The flux through the membrane 110/support 112 assembly is the product of the area of membrane 110 within the mass exchanger 130 and the average moisture flux per unit area. The moisture flux per unit area is a function of the difference in vapor pressure (density difference) between the first surface 110a and the first surface 112a of the membrane 110/support 112 assembly. The difference in vapor pressure may be determined by the temperature difference between the first material and the second material on opposite sides of the membrane 110/support 112 assembly.

Third Embodiment

A direct contact desalination process will now be described with respect to FIG. 6. For ease of illustration, the first material flow 102 is a flow of one of brackish water, seawater, and the like and the second material flow 104 is a flow of one of distilled water, deionized water, and the like. The first material flow 102 is heated to a temperature greater than the second material flow 104, which may be unheated (e.g., the second material flow 102 may be at ambient temperature).

The first material flow 102 (e.g., heated seawater) is placed in direct contact with the first surface 110a of the membrane 110 (i.e., the first surface 110a of the membrane 110). The mass exchanger 100 depicted in FIG. 6 includes a single support 112; however, as is apparent to those of ordinary skill in the art, other configurations of membrane 110 and support 112, including the additional of one or more additional supports, may be used and are within the scope of the present teachings. The second material flow 104 (e.g., unheated distilled water) is placed in contact with the second surface 100b of the mass exchanger 100 (i.e., the first surface 112a of the support 112). A portion of the first material in the form of a gas (e.g., water vapor) transfers across the membrane 110 and the support 112 to joining with the cooler second material (e.g., distilled water).

The membrane 110 may be arranged within a housing (not shown). The membrane 110 may be arranged inside the housing in any manner suitable for effecting contact between the first material and the first surface 100a of the mass exchanger 100 and effecting contact between the second material and the second surface 100b of the mass exchanger 100. Arranging the membrane prismatically, as depicted in FIG. 10, within the housing places large areas of the first surface 100a in contact with the higher temperature first material (e.g., seawater) and the second surface 100b in contact with the lower temperature second material (e.g., distilled water).

Figure 13:
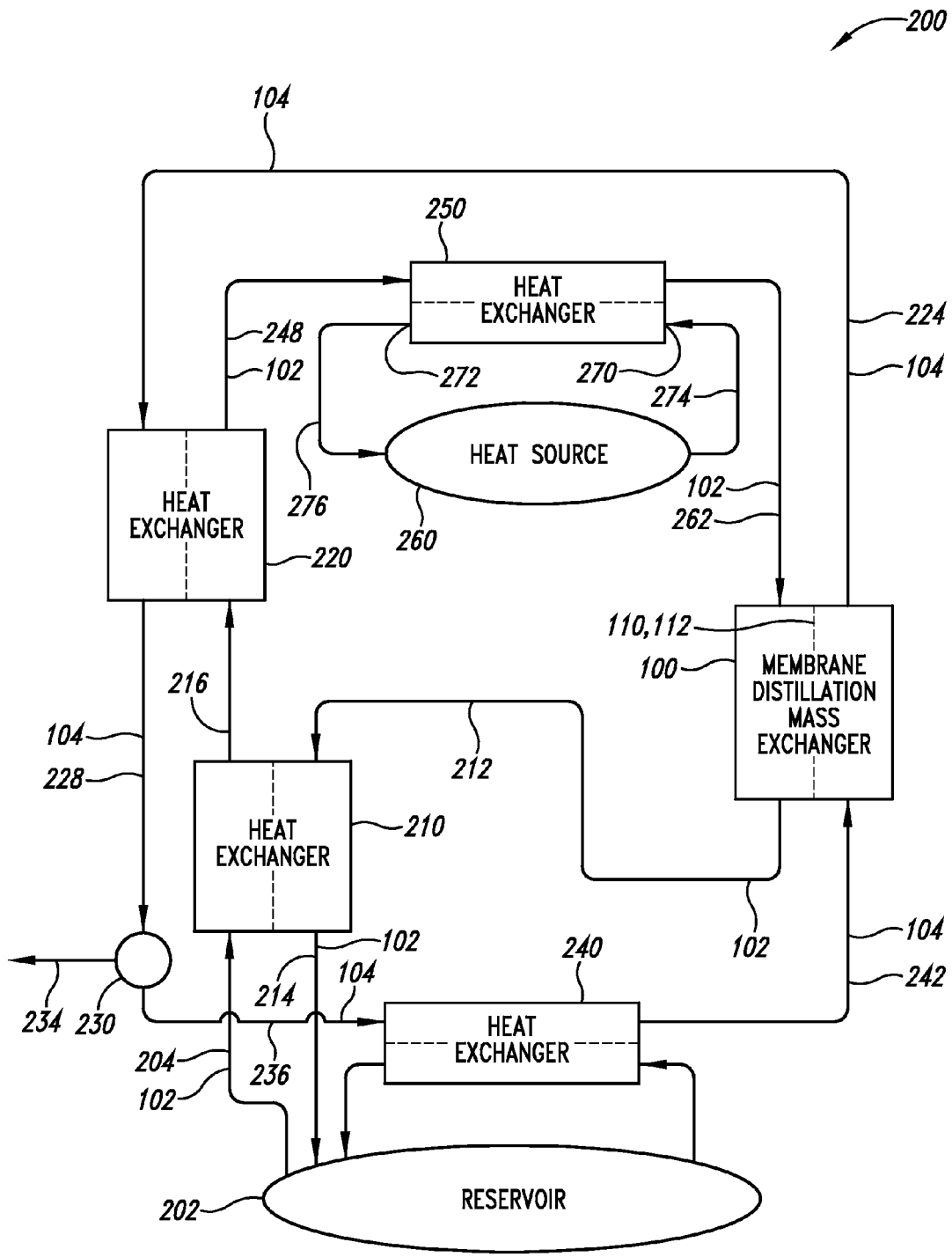
FIG. 13 is a schematic view of an embodiment of a system incorporating a direct contact mass exchanger configured to extract distilled water from seawater.

Referring to FIG. 13, an exemplary system 200 configured to perform direct contact desalination will now be described. By way of a non-limiting example, the temperature of the first material and/or second material as it flows through the system 200 may range from about 95° C. to about 10° C. In many embodiments, the temperature of the first material and/or second material as it flows through the system 200 ranges from about 60° C. to about 30° C. As is apparent to those of ordinary skill in the art, the flow rates into, out of, and within the system 200 may be a function of the design used to construct the system 200. Because in many embodiments the thermal efficiency and electrical efficiency of the processes are scale independent, flow rates into, out of, and within many, if not all, embodiments of the system 200 are scalable from a few liters per hour up to many cubic meters per hour.

The system 200 includes the mass exchanger 100, which is used to process the first material flow 102 and the second material flow 104. Both the first material flow 102 and the second material flow 104 are conducted through a series of conduits, as used to describe structures other than the selective transfer paths of the membrane, include channels, pipes, ducts, and the like that couple the various components of the system 200 together. Further, as appropriate pumps and valves may be incorporated to maintain and regulate flow through the conduits and other components of the system 200.

The first material used to create the first material flow 102 is provided by a reservoir 202. For the purposes of illustration, it is assumed the first material is seawater having a temperature of about 15° C. inside the reservoir 202. The first material flows from the reservoir 202 through a conduit 204, to a first heat exchanger 210.

At least a portion of the heated first material flow 102 does not pass through the support 112 to join with the second material flow 104. This portion may include a greater concentration of dissolved solids (such as ions) than the first material in the reservoir 202. The portion that did not pass through the support 112 to join with the second material flow 104 flows through a conduit 212 into the first heat exchanger 210. The temperature of the portion flowed through the conduit 212 may be greater than the temperature of the first material in the conduit 204. Therefore, the first heat exchanger 210 may use the excess thermal energy of the portion of the first material in the conduit 212 to heat the first material flow 102 in the conduit 204. The portion of the first material in the conduit 212 passes through the first heat exchanger 210 and into a conduit 214 that returns the first material to the reservoir 202.

By way of a non-limiting example, the temperature of the first material in the conduit 212 may be about 23° C. Using the thermal energy of the first material in the conduit 212, the first heat exchanger 210 may heat the first material flow 102 in the conduit 204 to about 22° C.

The first heat exchanger 210 may include any suitable heat exchanger known in the art including but not limited to shell and tube heat exchangers, tube and tube heat exchangers, plate heat exchangers, cylindrical heat exchangers, plate-fin heat exchangers, and the like.

Alternatively, the first heat exchanger 210 and the conduit 214 may be omitted and the conduit 212 may return the first material exiting the mass exchanger 100 to the reservoir 202 where the returned first material simply transfers its thermal energy to the bulk first material thereby increasing the temperature of the first material in the reservoir 202. However, if the reservoir 202 is sufficiently large, the temperature increase may be negligible.

The portion of the first material in the conduit 204 passes through the first heat exchanger 210 and into a conduit 216. Optionally, the system 200 includes a second heat exchanger 220. As explained above, as the heated first material flow 102 flows through the mass exchanger 100, thermal energy is transferred to the second material flow 104. In some cases, after the second material flow 104 leaves the mass exchanger 100 through a conduit 224, the temperature of the second material flow 104 in the conduit 224 will be greater than the temperature of the first material in the conduit 216, or if the first heat exchanger 210 is omitted, in the reservoir 202. Therefore, the second heat exchanger 220 may use the thermal energy of the second material flow 104 in the conduit 224 to heat the first material in the conduit 216 or the first material exiting the reservoir 202 via the conduit 204. By way of a non-limiting example, the temperature of the first material in the conduit 216 may be about 22° C. Using the thermal energy of the second material in the conduit 224, the second heat exchanger 220 may heat the first material flow 102 in the conduit 216 to about 48° C.

The portion of the second material in the conduit 224 passes through the second heat exchanger 220 and into a conduit 228 that conducts the second material to a valve 230. The valve 230 directs a first portion of the second material into a conduit 234 and a second portion into to a conduit 236. The first portion in the conduit 234 is conducted outside the system 200. By way of a non-limiting example, the first portion may be conducted to a reservoir (not shown), a municipal water system, an office building, a household, and the like.

Optionally, the second portion of the second material in the conduit 236 is conducted to a third heat exchanger 240. The second material in the conduit 236 may have a temperature greater than the temperature of the bulk first material in the reservoir 202. Therefore, the second material in the conduit 236 may transfer some of its thermal energy to the bulk first material in the reservoir 202 thereby cooling the second material in the conduit 236 before the second material in the conduit 236 enters the mass exchanger 100 through a conduit 242. By way of a non-limiting example, the temperature of the second material in the conduit 236 may be about 27° C. By transferring some of the thermal energy of the second material in the conduit 236 to the first material in the reservoir 202, the first heat exchanger 240 may cool the second material flow 104 in the conduit 236 to about 17° C. before it enters the mass exchanger 100 through the conduit 242.

By way of a non-limiting example, the temperature of the second material in the conduit 224 may be about 53° C. Using the thermal energy of the second material in the conduit 224, the second heat exchanger 220 may heat the first material flow 102 in the conduit 216 to about 48° C. and cool the second material flow 104 in the conduit 224 to about 27° C.

The second heat exchanger 220 may include any suitable heat exchanger known in the art including but not limited to shell and tube heat exchangers, tube and tube heat exchangers, plate heat exchangers, cylindrical heat exchangers, plate-fin heat exchangers, and the like.

The portion of the first material in the conduit 216 passes through the second heat exchanger 220 and into a conduit 248 that conducts the second material to a fourth heat exchanger 250 coupled to a heat source 260. By way of a non-limiting example, the fourth heat exchanger 250 may heat the first material flow 102 in the conduit 248 to about 59° C. before the first material flow 102 is routed into the heat exchanger 100 by a conduit 262 exiting the fourth heat exchanger 250. The fourth heat exchanger 250 may include any suitable heat exchanger known in the art including but not limited to shell and tube heat exchangers, tube and tube heat exchangers, plate heat exchangers, cylindrical heat exchangers, plate-fin heat exchangers, and the like.

The heat source 260 may supply a heated material (e.g., liquid, gas, etc.) to the fourth heat exchanger 250. The heat source 260 may be coupled to an inlet 270 and an outlet 272 of the fourth heat exchanger 250 by conduits 274 and 276, respectively. The heated material flows from the heat source 260 through the conduit 274 into the inlet 270 of the fourth heat exchanger 250, passes through the fourth heat exchanger 250, exits the fourth heat exchanger 250 through the outlet 272, enters the conduit 276, and returns to the heat source 260. By way of a non-limiting example, the temperature of the first material in the conduit 248 may be about 48° C. Using the thermal energy of the heated material entering the fourth heat exchanger 250 through the conduit 274, the fourth heat exchanger 250 may heat the first material flow 102 in the conduit 248 to about 59° C. before it enters the mass exchanger 100 through the conduit 262. The heat source 260 may include any suitable heat source known in the art including heated water, such as water used to remove excess heat from a power generation process, hot gases exiting an incinerator or other industrial process, and the like. The heat source 260 may include new sources of high-grade heat, sources of low-grade waste heat that would otherwise be lost to the environment, combinations thereof, and the like.

As is apparent to those of ordinary skill in the art, additional heat exchangers can be added to the system 200 to control the temperature of the first material and the second material within the conduits. Further, additional heat exchangers can be added as appropriate to maintain a substantially constant temperature differential between the first material and the second material across the membrane 110 of the mass exchanger 100. As discussed above, an adequate temperature differential between the first material and the second material will cause the first material to permeate through the barrier layer 110 and the support 112 to join with the second material.

Vacuum Assist

Figure 14:
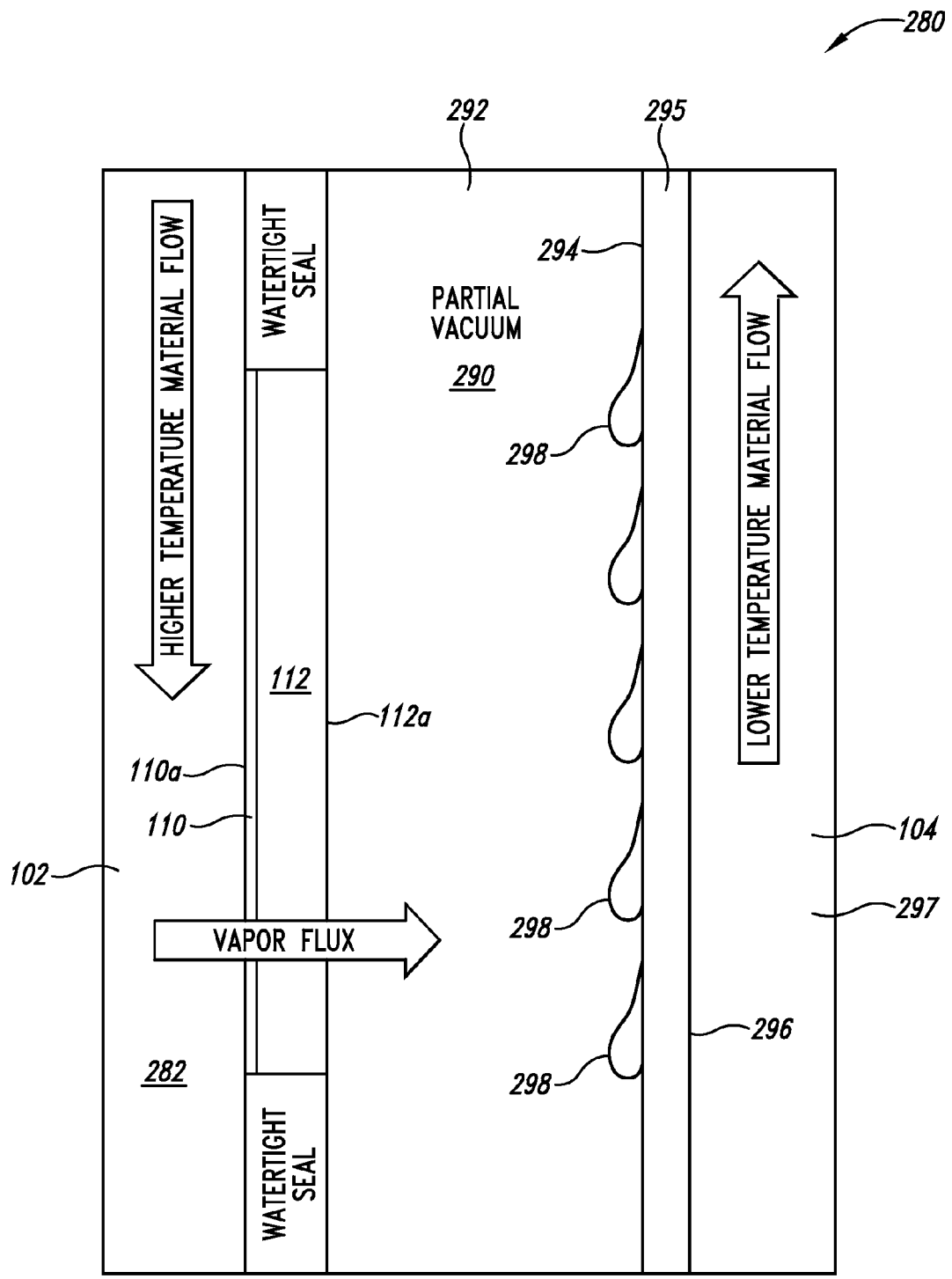
FIG. 14 is a schematic view of a vacuum assist mass exchanger including an evaporator and a condensation surface.

Referring to FIG. 14, in a vacuum assist system, the membrane 110/support 112 assembly is incorporated into a component of the mass exchanger 100 referred to as an evaporator 280. Similar to the direct contact system described above, in a vacuum assist system the higher temperature material flows through a chamber 282 and is in contact with the first surface 110a of the membrane 110; however, the lower temperature material is not placed in contact with the first surface 112a of the support 112. Instead, a partial vacuum 290 is created adjacent the first surface 112a of the support 112. The higher temperature material has a higher pressure than the partial vacuum 290, which is a lower pressure region adjacent to the first surface 112a of the support 112.

The partial vacuum 290 provides a lower vapor pressure adjacent to the first surface 112a than the vapor pressure provided by the lower temperature material of the direct contact system above. In the direct contact process, the difference in vapor pressure between the higher temperature liquid and the lower temperature material constitutes a difference in concentration across the membrane 110 and the support 112. Relative to the direct contact process described above, the concentration difference between the first surface 110a of the membrane 110 and the first surface 112a of the support 112 used in the vacuum assist process is much larger. The larger concentration difference may cause a substantially higher transmission rate of certain components of the first material (e.g., high-dipole moment liquids or gases) across the membrane 110 and the support 112. In other words, the flux rate may be greater because the lower vapor pressure of the partial vacuum offers less opposition to the higher temperature material's exit from the support 112 and may allow a higher transfer rate across the membrane 110 and the support 112.

The partial vacuum 290 is formed with in a chamber 292 defined between the first surface 112a of the support 112 and a sidewall 295 of the chamber 292. The vapor that passes through the membrane 110 and the support 112 condenses on a condensation surface 294 spaced from the first surface 112a of the support 112. In the embodiment depicted in FIG. 14, the condensation surface 294 is an inside surface of the sidewall 295 of the chamber 292. The sidewall 295 of the chamber 292 may also function as a sidewall of a chamber 297 through which the lower temperature material flows. The lower temperature material in the chamber 297 is in direct contact with an outside surface 296 of the sidewall 295. The flow of the lower temperature material within the chamber 297 cools the sidewall 295 and its inner condensation surface 294 causing the higher temperature vapor transported across the membrane 110 and the support 112 to condense into a liquid 298 on the condensation surface 294.

Instead of using the flow of lower temperature material to cool the condensation surface 294, an alternate cooling method such as radiant cooling, thermoelectric cooling, and the like may be used. By way of another example, the higher temperature vapor may be transported to a condensation chamber external to the evaporator 280 where the vapor is condensed. By way of yet another example, the sidewall 295 may be omitted and the partial vacuum 290 formed between the first surface 112a and the surface of the lower temperature material. In such embodiments, the higher temperature vapor transported across the membrane 110 and the support 112 condenses on the surface of the lower temperature material.

Vacuum Assist Desalination

Exemplary embodiments of vacuum assist desalination processes and systems are provided below. For ease of illustration, in these embodiments, the first material is one of brackish water, seawater, and the like and the second material is of one of desalinated water, distilled water, deionized water, and the like. The first material is the higher temperature material and may be heated to a temperature greater than its initial temperature, which may have been ambient temperature. When the first material is seawater, heated seawater may be received from a source of above ambient temperature seawater such as from a steam condenser of an electric power plant. The ambient temperature of seawater may be about 28° C. The steam condenser of an electric power plant heats seawater and discharges the heated seawater at about 45° C. The first material may be pumped into the desalination system by a pump 170 (see e.g., FIG. 15), such as a saline pump.

Each of the exemplary embodiments includes at least one evaporator. The evaporator includes the membrane 110 and/or the support 112 and may be constructed in accordance with the evaporator 280 (see FIG. 14) described above. The evaporator may include a single support 112; however, as is apparent to those of ordinary skill in the art, other configurations of the membrane 110 and the support 112, including more than one support, may be used and are within the scope of the present teachings.

Within the evaporator, the first material flow 102 (e.g., heated seawater) is placed in direct contact with the first surface 110a of the membrane 110. A portion of the first material in the form of a gas or vapor (e.g., water vapor) transfers across the membrane 110/support 112 assembly to produce the second material (e.g., desalinated water). Optionally, the gas or vapor may condense into the liquid 298 (e.g., distilled water) on the condensation surface 294.

The components of the evaporator may be arranged within a housing in any manner suitable for effecting contact between the first material and the first surface 110a of the membrane 110 and effecting the partial vacuum 290 between the first surface 112a of the support 112 and the sidewall 295. By way of a non-limiting example, the evaporator may include a housing and the membrane 110/support 112 assembly may be arranged prismatically (see FIG. 10) within the housing.

By way of a non-limiting example, the temperature of the first material and/or second material as it flows through exemplary embodiments may range from about 95° C. to about 10° C. In many embodiments, the temperature of the first material and/or second material ranges from about 60° C. to about 30° C. As is apparent to those of ordinary skill in the art, the flow rates into, out of, and within the exemplary embodiments may be a function of the design used to construct the embodiment. Because in many embodiments the thermal efficiency and electrical efficiency of the processes are scale independent, flow rates into, out of, and within many, if not all, embodiments are scalable from a few liters per hour up to many cubic meters per hour.

First Embodiment

A vacuum assist desalination system 300 and related process will now be described with respect to FIG. 15. The system 300 includes a mass exchanger 100 that includes an evaporator 310. A conduit 302 transports the higher temperature first material to the evaporator 310 of the mass exchanger 100. By way of a non-limiting example, the temperature of the first material in the conduit 302 may be about 45° C. By way of a further non-limiting example, the flow rate of the first material in the conduit 302 may be about 5 m$^3$/hr. The higher temperature first material exits the evaporator 310 through a conduit 308. By way of a non-limiting example, the temperature of the first material in the conduit 308 may be about 20° C. As is apparent to those of ordinary skill, the temperature of the higher temperature first material passing through the evaporator 310 is reduced by the evaporation process occurring inside the evaporator 310.

A closed loop of conduits may be used to transport the lower temperature material to and from the mass exchanger 100. For example, a conduit 304 transports the lower temperature first material to the mass exchanger 100 and a conduit 306 transports the lower temperature first material from the mass exchanger 100. The lower temperature material may reside within a reservoir (not shown) that is substantially similar to the reservoir 202 (see FIG. 13, which supplies the first material to the conduit 304 and receives the discharged first material from the conduit 306. By way of a non-limiting example, the temperature of the first material in the conduit 304 may be about 28° C. and the temperature of the first material in the conduit 306 may be about 31° C. By way of a further non-limiting example, the flow rate of the first material in the conduit 304 may be about 15 m$^3$/hr and the flow rate of the first material in the conduit 306 may be about 19.63 m$^3$/hr.

Figure 15:
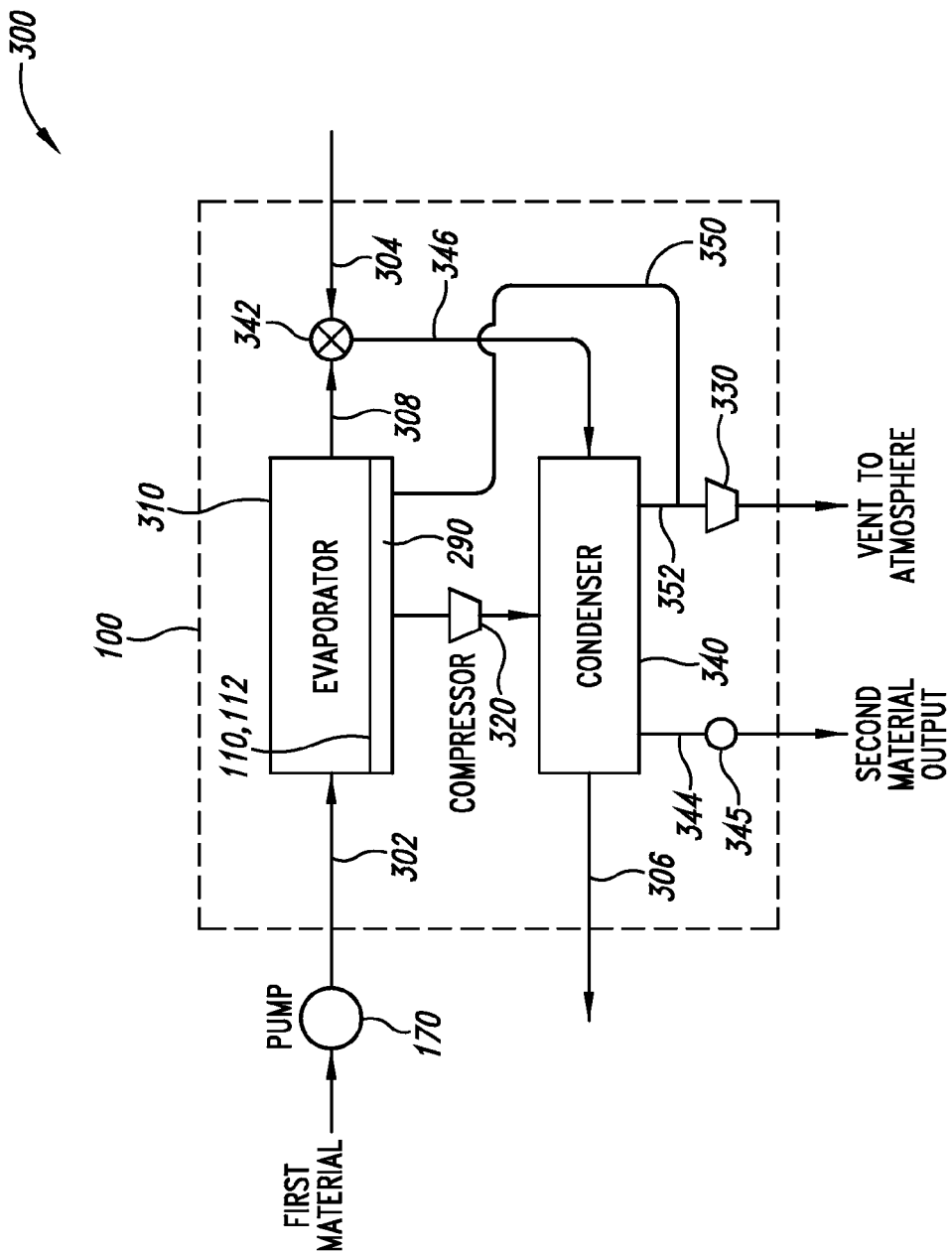
FIG. 15 is a schematic view of a first embodiment of a system incorporating a vacuum assist mass exchanger configured to extract distilled water from seawater.

While in the embodiment depicted in FIG. 15, the first material (e.g., seawater) is used as the lower temperature material, those of ordinary skill in the art appreciate that through the application of ordinary skill to the teaches provided herein, the system 300 could be modified to use the second material or a third material that differs from both the first material and the second material as the lower temperature material.

In addition to the evaporator 310, the mass exchanger 100 includes a vapor compressor 320, a vacuum pump 330, and a condenser 340. The vapor compressor 320 is coupled between the evaporator 310 and the condenser 340 and is operable to transfer the second material extracted from the first material from the evaporator 310 to the condenser 340.

The vapor compressor 320 and the vacuum pump 330 together create and maintain the partial vacuum 290 (see FIG. 14) within the evaporator 310. The compressor 320 captures or gathers the vapor or gas (e.g., low temperature steam) that passed through the membrane 110 and the support 112, and modifies or homogenizes the saturation temperature of the gas to a mean temperature of the vapor entering the partial vacuum 290. In other words, the compressor 320 mixes the second material (e.g., steam) extracted from the first material (e.g., heated brine or seawater). This mixing produces a mean temperature for the second material. As the first material passes through the evaporator 310, the first material cools. Therefore, a greater amount of the second material is extracted from a portion of the first material located nearer the conduit 302 than is extracted from a portion of the first material located nearer the conduit 308. The mean temperature is the result of the higher temperature first material contributing a greater mass of the second material than the colder first material, assuming a common partial vacuum level and substantially equivalent membrane areas for the respective water temperatures.

By way of a non-limiting example, the average temperature within the evaporator 310 may be about 32.5° C. In this manner, the vapor compressor 320 modifies the captured vapor's saturation temperature so that the vapor will condense against a condensation surface 294 (see FIG. 14) inside the condenser 340.

In the implementation depicted in FIG. 15, the condenser 340 is contained within a separate housing from the evaporator 310, however, this is not a requirement. Alternatively, the condenser 340 may be incorporated within the evaporator 310. For example, the condenser 340 may reside within a chamber (not shown) of the evaporator 310.

The condenser 340 receives the lower temperature first material (e.g., seawater) from the conduit 304. In the embodiment depicted, the conduit 304 may be coupled to a valve 342 that regulates the flow of the lower temperature first material into a conduit 346 that is coupled to the condenser 340. Optionally, the condenser 340 may receive the lower temperature first material (e.g., seawater) exiting the evaporator 310 through the conduit 308. The conduit 308 may be coupled to the valve 342, which may mix the first material received from the evaporator 310 with the first material received from the conduit 304. By way of non-limiting example, when the first material exiting the evaporator 310 in the conduit 308 has a temperature of about 20° C., and the first material in the conduit 302, received from the reservoir 202 has a temperature of about 28° C.; the mix in the conduit 346 may have a temperature of about 26° C.

The lower temperature first material may be used to absorb thermal energy from the condenser 340 for the purposes of maintaining the condensation surface 294 (see FIG. 14) at an appropriate temperature cool enough to condense the vapor. The condensation surface 294 of the condenser 340 has a temperature equal to or less than the vapor's saturation temperature. The second material condensed inside the condenser 340 exits the condenser 340 through a conduit 344. By way of a non-limiting example, the flow rate of the second material in the conduit 344 may be about 0.184 m³/hr. Optionally, the conduit 344 may be coupled to a pump 345 that may regulate the flow rate in the conduit 344. The pump 345 may be further operable to assist the vacuum pump 330 in regulating the pressure inside the condenser 340.

The pressure within the condenser 340 may be lower than that within the evaporator 310, allowing the compressor 320 to do little actual work and consume less electrical energy. In other words, the pressure differential between the evaporator 310 and the condenser 340 may cause the vapor in the evaporator 310 to flow into the condenser 340 without much, if any, assistance from the compressor 320. Therefore, the compressor 320 may simply homogenize the vapor temperature and direct the vapor into the condenser 340.

The vacuum pump 330 may be coupled to the evaporator 310 by a conduit 350 through which the pump provides at least a portion of the partial vacuum 290 to the evaporator 310. The vacuum pump 330 may also be coupled to the condenser 340 by a conduit 352. The vacuum pump 330 is operable to maintain a desirable pressure inside the condenser 340, which may include a lower pressure than the pressure inside the evaporator 310. As is apparent to those of ordinary skill, the conduit 350, the conduit 352, and other conduits within the system 300 may include valves configured to regulate flow therethrough. While in the embodiment of system 300 depicted in the drawings, the single vacuum pump 330 is used to supply vacuum pressure to both the evaporator 310 and the condenser 340, those of ordinary skill in the art appreciate that through application of ordinary skill in the art to the present teachings more than one pump may be used. The vacuum pump 330 may include a vent that vents into the environment.

Because the system 300 may discharge the first material at a temperature below ambient (e.g., 28° C.) from the evaporator 310 (e.g., shown as 20° C.), more than 100% of the energy of the higher temperature first material may be captured (e.g., 145% may be captured). If properly constructed, the system 300 may capture up to about 145% or more of the thermal energy added to seawater by the power plant condenser, which may be considered both electrically and thermally efficient.

Second Embodiment

Figure 16:
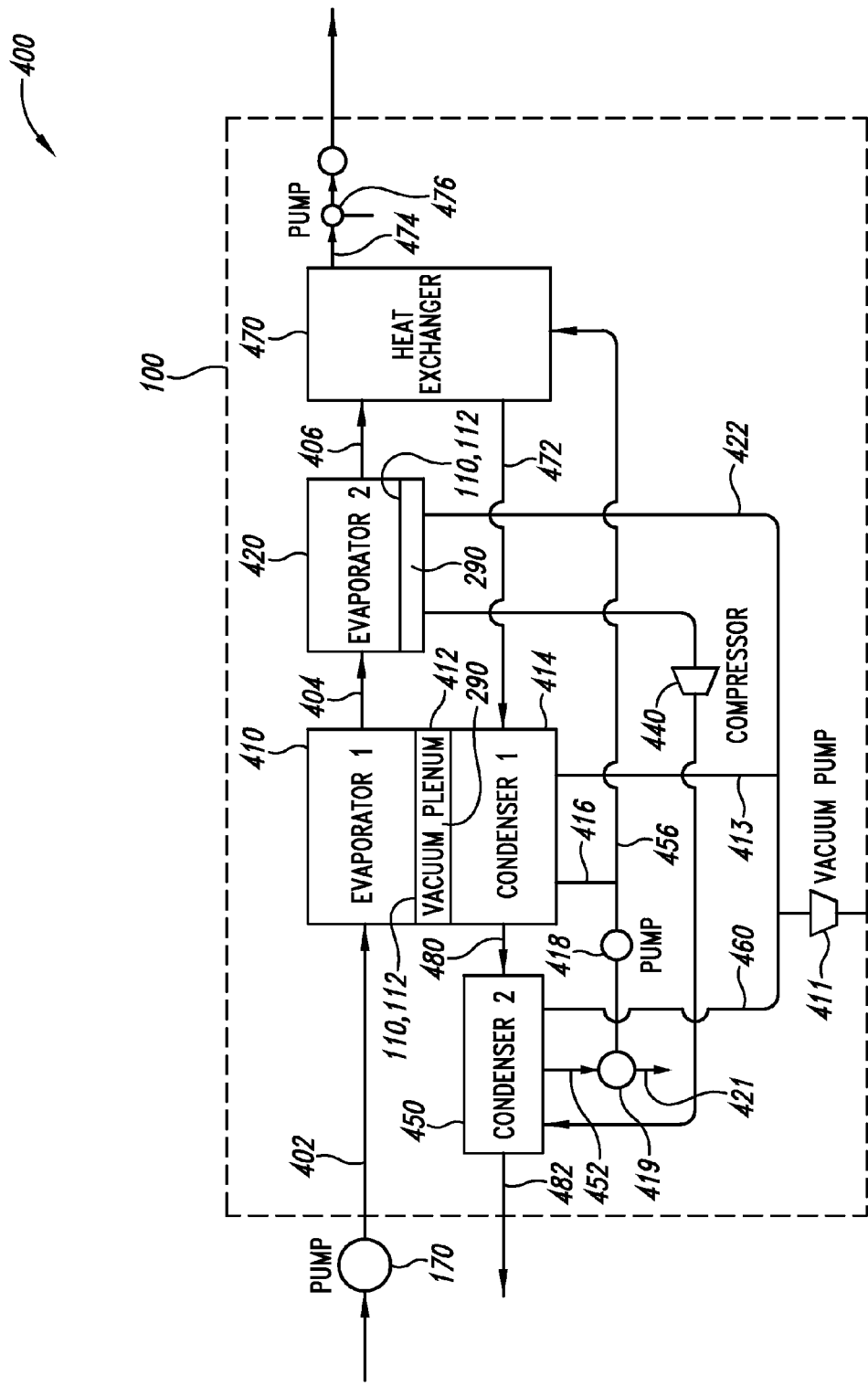
FIG. 16 is a schematic view of a second embodiment of a system incorporating a vacuum assist mass exchanger having a pair of evaporators arranged in series configured to extract distilled water from seawater.

A vacuum assist desalination system 400 and related process will now be described with respect to FIG. 16. The system 400 includes a mass exchanger 100 that includes serially arranged evaporators 410 and 420. A conduit 402 transports the higher temperature first material to the first evaporator 410 of the mass exchanger 100. By way of a non-limiting example, the temperature of the first material in the conduit 402 may be about 45° C. By way of a further non-limiting example, the flow rate of the first material in the conduit 402 may be about 5 m³/hr.

The higher temperature first material exits the first evaporator 410 and enters the second evaporator 420 through a conduit 404. By way of a non-limiting example, the temperature of the first material in the conduit 404 may be about 32° C. As is apparent to those of ordinary skill, the temperature of the higher temperature first material passing through the first evaporator 410 is reduced by the evaporation process occurring inside the evaporator 410.

The higher temperature first material exits the second evaporator 420 through a conduit 406. By way of a non-limiting example, the temperature of the first material in the conduit 406 may be about 30° C. As is apparent to those of ordinary skill, the temperature of the higher temperature first material passing through the second evaporator 420 is reduced by the evaporation process occurring inside the evaporator 420.

The evaporator 410 may be constructed using any suitable evaporator disclosed herein including without limitation the evaporator 280 and the evaporator 310. In the embodiment depicted, the evaporator 410 includes a vacuum plenum 412 flanked by a condenser 414 and the membrane 110/support 112 assembly. The vacuum plenum 412 includes the partial vacuum 290 which is created and maintained by a vacuum pump 411 coupled to the evaporator 410 by a conduit 413. The vacuum pump 411 may include a vent that vents into the environment.

The vapor passing through the membrane 110/support 112 assembly traverses the vacuum plenum 412 and enters the condenser 414 where the vapor is condensed into the second material. The second material exits the condenser 414 through a conduit 416, which may optionally be coupled to a pump 418.

The evaporator 420 may be constructed using any suitable evaporator disclosed herein including without limitation the evaporator 280, the evaporator 310, and the evaporator 410. In the embodiment depicted, the evaporator 420 is substantially similar to the evaporator 310. The vacuum pump 411 is coupled to the evaporator 420 by a conduit 422. The vacuum pump 411 is operable to maintain a partial vacuum 290 inside the evaporator 420 as well as the evaporator 410. Alternatively, separate vacuum pumps may be used to maintain the partial vacuums 290 inside the evaporator 420 and the evaporator 410.

The evaporator 420 is coupled to a compressor 440 substantially similar to the compressor 320 (see FIG. 15) that conducts the second material passing through the membrane 110/support 112 assembly of the evaporator 420 (in vapor phase) to an external condenser 450. Inside the condenser 450, the second material is condensed into a liquid that exits the condenser 450 through a conduit 452. The conduit 452 may be coupled to a valve 419 and the pump 418. A conduit 421 may be coupled to the valve 419. The valve 419 may regulate a first amount of the second material exiting the condenser 450 that flows into the pump 418 and a second amount of the second material exiting the condenser 450 that flows into the conduit 421. The conduit 421 transfers the second material outside the mass exchanger 100 of the system 400. The pump 418 may pump the first amount of the second material through a conduit 456.

The vacuum pump 411 is coupled to the condenser 450 by a conduit 460. The vacuum pump 411 may be used to maintain a predetermined pressure inside the condenser 450. For example, the pump 411 may be used to maintain the pressure inside the condenser 450 below the pressure inside the evaporator 420.

The conduit 456 is coupled to a heat exchanger 470. The second material in the conduit 456 is pumped by the pump 418 into the heat exchanger 470. The higher temperature first material in the conduit 406 flows into the heat exchanger 470 where thermal energy from the second material in the conduit 456 is transferred to the first material in the conduit 406.

The second material exits the heat exchanger 470 through a conduit 474. A pump 476 may be coupled to the conduit 474 and used to pump the second material from the heat exchanger 470. By way of a further non-limiting example, the flow rate of the first material in the conduit 474 may be about 0.183 m$^3$/hr.

The first material exits the heat exchanger 470 through a conduit 472. By way of a non-limiting example, the higher temperature first material in the conduit 472 may have a temperature of about 31° C. The first material in the conduit 472, which is cooler than the first material in conduit 402, may be used as the lower temperature material in the condenser 414 of the evaporator 410. Further, the first material in the conduit 472 may be used as the lower temperature material in the condenser 450. The conduit 472 conducts the first material into the condenser 414. After passing through the condenser 414, the first material exits the condenser 414 through a conduit 480 that conducts the first material into the condenser 450. The first material exits the condenser 450 through a conduit 482 that conducts the first material outside the mass exchanger 100. As the first material travels through the condensers 414 and 450, its temperature may increase. By way of a non-limiting example, the first material in the conduit 482 may have a temperature of about 45° C. By way of a further non-limiting example, the flow rate of the first material in the conduit 482 may be about 4.88 m$^3$/hr.

As is apparent to those of ordinary skill, the first material enters and exits the mass exchanger 100 at substantially the same temperature and at only a slightly reduced flow rate; therefore, more than one such mass exchanger may be coupled in series and used to process the first material. The system 300 may consume modest amounts of electrical energy and may be thermally efficient. The processed first material loses the mass of the second material produced and cools off because the mechanism of transfer involves evaporation. The evaporation uses the thermal energy of the processed first material to convert the second material from a liquid to a gas. Thermal energy is consumed as the heat of evaporation of the gas. By way of a non-limiting example, the system 300 may consume about 6.3 kW-hr/m$^3$ of second material produced.

Third Embodiment

Figure 17:
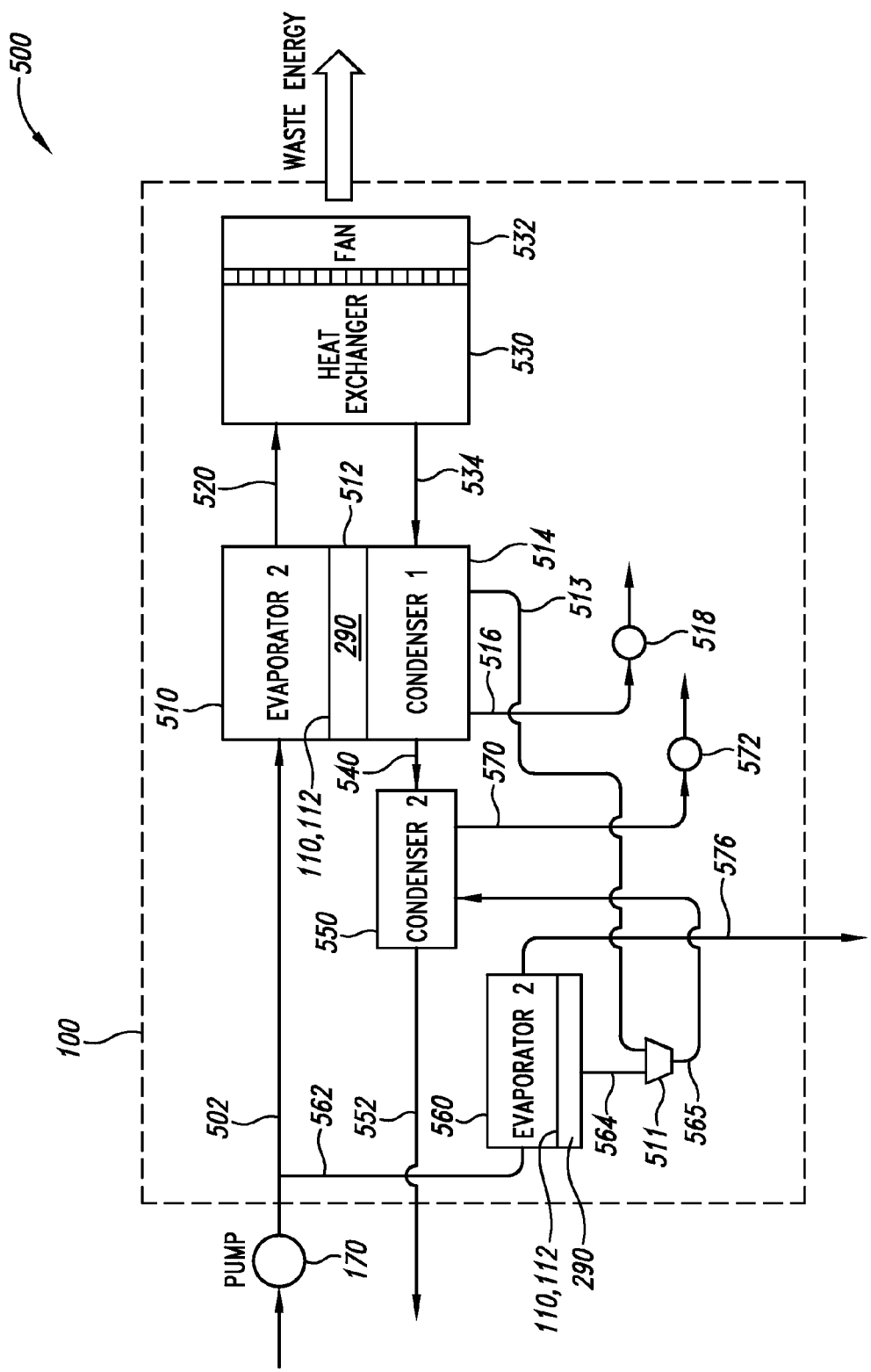
FIG. 17 is a schematic view of a third embodiment of a system incorporating a vacuum assist mass exchanger having a pair of evaporators arranged in parallel configured to extract distilled water from seawater.

Referring to FIG. 17, a vacuum assist system 500 will now be described. Like system 400, the first material enters and exits the mass exchanger 100 of the system 500 at substantially the same temperature. However, the mass exchanger 100 of the system 400 includes two evaporators 410 and 420 in a serial arrangement and the mass exchanger 100 of the system 500 includes two evaporators 510 and 560 in a parallel arrangement.

A conduit 502 transports the higher temperature first material to the mass exchanger 100. By way of a non-limiting example, the temperature of the first material in the conduit 502 may be about 45° C. By way of a further non-limiting example, the flow rate of the first material in the conduit 502 may be about 5.65 m$^3$/hr.

The evaporator 510 may be constructed using any suitable evaporator disclosed herein including without limitation the evaporator 280, the evaporator 310, the evaporator 410, and the evaporator 420. The evaporator 510 depicted is substantially similar to the evaporator 410. In the embodiment depicted, the evaporator 510 includes a vacuum plenum 512 flanked by a condenser 514 and a membrane 110/support 112 assembly. The vacuum plenum 512 includes the partial vacuum 290 that is created and maintained by a compressor or a vacuum pump 511 coupled to the evaporator 510 by a conduit 513.

The vapor passing through the membrane 110/support 112 assembly traverses the vacuum plenum 512 and enters the condenser 514 where the vapor is condensed into the second material. The second material exits the condenser 514 through a conduit 516, which may optionally be coupled to a pump 518, and transfers the second material outside the mass exchanger 100. By way of a non-limiting example, the flow rate of the second material in the conduit 516 may be about 0.124 m$^3$/hr.

The higher temperature first material exits the evaporator 510 via the conduit 520 that conducts the higher temperature first material into a heat exchanger 530. By way of a non-limiting example, the higher temperature first material in the conduit 520 may have a temperature of about 31.5° C. The heat exchanger 530 may be constructed using any suitable heat exchanger 530 known in the art. By way of a non-limiting example, the heat exchanger 530 may consume 62 kW-hr/m$^3$. The heat exchanger 530 lowers the temperature of the first material in the conduit 520. The heat exchanger 530 may include a fan 532 or other cool mechanism that dissipates some of the thermal energy in the first material into the surrounding environment. The first material exits the heat exchanger 530 through a conduit 534. By way of a non-limiting example, the first material in the conduit 534 may have a temperature of about 30° C. The conduit 534 conducts the first material into the condenser 514 of the evaporator 510.

The first material in the conduit 534, which is cooler than the first material in conduit 502 may be used as the lower temperature material in the condenser 514 of the evaporator 510. The conduit 534 conducts the first material into the condenser 514. After passing through the condenser 514, the first material exits the condenser 514 through a conduit 540 that conducts the first material into a condenser 550.

The condenser 550 is coupled to an evaporator 560, which receives the higher temperature first material through a conduit 562 coupled to the conduit 502. The partial vacuum 290 inside the evaporator 560 is created and maintained by the pump 511, which is coupled to the evaporator 560 by a conduit 564. The second material extracted from the first material by the evaporator 560 is directed into the condenser 550 by the pump 511 through a conduit 565. By way of a non-limiting example, the first material in the conduit 565 may have a temperature of about 46° C. By way of a further non-limiting example, the flow rate of the second material in the conduit 565 may be about 0.018 m$^3$/hr.

The condensed second material exits the condenser 550 via a conduit 570 which may optionally be coupled to a pump 572, and transfers the second material outside the mass exchanger 100. By way of a non-limiting example, the second material in the conduit 572 may have a flow rate of about 0.018 m$^3$/hr.

The first material exits the evaporator 560 through a conduit 576 that conducts the first material outside the mass exchanger 100. By way of a non-limiting example, the first material in the conduit 576 may have a temperature of about 30° C. By way of a further non-limiting example, the flow rate of the first material in the conduit 576 may be about 0.63 m$^3$/hr.

The first material exits the condenser 550 through a conduit 552 that conducts the first material outside the mass exchanger 100. As the first material travels through the condensers 514 and 550, its temperature may increase. By way of a non-limiting example, the first material in the conduit 552 may have a temperature of about 45° C. By way of a further non-limiting example, the flow rate of the second material in the conduit 552 may be about 4.88 m$^3$/hr.

As is apparent to those of ordinary skill, the first material enters and exits the mass exchanger 100 at substantially the same temperature; therefore, more than one such mass exchanger may be coupled in series and used to process the first material.

As with the system 300 depicted in FIG. 15, the source of the higher temperature first material processed by the system 500 may include any source of above ambient temperature sea water such as a steam condenser of a power plant. The system 500 may consume modest amounts of electrical energy and may be thermally efficient. Further, the system 500 may exhaust thermal energy into the environment to minimize electrical consumption.

Fourth Embodiment

Figure 18:
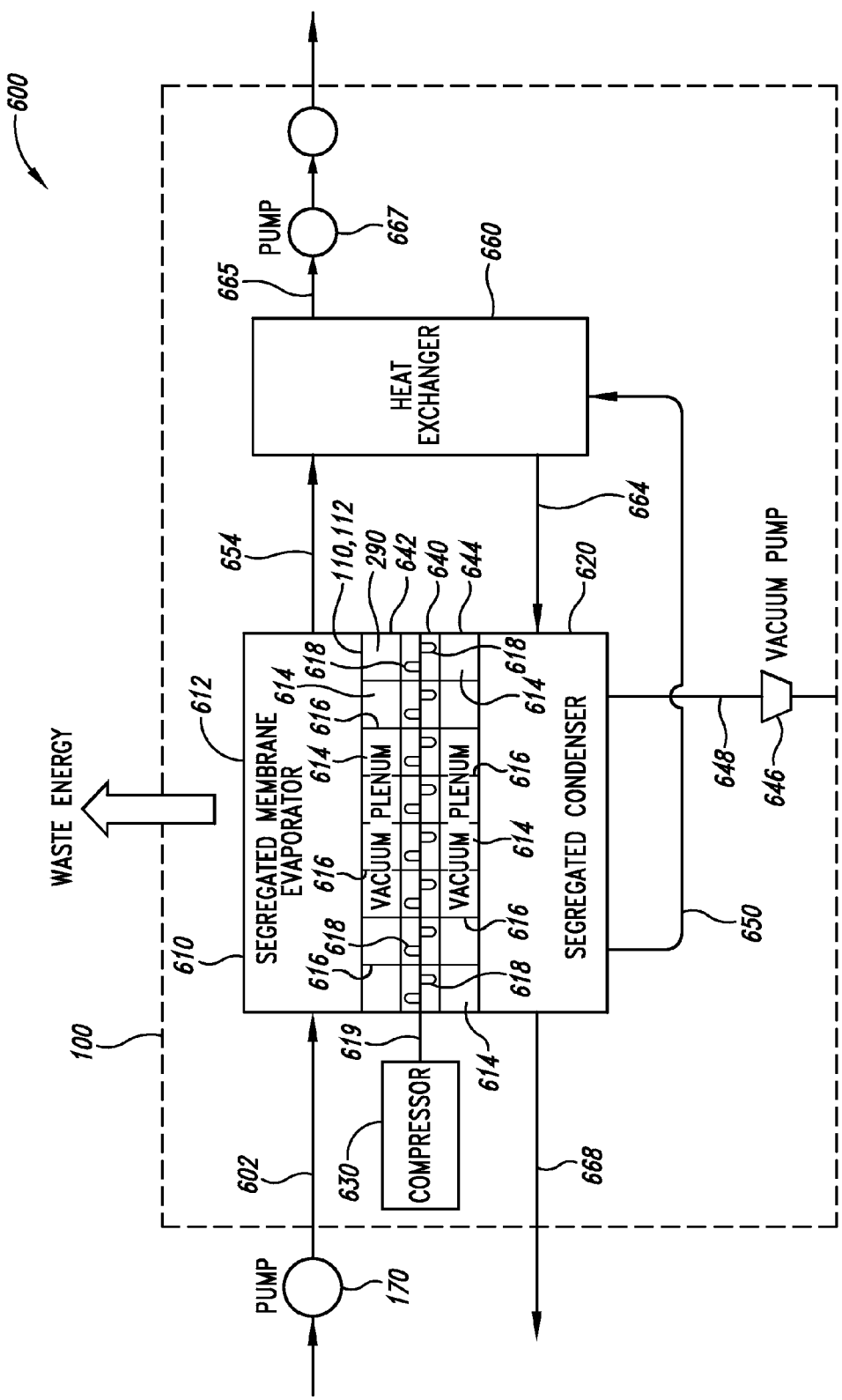
FIG. 18 is a schematic view of a fourth embodiment of a system incorporating a vacuum assist mass exchanger configured to extract distilled water from seawater.

Referring to FIG. 18, a vacuum assist system 600 and related process will now be described. Like system 400, the first material enters and exits the mass exchanger 100 of the system 600 at substantially the same temperature. A conduit 602 transports the higher temperature first material to the mass exchanger 100. By way of a non-limiting example, the temperature of the first material in the conduit 602 may be about 45° C. By way of a further non-limiting example, the flow rate of the first material in the conduit 602 may be about 5 m$^3$/hr.

The mass exchanger 100 of the system 600 includes a housing 612 housing both a segregated evaporator 610 and segregated condenser 620. The segregated evaporator 610 is separated from the segregated condenser 620 by a compressor region 640 flanked on one side by a vacuum plenum 642 and on the other side by a vacuum plenum 644. The term "segregated" means that the evaporator 610 and the condenser 620 each have a different operating temperature and a different operating pressure. One or more physical barriers form chambers that segregate the evaporator 610 and the condenser 620. However, an uninterrupted flow of the higher temperature first material flows through the evaporator 610. Similarly, an uninterrupted flow of a lower temperature material (in this case, cooled first material) flows through the condenser 620.

The compressor region 640, the vacuum plenum 642, and the vacuum plenum 644 are divided into separate evaporation segments or chambers 614 by dividers 616. Each of the evaporation chambers 614 extends between the evaporator 610 and the condenser 620 and includes a portion of the compressor region 640, the vacuum plenum 642, and the vacuum plenum 644.

Within an evaporation chamber 614, the compressor region 640 includes a compressor member 618 that acts as a one-way valve transporting the extracted second material from the portion of the vacuum plenum 642 in the evaporation chamber 614 to the portion of the vacuum plenum 644 in the evaporation chamber 614. The compressor member 618 also compresses the extracted second material within the portion of the vacuum plenum 644 in the evaporation chamber 614 at a pressure that is greater than the pressure of the extracted second material within the portion of the vacuum plenum 642 in the evaporation chamber 614. The pressure of the extracted second material may be increased slightly to change its saturation temperature. The evaporation chambers 614 do not exchange mass with one another and are essentially isothermal. The dividers 616 may be constructed from a material that is sufficiently insulating to render the evaporation chambers 614 adequately isothermal.

The compressor member 618 within each of the evaporation chambers 614 may be a boost compressor and may include any type of blower element known in the art including wheels, blades, airfoils, and the like. In the embodiment depicted in FIG. 18, the compressor member 618 within each of the evaporation chambers 614 are coupled to a common drive shaft 619 of a compressor 630. The compressor 630 may adjust the pressure of the vapor (second material) differently in each segment. The compression ratio within each segment of the boost compressor may be small.

The vapor passing through the membrane 110/support 112 assembly traverses the vacuum plenum 642, traverses the channel 640, traverses the vacuum plenum 644, and enters the condenser 620 where the vapor is condensed into the second material. The second material exits the condenser 620 through a conduit 650. The partial vacuum 290 inside vacuum plenum 642 and the partial vacuum 290 inside the vacuum plenum 644 are created and maintained by a vacuum pump 646 that is coupled to the evaporator 610 by a conduit 648. The vacuum pump 646 may be substantially similar to the vacuum pump 411 (see FIG. 16).

The higher temperature first material exits the evaporator 610 via the conduit 654 that conducts the higher temperature first material into a heat exchanger 660. By way of a non-limiting example, the higher temperature first material in the conduit 654 may have a temperature of about 30° C. The heat exchanger 660 may be constructed using any suitable heat exchanger known in the art. The heat exchanger 660 increases the temperature of the first material in the conduit 654. The conduit 650 conducts the second material into the heat exchanger 660, where some of the thermal energy of the second material is transferred to the first material increasing the temperature of the first material. The first material exits the heat exchanger 660 through a conduit 664. The conduit 664 conducts the first material into the condenser 620. By way of a non-limiting example, the first material in the conduit 664 may have a temperature of about 31° C. The second material exits the heat exchanger 660 through a conduit 665 that is coupled to a pump 667 and conduct the second material outside the mass exchanger 100. By way of a non-limiting example, the flow rate of the second material exiting the pump 667 may be about 0.138 $m^3$/hr.

The first material in the conduit 664, which is cooler than the first material in conduit 602 may be used as the lower temperature material in the condenser 620. The conduit 664 conducts the first material into the condenser 620. As the first material passes through the condenser 620, each segment of the condenser 620 warms the first material to a higher temperature than the previous segment until upon discharge, the first material has substantially the same temperature as the incoming higher temperature first material in conduit 602. After passing through the condenser 620, the first material exits the condenser 620 through a conduit 668 that conducts the first material outside the mass exchanger 100. By way of a non-limiting example, the first material in the conduit 668 may have a temperature of about 45° C. By way of a further non-limiting example, the flow rate of the first material in the conduit 668 may be about 4.88 $m^3$/hr.

As is apparent to those of ordinary skill, the first material enters and exits the mass exchanger 100 at substantially the same temperature; therefore, more than one such mass exchanger may be coupled in series and used to process the first material. The system 600 may consume modest amounts of electrical energy and may be thermally efficient. By way of a non-limiting example, the system 600 may consume 6.3 kW-hr/$m^3$.

Fifth Embodiment

A vacuum assist desalination system 700 and related process will now be described with respect to FIG. 19. The system 700 includes a mass exchanger 100 that includes an evaporator 710. A conduit 702 transports the higher temperature first material to the evaporator 710 of the mass exchanger 100. By way of a non-limiting example, the temperature of the first material in the conduit 702 may be about 45° C. By way of a further non-limiting example, the flow rate of the first material in the conduit 702 may be about 5 $m^3$/hr. The higher temperature first material exits the evaporator 710 through a conduit 708 that conducts the first material outside the mass exchanger 100. By way of a non-limiting example, the temperature of the first material in the conduit 708 may be about 20° C. As is apparent to those of ordinary skill, the temperature of the higher temperature first material passing through the evaporator 710 is reduced by the evaporation process occurring inside the evaporator 710.

The evaporator 710 may include any evaporator configuration discussed herein. By way of a non-limiting example, the evaporator 710 may be substantially similar to the evaporator 310 (see FIG. 15).

As in the system 300, a closed loop of conduits may be used to transport the lower temperature material to and from the mass exchanger 100. For example, a conduit 704 transports the lower temperature first material to the mass exchanger 100 and a conduit 706 transports the lower temperature material from the mass exchanger 100. The lower temperature material may reside within a reservoir (not shown) that is substantially similar to the reservoir 202 (see FIG. 13), which supplies the lower temperature material to the conduit 704 and optionally receives the discharged lower temperature material from the conduit 706. By way of a non-limiting example, the temperature of the lower temperature material in the conduit 704 may be about 28° C. and the temperature of the lower temperature material in the conduit 706 may be about 55° C. By way of a further non-limiting example, the flow rate of the lower temperature material in the conduit 704 may be about 4.5 $m^3$/hr and the flow rate of the lower temperature material in the conduit 706 may be about 5 $m^3$/hr. The lower temperature material may be pumped into the conduit 704 by a pump 707 coupled to the conduit 704.

In the system 700, a third material is used as the lower temperature material. The third material may be different from one or both of the higher temperature first material and the second material extracted from the first material; however, this is not a requirement.

In addition to the evaporator 710, the mass exchanger 100 includes a vapor compressor 720, a vacuum pump 730, and a condenser 740. The vapor compressor 720, which may be substantially similar to the vapor compressor 320 (see FIG. 15), is coupled between the evaporator 710 and the condenser 740. The vapor compressor 720 is operable to transfer the second material extracted from the first material from the evaporator 710 to the condenser 740.

The vapor compressor 720 and the vacuum pump 730 together create and maintain the partial vacuum 290 (see FIG. 14) within the evaporator 710. The compressor 720 captures or gathers the vapor or gas (e.g., low temperature steam) that passed through the membrane 110 and the support 112, and modifies the captured vapor's saturation temperature so that the vapor will condense against a condensation surface 294 (see FIG. 14) inside the condenser 740.

Figure 19:
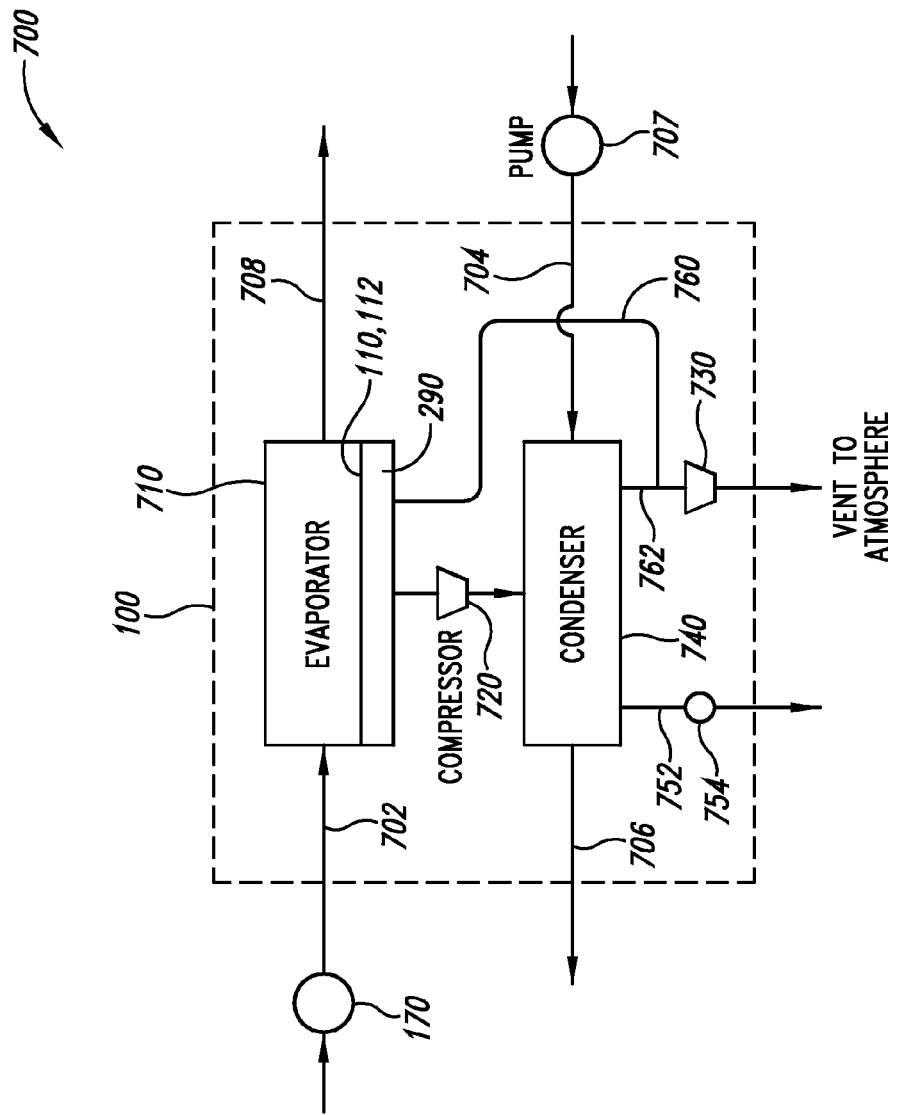
FIG. 19 is a schematic view of a fifth embodiment of a system incorporating a vacuum assist mass exchanger configured to extract distilled water from seawater.

In the implementation depicted in FIG. 19, the condenser 740 is contained within a separate housing from the evaporator 710, however, this is not a requirement. The condenser 740 may be incorporated within the evaporator 700. For example, the condenser 740 may reside within a chamber (not shown) of the evaporator 700. The condenser 740 may be substantially similar to the condenser 340.

This condenser 740 receives the lower temperature third material from the conduit 704. In the embodiment depicted, the conduit 704 is coupled to the pump 707 that regulates the flow of the lower temperature third material into a conduit 704 coupled to the condenser 740. The lower temperature third material may be used to absorb thermal energy from the condenser 740 for the purposes of maintaining the condensation surface 294 at an appropriate temperature cool enough to condense the vapor. The condensation surface of the condenser 740 has a temperature equal to or less than the vapor's saturation temperature.

As mentioned above, the lower temperature third material exits the condenser 740 through the conduit 706. The temperature of the third material in the conduit 706 may be adjusted by varying the amount of compression imparted by the compressor 720, adjusting the flow rate of the third material through the condenser 740, a combination thereof, and the like. The second material extracted from the first material by the evaporator 710 may exit the condenser 740 through a conduit 752. The conduit 752 may be coupled to a pump 754 and conducts the second material outside the mass exchanger 100. By way of a non-limiting example, the flow rate of the flow of the second material in the conduit 752 may be about 0.184 m³/hr.

The pressure within the condenser 740 may be lower than that within the evaporator 710, allowing the compressor 720 to do little actual work and consume less electrical energy. In other words, the pressure differential between the evaporator 710 and the condenser 740 will cause the vapor to flow into the condenser 740 without much, if any, assistance from the compressor 720. Therefore, the compressor 720 may simply homogenize the vapor temperature and direct the vapor into the condenser 740.

The vacuum pump 730 may be coupled to the evaporator 710 by a conduit 760 through which the pump provides at least a portion of the partial vacuum 290 to the evaporator 710. The vacuum pump 730 may also be coupled to the condenser 740 by a conduit 762. The vacuum pump 730 is operable to maintain a desirable pressure inside the condenser 740, which may include a lower pressure than the pressure inside the evaporator 710. Any suitable vacuum pump may be used to construct the vacuum pump 730 including a pump substantially similar to the pump 330 (see FIG. 15). As is apparent to those of ordinary skill, the conduit 760, the conduit 762, and other conduits within the system 700 may include valves configured to regulate flow therethrough. While in the embodiment of system 700 depicted in the drawings, the single vacuum pump 730 is used to supply vacuum pressure to both the evaporator 710 and the condenser 740, those of ordinary skill in the art appreciate that through application of ordinary skill in the art to the present teachings more than one pump may be used.

Sixth Embodiment

A stacked plate membrane evaporator (not shown) may be constructed in accordance with the plate mass exchanger 130 (see FIG. 10). The stacked plate membrane evaporator may include three acrylic plates machined to hold two membrane 110/support 112 assemblies (e.g., nano-composite semi-permeable membranes) in the stack arrangement discussed above with respect to the plate mass exchanger 130. The stack may be compressed to seal the edges of the membrane 110/support 112 assemblies against the edges of the plates adjacent thereto.

The two outer pieces of acrylic plate are machined with plenums and flow fields for liquid disbursement onto the first surfaces 110a of the membranes 110. During the stack assembly, the first surfaces 110a of the membranes 110 is placed against the liquid disbursement flow field.

The third middle piece of acrylic is machined as a vacuum plenum. The stack is stacked as follows: an outer liquid plate, a first membrane 110/support 112 assembly with first surfaces 110a facing the outer liquid plate, an inner vacuum plenum, a second membrane 110/support 112 assembly with first surfaces 110a facing away from the vacuum plenum, and an outer liquid plate. The stacked assembly may be compressed with C-clamps to form vacuum and water seals against the membrane 110/support 112 assemblies. Water and vacuum connections are coupled to the outer liquid plates and the inner vacuum plenum, respectively. A glass condenser may be used to capture vapor from the vacuum plenum of the stacked assembly. A vacuum pump (e.g., Air Squared pump) may be used to set the pressure within the condenser and the stacked assembly.

Figure 20:
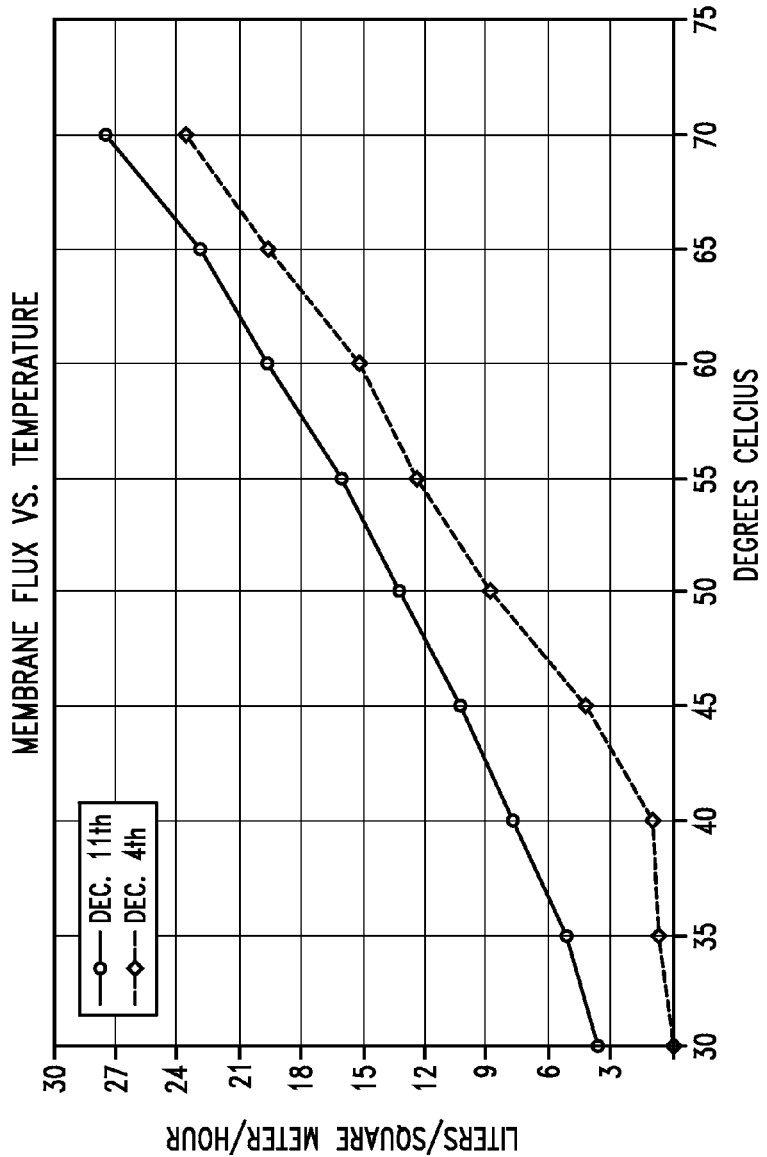
FIG. 20 is a chart of flux rate versus temperature obtained from an embodiment of the plate mass exchanger of FIG. 10 configured to include three stacked plates and two membrane/support assemblies and used to extract distilled water from seawater.

FIG. 20 provides a graph of flux rate versus temperature. The graph shows how much mass, expressed in liters of liquid water per unit area of membrane 110, is removed from a heated water stream by the mass exchanger. The graph expresses the relationship between water temperature, which is proportional to water vapor pressure on the first surface 110a of the membrane 110/support 112 assembly, and a constant partial vacuum 290 on the first surface 112a on the opposite side of the membrane 110/support 112 assembly. The substantially linear nature of the lines on the graph show that the membrane 110/support 112 assembly has a substantially constant resistance to the flow of moisture through it. Further, little to no limiting flux in the temperature ranges of interest to this process is detectable.

Because at least a partial vacuum 290 is in contact with the first surface 112a of the support 112 little to no sensible heat is transferred from the higher temperature material (water) through the membrane 110/support 112 assemblies. Therefore, energy exchange across the membrane 110/support 112 assemblies includes latent thermal energy in the water vapor. The flux rates at the various temperatures shown in FIG. 20 may be substantially larger than those observed in direct contact desalination systems. No fouling of the membrane 110/support 112 assemblies was observed using 32 k ppm salt water as the higher temperature material.

Vacuum Assist Gas Conditioner

Figure 21:
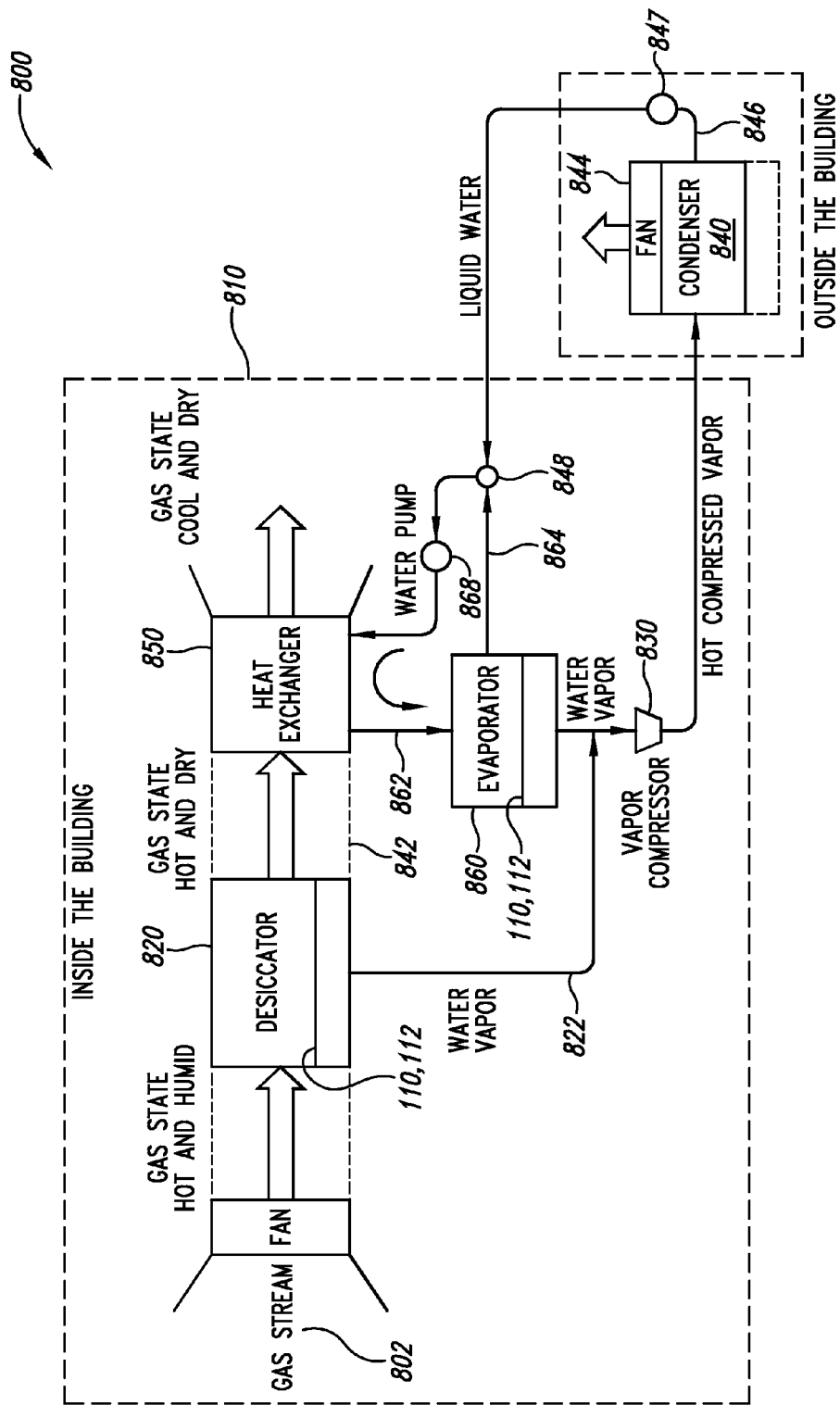
FIG. 21 is a schematic view of a system incorporating a vacuum assist mass exchanger having a desiccator and an evaporator arranged in series configured to extract a water from a gas, such as air, and to cool the gas.

A vacuum assist gas (such as air) condition system 800 and related process will now be described with respect to FIG. 21. The higher temperature first material in this case includes a stream of higher temperature gas 802, such as air in a residential or commercial building 810. The higher temperature gas 802 is directed by a fan or other gas directing means into a dessicator 820. The dessicator 820 may be constructed in a manner similar to the evaporator 310 (see FIG. 15). The dessicator 820 includes the membrane 110/support 112 assembly. The higher temperature gas 802 is placed in contact with the first surface 110a of the membrane 110 within the dessicator 820. The second material travels through the membrane 110/support 112 assembly of the dessicator 820 and exits therefrom as vapor (e.g., water vapor) through a conduit 822 coupled to a compressor 830.

The compressor 830 is coupled between the dessicator 820 and a condenser 840 and is operable to transfer the second material extracted from the first material from the dessicator 820 through the conduit 822 to the condenser 840. A fan 844 may be used to cool the condensation surface 294 (see FIG. 14) inside the condenser 840. The fan 844 may also transfer some of the thermal energy of the second material into the environment cooling the second material. In the embodiment depicted in FIG. 21, the condenser 840 is located external to the building 810.

The condensed second material (e.g., liquid water) exits the condenser 840 through a conduit 846. The conduit 846 may be coupled to an optional pump 847 that may be used to determine the flow rate of the second material from the condenser 840 and/or the pressure inside the condenser 840.

The second material in the conduit 846 flows through a valve 848 into a heat exchanger 850 coupled to an evaporator 860. The desiccated gas 802 exits the dessicator 820 through a conduit 842 that conducts the gas into the heat exchanger 860. The heat exchanger 860 may include any heat exchanger known in the art including a liquid-to-air heat exchanger. The heat exchanger 860 transfers at least a portion of the thermal energy from the desiccated gas 802 to the second material (water) thereby cooling the desiccated gas 802. The cooled and desiccated gas 802 is then conducted outside the heat exchanger 860. For example, if the system 800 is operating as an air conditioner, the gas 802 is cooled desiccated air that may be released into the building 810.

The second material traveling through the heat exchanger 860 is conducted into the evaporator 860 by a conduit 862. The evaporator 860 is coupled to the compressor 830 that captures or gathers the vapor or gas (e.g., low temperature steam) that passed through the membrane 110/support 112 assembly and may modify the captured vapor's saturation temperature so that the vapor will condense against the condensation surface 294 inside the condenser 840. The compressor 830 also maintains a pressure concentration gradient across the membrane 110/support 112 assembly inside the evaporator 860. The compressor 830 may be constructed using any suitable compressor including a compressor substantially similar to the compressor 330 (see FIG. 15).

As the condensed second material (e.g., liquid water) travels through the evaporator 860, the evaporation process inside the evaporator lowers the temperature of the condensed second material. The cooled condensed second material exits the evaporator 860 through a conduit 864 and is routed by the valve 848 into the heat exchanger 850. In this manner, the condensed second material may cycle repeatedly through the heat exchanger 850 and evaporator 860. An optional pump 868 may be used to pump the condensed second material into the heat exchanger 850 from the conduits 846 and 864 through the valve 848.

The heat exchanger 850 will have little to no internal condensation because the gas 802 entering the heat exchanger 850 was desiccated by the desiccator 820. Because the vaporized second material and condensed second material are enclosed within the conduits, the system 800 may require less maintenance than conventional gas (e.g., air) condition systems. For example, the system 800 may not require anti-fungal chemicals, anti-microbial chemicals, and the like. Further, the system 800 may be less likely to become clogged than conventional gas (e.g., air) condition systems.

While the system 800 is depicted as having a single heat exchanger 850, those of ordinary skill in the art appreciate that additional heat exchangers may be added and such embodiments are within the scope of the present teachings. The liquid water in the conduit 846 can be transported to each heat exchanger 850 using one or more conduits and gas (e.g., air) ducting need not be installed. If properly constructed, the system 800 can reduce energy usage to below the usage of conventional gas (e.g., air) condition systems. By way of a non-limiting example, the system 800 may reduce energy usage by about 60% to about 80%. Further, the system 800 does not require the use of a refrigerant.

Method of Constructing Anion Membranes

An exemplary method of constructing an anion membrane (also referred to as an "anion exchange membrane") will now be described. Three kinds of copolymers with different weight percent of styrene contacts were used as starting materials: (1) statistical styrene-ethylene copolymers obtained from Dow Chemical; (2) block styrene-ethylene-butylene-styrene copolymers obtained from Shell; and (3) block styrene-isobutylene-styrene copolymers obtained from Kaneka Corporation.

The statistical styrene-ethylene copolymer (1.25 g, 76 wt % styrene content, Dow Chemical) was dissolved in chloroform (200 ml). Trioxane (9 g, 0.1 mol) and chlorotrimethylsilane (38 ml, 0.3 mol) were added to the above polymer solution under stirring. After the reaction mixture was cooled to 0° C., Tin(IV) chloride (3 ml, 0.025 mol) was added. The reaction mixture was stirred at 0° C. for 30 min and then at room temperature for overnight. The reaction was quenched by addition to methanolic water. The polymer was washed on a glass filter with methanol, THF/water, successively, and then was dried under vacuum. The final sample denoted as chloromethylated styrene-ethylene copolymer was characterized by FT-IR (KBr: $v_{C-Cl}$=1265 cm-1) and $^1$H NMR ($\delta$=4.49 ppm, corresponding to the proton in —$CH_2Cl$).

Typically, 0.5 g of the chloromethyled styrene-ethylene copolymer with 26.3 mol % of —$CH_2Cl$ content based on styrene units was first dissolved in 50 ml of THF. Then, the chloromethyled polymer solution was impregnated to a membrane supporting material (a microporous support). The impregnated membrane was immersed in a 1 mol/L trimethylamine methanol solution at 40° C. for 24 hours to provide a quaternary ammonium salt type. Thus, an anion exchange membrane was obtained.

The anion membranes created using the above method absorbed and transferred water.

Evaporator with Plural Cartridges

Figure 22:
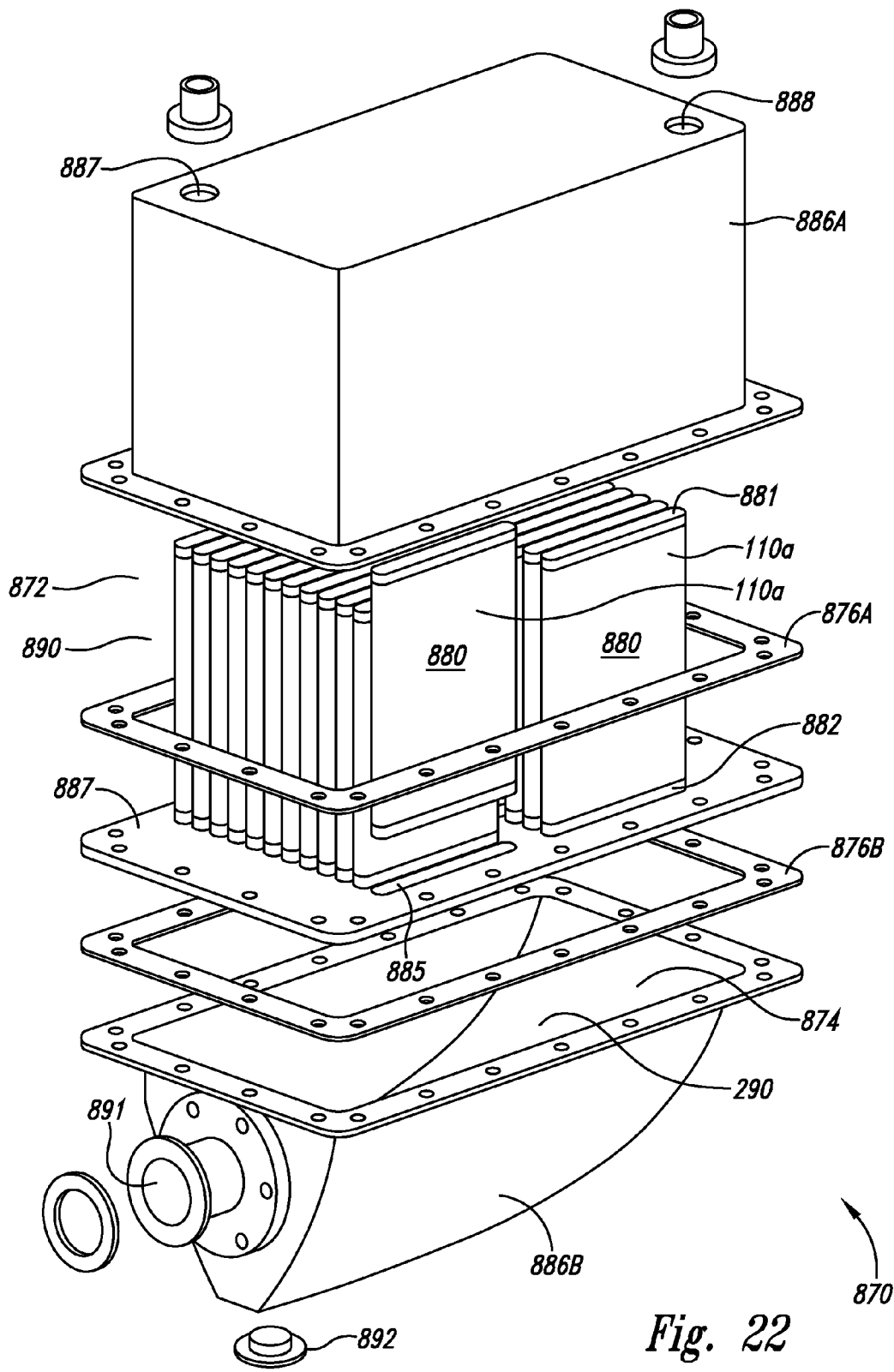
FIG. 22 is an exploded perspective view of a vacuum assist evaporator device using multiple tubular cartridges.
Figure 23:
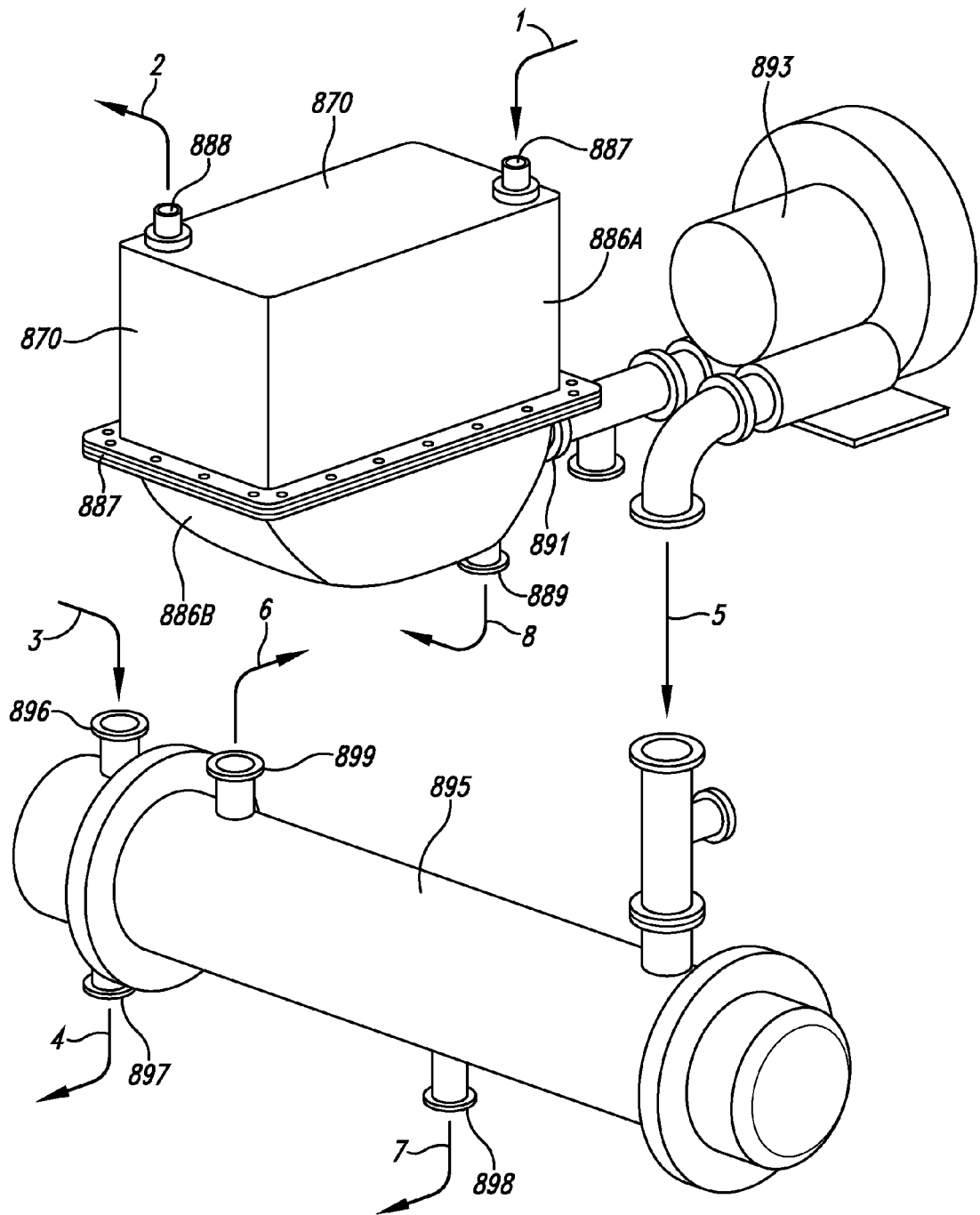
FIG. 23 is a partially exploded perspective view of a mass exchanger incorporating the evaporator device of FIG. 22.

An embodiment of an evaporator 870 including one or more cartridges 880 is provided in FIGS. 22 and 23. Each cartridge 880 may have a generally hollow tubular shape with a closed end portion 881 opposite an open end portion 882. The membrane 110/support 112 assembly is incorporated into each of the cartridges 880, the first surface 110a of the membrane 110 being located along the outside surface of the cartridge. The interior components of each cartridge may be substantially similar to the interior components of the cartridges depicted in FIGS. 8 and 9. As is apparent to those of ordinary skill in the art, the support 112 portion of the membrane 110/support 112 assembly may be disposed inside the interior of the cartridge 880. The internal structure of the cartridge 880 provides structural support to the membrane 110/support 112 assembly against the pressure differential between the higher temperature material and the partial vacuum 290.

In particular embodiments, the membrane 110/support 112 assembly may include a solid piece of porous plastic, such as polypropylene, surface impregnated with a polymer barrier layer 110. The solid piece of porous plastic can be extruded into any shape and the internal supports shown in FIGS. 8 and 9 used to provide structural support.

The housing 886 may include a first portion 886A and a second portion 886B that couple together to define a hollow interior portion having an inlet 887 and an outlet 888. The cartridges 880 may be arranged inside the hollow interior portion. The higher temperature material 1 (e.g., the first material) is introduced inside the housing 886 through the inlet 887 formed in the first portion 886A. The processed higher temperature material 2 exits from inside the housing 886 through the outlet 888 formed in the first portion 886A.

The open end portion 882 of each cartridge 880 may be received inside an aperture 885 formed in a divider plate 887 that bifurcates the hollow interior portion of the housing 886. The divider plate 887 may be flanked by the first portion 886A and the second portion 886B of the housing 886. A gasket 876A may be provided between the divider plate 887 and the first portion 886A and a gasket 876B may be provided between the divider plate 887 and the second portion 886B. The divider plate 887 divides the hollow interior portion of the housing in a first chamber 872 formed in the first portion 886A of housing that will house the higher temperature material and a second chamber 874 formed in the second portion 886B of the housing that will house the partial vacuum 290. The gaskets 876A and 876B may seal the higher temperature material within the first chamber 872 and the partial vacuum 290 in the second chamber 874, respectively.

The second portion 886B of the housing 886 includes a port 891 that provides access into the partial vacuum 290 allowing the vapor extracted from the higher temperature material to exit the partial vacuum 290 and the evaporator 870. Optionally, a drain fitting 892 may be included in the second portion 886B of the housing 886 and used to drain any materials 8 present in the second chamber 874.

Referring to FIG. 23, a compressor 893 may be coupled to the port 891 of the evaporator 870 and used to gather the second material extracted from the first material from the second chamber 874. The second material 5 output from the compressor 893 (e.g., vapor) may be conducted to a condenser 895, such as a shell and tube vacuum condenser. Inside the condenser 895, the second material 5 is condensed into a liquid 7, which is output therefrom through a port 898. Any gases 6 in the condenser 895 that do not condense into a liquid may be output through a port 899. Any liquids or other materials 8 collected inside the second chamber 874 may exit therefrom through a port 889.

A lower temperature cooling material 3, such as ambient seawater, may be used to cool the condenser 895. The cooling material 3 may enter the condenser 895 via a port 896. After traveling through the condenser 895, the cooling material is heated somewhat. The heated cooling material 4 exits the condenser 895 via a port 897.

Ethanol Extraction

First Embodiment

The membrane 110/support 112 assembly is configurable to be permeable to high dielectric gases and liquids, such as lower order alcohols (e.g., ethanol, methanol, and the like. Therefore, the membrane 110/support 112 assembly may be used to remove many volatile compounds from other gases and liquids.

Generally, ethanol produced in a fermentation reactor needs to be separated or extracted from an ethanol and water solution (an "ethanol/water solution"). An ethanol extraction system 900 and related process will now be described with respect to FIG. 24. For ease of illustration, the various compressors and vacuum pumps have been omitted from FIG. 24. However, through application of ordinary skill in the art to the present teachings, compressors and/or vacuum pumps may be added to the system 900 as appropriate. By way of a non-limiting example, each of the evaporator and condenser pairs (i.e., evaporator 920 and condenser 930; evaporator 950 and condenser 970) of the system 900 may be constructed in accordance with the mass exchanger 100 of FIG. 19. Each of the compressors (not shown) may be configured to minimally compress, so each of the condensers may condense the vapor received from the evaporator using ambient air as a coolant, using air temperature water as a coolant, and the like. With either of these coolants, condensation may take place in a metal sensible heat exchanger.

In the system 900, the higher temperature first material is an ethanol/water solution produced by a fermentation reactor (not shown) and conducted to the system 900 by a conduit 902. By way of a non-limiting example, the ethanol/water solution may include 10% ethanol by weight. The conduit 902 conducts the ethanol/water solution into a first evaporator 920.

The ethanol/water solution may be heated by a first heat exchanger 910 using thermal energy received from any source known in the art including waste heat from an industrial process. By way of a non-limiting example, the ethanol/water solution may be heated to about 30° C. The heat added by the first heat exchanger 910 is used maintain the ethanol/water solution at a substantially constant temperature (e.g., 30° C.) as the ethanol is removed. At this temperature, the ethanol will preferentially evaporate at a predetermined rate relative to the water. By way of a non-limiting example, the ethanol and water may evaporate at 3 to 1 rate, respectively.

In the embodiment depicted in FIG. 24, the ethanol/water solution is heated inside the first evaporator 920. The first evaporator 920 may be constructed in accordance with any evaporator disclosed herein including the evaporator 870.

The membrane 110/support 112 assembly of the first evaporator 920 may be configured to pass alcohol (e.g., ethanol) and water at a predetermined ratio (e.g., about 3:1). For example, if the predetermined ratio is 3:1, three parts of alcohol will transfer for every one part of water transferred across the membrane 110/support 112 assembly. In such an embodiment, the first evaporator 920 will separate over about 90% of the water from the ethanol/water solution, assuming the ethanol/water solution included 10% ethanol by weight. By way of a non-limiting example, the first evaporator 920 may be configured to pass alcohol (e.g., ethanol) and water at a ratio of about 3:1.

Inside the first evaporator 920, the ethanol and a first portion of the water in the ethanol/water solution pass through the membrane 110/support 112 assembly and are conducted by a conduit 922 to a condenser 930. A second portion of the water that does not pass through the membrane 110/support 112 assembly exits the evaporator 920 through a conduit 932 that directs the second portion of the water outside the system 900.

The condenser 930 condenses the ethanol/water vapor to a liquid that exits the condenser through a conduit 934. By way of non-limiting example, the liquid ethanol/water in the conduit 934 may include 70% ethanol and 30% water by weight. The condensation surface 294 inside the condenser 930 may be cooled by a second heat exchanger 940. The second heat exchanger 940 may dissipate thermal energy to any lower thermal energy source known in the art including venting the heat into the environment.

The liquid ethanol/water is conducted by the conduit 934 into a second evaporator 950. The second evaporator 950 may be substantially similar to the first evaporator 920; however, the membrane 110/support 112 assembly may be configured to be impervious to ethanol. This may be accomplished using any method known in the art including applying a layer of ethylene vinyl acetate to the first surface 110a of the membrane 110 as described in U.S. Pat. No. 4,670,146. The layer of ethylene vinyl acetate effectively blocks the transfer of alcohol (e.g., ethanol) but allows the water to permeate.

The liquid ethanol/water may be heated by a third heat exchanger 960 that receives thermal energy from any source known in the art including waste heat from an industrial process. By way of a non-limiting example, the liquid ethanol/water may be heated to about 40° C. The heat added vaporizes at least a portion of the water within the liquid ethanol/water and causes the water vapor to flow through the membrane 110/support 112 assembly. In the embodiment depicted in FIG. 24, the liquid ethanol/water is heated inside the second evaporator 950.

Inside the second evaporator 950, a first portion of the water in the liquid ethanol/water passes through the membrane 110/support 112 assembly and is conducted by a conduit 962 to a condenser 970. A second portion of the water and the ethanol do not pass through the membrane 110/support 112 assembly and instead exit the evaporator 950 through a conduit 972. By way of non-limiting example, the liquid ethanol/water in the conduit 972 may include at least 90% ethanol. For example, the liquid ethanol/water in the conduit 972 may include 95% ethanol and 5% water by weight.

The condenser 970 condenses the water vapor to a liquid that exits the condenser through a conduit 974 that directs the liquid water outside the system 900. The condensation surface 294 inside the condenser 970 may be cooled by a fourth heat exchanger 980. The fourth heat exchanger 980 may dissipate thermal energy to any cooler source known in the art including venting the heat into the environment.

The second portion of the water and the ethanol in the conduit 972 are conducted by the conduit 972 into a molecular sieve 990 that filters at least a portion of the ethanol from the second portion of the water. The filtered ethanol/water solution exits the sieve 990 through a conduit 992. By way of non-limiting example, the liquid ethanol/water in the conduit 992 may include 99.5% ethanol and 0.5% water by weight.

Referring to FIG. 25, an exemplary embodiment of the first evaporator 920 configured to heat the ethanol/water solution is provided. As with many of other embodiments of evaporators described herein, the higher temperature first material flows through a first chamber 923 in the first evaporator 920. The first chamber 923 may be divided into alternating heating regions 924 and evaporation regions 925. As the ethanol/water solution travels through the first chamber 923, the heating regions 924 heat the first material to a predetermined temperature (e.g., 30° C.) and the evaporation regions 925 cool the first material. By alternating the heating regions 924 and evaporation regions 925, each of the heating regions 924 restores the ethanol/water solution to the predetermined temperature (e.g., 30° C.) after the ethanol/water solution passes through an evaporation region 925. As mentioned above, a compressor 926 may be used to direct the vapor extracted from the first material into the condenser 930. The second evaporator 950 may be substantially similar to the first evaporator 920. In alternate embodiments, enough alternating heating regions 924 and evaporation regions 925 may be provided in the first evaporator 920 to extract a solution that is 95% ethanol from the ethanol/water solution and the second evaporator 950 may be omitted.

Second Embodiment

An ethanol extraction system 1000 and related process will now be described with respect to FIG. 26. The system 1000 includes many of the components used in the system 900. Therefore, only the components of the system 1000 that differ from those of the system 900 will be described. Like reference numerals have been used in FIGS. 24, 25, and 26 to identify like components of the systems 900 and 1000. Like with system 900, for ease of illustration, the various compressors and vacuum pumps of the system 1000 have been omitted. However, through application of ordinary skill in the art to the present teachings, compressors and/or vacuum pumps may be added to the system 1000 as appropriate.

The system 1000 includes a fermentation reactor 1010 coupled to the conduit 902 and operable to supply an ethanol/water solution to the first evaporator 920. By way of a non-limiting example, the ethanol/water solution may include a predetermined amount of ethanol (e.g., 4.5% ethanol by weight). In the system 1000, the first heat exchanger 910 is omitted. Instead, the ethanol/water solution is delivered by the fermentation reactor 1010 at a suitable temperature for processing by the first evaporator 920.

Inside the first evaporator 920, the ethanol and a first portion of the water in the ethanol/water solution pass through the membrane 110/support 112 assembly and are conducted by the conduit 922 to the condenser 930. A second portion of the water that does not pass through the membrane 110/support 112 assembly exits the evaporator 920 through the conduit 932 that directs the second portion of the water back to the fermentation reactor 1010. In this manner, the water may be reused by the fermentation reactor 1010. The liquid water in the conduit 974 may be routed outside the system 1000. Alternatively, the liquid water in the conduit 974 may be routed back to the fermentation reactor 1010.

Vacuum Assist Moisture Capture for an Electric Dryer

Assuming electricity costs about $0.12 per kW-hr and a typical residential electric clothes dryer consumes on average about 4 kW-hr to about 5 kW-hr of electricity per load, the dryer may cost about $0.40 to about $0.52 per load to operate. Assuming an estimated useful operating lifetime of the dryer is about 12 years to about 14 years, the total lifetime operating expense for the typical dryer is approximately $1,700.

In many conventional clothes dryer designs, air is heated, passed through the dryer once, and then exhausted. Referring to FIG. 27, an embodiment of a dryer 1100 incorporating the evaporator 870 is provided. Like a conventional dryer, the dryer 1100 includes a drum 1110 in which clothes are placed and rotated in heated air. Air from within the drum 1110 is routed into the evaporator 870 by a conduit 1114. The water in the air is extracted by the evaporator 870.

The partial vacuum 290 (see FIG. 22) inside the evaporator 870 is provided by a compressor 1120 coupled to the port 891 of the evaporator 870 by a conduit 1122. The compressor 1120 removes the water vapor from the second chamber 874, compresses the water vapor raising its temperature, and directs the higher temperature water vapor into a heat exchanger 1130 through a conduit 1124. The compressor 1120 may include any suitable compressor known in the art and described herein.

The dryer air exiting the evaporator 870 is routed into the heat exchanger 1130 by a conduit 1132. The heat exchanger 1130 transfers at least a portion of the thermal energy of the water vapor exiting the compressor 1120 through the conduit 1124 to the dryer air. The loss of thermal energy by the water vapor may cause it to condense into liquid water. The water vapor and/or liquid water exits the heat exchanger 1130 through a conduit 1134. The heated dryer air is returned to the drum 1110 by a conduit 1136.

The dryer 1100 may not require an electric heater, a gas heater, and the like because the thermal energy transferred from the compressed water vapor in the conduit 124 may provide sufficient heat to dry clothing. The dryer 1100 has the potential to save a residential user more than three quarters of a typical dryer's operating expense.

Absorber of Selected Gases from Combustion Flue Gasses

The membrane 110/support 112 assembly may be configured to be permeable to high dielectric constant gases but relatively impermeable to oxygen, nitrogen, and argon (which are common constituents of air). When fossil fuels are combusted the flue gases produced may contain oxides of carbon ($CO_2$), sulfur ($SO_2$), nitrogen ($NO_2$), and the like. Sulfur is often present in fuels such as coal and diesel fuel.

The materials used to construct the membrane 110/support 112 assembly may be tuned to selectively transfer one or more selected gases. For example, the anionic membrane discussed above may be configured to selectively transfer one or more selected gases. Without being limited by theory, it is believed the anionic membrane performs a method known as "facilitated transport" that is somewhat comparable to the way in which human lungs eliminate $CO_2$ during respiration. The lungs use a reversible chemical reaction in combination with a concentration driven diffusion process to transport and release the $CO_2$.

Once synthesized and cast, the anionic membrane undergoes drying and post treatment to promote cross-linking. The tertiary amine groups within the domains are covalently bonded to the polymer backbone. One anion that may be used is chlorine that is electrostatically bound to the tertiary amine. The anions act as an agent that in combination with moisture, transform $CO_2$ into a chemical bicarbonate that diffuses through the anionic membrane and exits therefrom after being converted back to $CO_2$. This mechanism may also block the transport of other gases rendering the membrane impermeable to such gases.

Several other types of membranes can be designed to function in this manner; polymer membranes, diffusion transport membranes, fixed-site carrier-type membranes, cellulose acetate or polyamides, ionomeric high voltage, electrically modified materials and carbon molecular sieve membranes, and ceramic membrane. The inventive membranes and methods are unique in that the phase separation capability of the ionic domains is used to concentrate and connect the tertiary amine groups into a contiguous transport network within the membrane. This transport network increases the separation factor of the gases and the flux level of the permeable gases.

The evaporator 870 includes cartridges 880 constructed using anionic membranes. Such an evaporator 870 may act as an absorber of $CO_2$, $SO_2$, $NO_x$, and the like. Referring to FIG. 28, a system 1200 for absorbing or capturing one or more selected gas from flue gases is provided. Flue gases are introduced into the evaporator 870 by a conduit 1202. Inside the evaporator 870, the selected gas(es) pass through the anionic membrane into the partial vacuum 290. The selected gas(es) is/are removed from the partial vacuum by a compressor 1210, such as a regenerative blower, and concentrated by the compressor for further processing. The remainder of the flue gases exit the evaporator 870 through the conduit 1216.

The capture of the selected gas(es) may be energy efficient because the concentration differential across the anionic membrane may be created and maintained with a simple regenerative blower. The captured and compressed gases may be compressed further and liquefied for geological sequestration, chemically absorbed to form oxides of magnesium or calcium, dissolved in the deep ocean, and the like.

All of the above U.S. patents, U.S. patent application publications, U.S. patent applications, foreign patents, foreign patent applications and non-patent publications referred to in this specification and/or listed in the Application Data Sheet, are incorporated by reference in their entireties.

From the foregoing it will be appreciated that, although specific embodiments of the invention have been described herein for purposes of illustration, various modifications may be made without deviating from the spirit and scope of the invention.

The invention claimed is:

1. A desalinization system comprising a membrane assembly disposed between a flow of a first material having a first temperature and comprising a high-dipole moment liquid and a plurality of dissolved ions and a flow of a second material having a second temperature, the second temperature being lower than the first temperature, the membrane assembly comprising a membrane coupled to a support, the membrane being in contact with the flow of the first material and the support being in contact with the flow of the second material, the membrane assembly being configured to allow at least a portion of the high-dipole moment first material to pass through the membrane assembly into the second material, wherein the membrane assembly comprises a non-porous selective transfer membrane comprising ionomeric polymer domains, the membrane permeable to high dipole materials while precluding passage of dissolved ions through the membrane assembly, wherein when the high-dipole moment liquid joins with the second material, the high-dipole moment liquid transfers thermal energy to the second material increasing the second temperature, the system further comprising:
a heat exchanger configured to transfer at least a portion of the thermal energy transferred to the second material to a portion of the flow of the first material before the portion of the flow of the first material contacts the membrane.

2. The system of claim 1, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane.

3. The system of claim 2 wherein the ionomeric polymer domains of the selective transfer membrane form contiguous conduits suitable to provide for travel of high-dipole liquids or gases from one face of the membrane to the other face.

4. The system of claim 3, wherein the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers, poly(methyl methacrylate) (PMMA), acrylonitrile butadiene styrene (ABS), polyamide (PA), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, sulfonated tetrafluorethylene copolymer, and any combination thereof.

5. The system of claim 2 wherein the selective transfer membrane comprises a barrier layer comprising a polymer or polymer composite that is permeable to high dipole moment material.

6. The system of claim 1 wherein the membrane assembly comprising a selective transfer membrane having a first surface and a second surface and further comprising a porous support having a first surface and a second surface, the second surface of the selective transfer membrane being positioned adjacent to the first surface of the porous support, the first surface of the membrane assembly being the first surface of the selective transfer membrane and the second surface of the membrane assembly being the second surface of the porous support.

7. The system of claim 6 wherein the porous support is hydrophilic.

8. The system of claim 1, wherein the plurality of dissolved ions comprise sodium ions and chloride ions.

9. The system of claim 1, wherein the first material is brackish water or seawater.

10. The system of claim 1, wherein the first material is seawater discharged from an electric power plant.

11. A desalinization system comprising a membrane assembly disposed between a flow of a first material having a first temperature and comprising a high-dipole moment liquid and a plurality of dissolved ions and a flow of a second material having a second temperature, the second temperature being lower than the first temperature, the membrane assembly comprising a membrane coupled to a support, the membrane being in contact with the flow of the first material and the support being in contact with the flow of the second material, the membrane assembly being configured to allow at least a portion of the high-dipole moment first material to pass through the membrane assembly into the second material, wherein the membrane assembly comprises a non-porous selective transfer membrane comprising ionomeric polymer domains, the membrane permeable to high dipole materials while precluding passage of dissolved ions through the membrane assembly, wherein when the high-dipole moment liquid joins with the second material, the high-dipole moment liquid transfers thermal energy to the second material increasing the second temperature to a third temperature, the system further comprising:
 a heat exchanger configured to lower the third temperature of the second material to the second temperature.

12. A desalinization system comprising a membrane assembly disposed between a flow of a first material having a first temperature and comprising a high-dipole moment liquid and a plurality of dissolved ions and a flow of a second material having a second temperature, the second temperature being lower than the first temperature, the membrane assembly comprising a membrane coupled to a support, the membrane being in contact with the flow of the first material and the support being in contact with the flow of the second material, the membrane assembly being configured to allow at least a portion of the high-dipole moment first material to pass through the membrane assembly into the second material, wherein the membrane assembly comprises a non-porous selective transfer membrane comprising ionomeric polymer domains, the membrane permeable to high dipole materials while precluding passage of dissolved ions through the membrane assembly, wherein when the high-dipole moment liquid joins with the second material, the high-dipole moment liquid transfers thermal energy to the second material increasing the second temperature to a third temperature, the system further comprising:
 a reservoir containing the second material at a fourth temperature, the third temperature being greater than the fourth temperature; and
 a heat exchanger configured to transfer at least a portion of the thermal energy transferred to the second material by the high-dipole moment liquid to a portion of the second material in the reservoir thereby lowering the third temperature of the second material to the second temperature.

13. A desalinization system comprising a membrane assembly disposed between a flow of a first material having a first temperature and comprising a high-dipole moment liquid and a plurality of dissolved ions and a flow of a second material having a second temperature, the second temperature being lower than the first temperature, the membrane assembly comprising a membrane coupled to a support, the membrane being in contact with the flow of the first material and the support being in contact with the flow of the second material, the membrane assembly being configured to allow at least a portion of the high-dipole moment first material to pass through the membrane assembly into the second material, wherein the membrane assembly comprises a non-porous selective transfer membrane comprising ionomeric polymer domains, the membrane permeable to high dipole materials while precluding passage of dissolved ions through the membrane assembly, wherein a first portion of the flow of the first material that contacted the membrane and comprises the plurality of dissolved ions prohibited from passing through the membrane assembly also comprises thermal energy, the system further comprising a heat exchanger configured to transfer at least a portion of the thermal energy of the first portion of the flow of the first material to a second portion of the flow of the first material before the second portion of the flow of the first material contacts the membrane.

14. The system of claim 11, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane, wherein the ionomeric polymer domains of the selective transfer membrane form contiguous conduits suitable to provide for travel of high-dipole liquids or gases from one face of the membrane to the other face, and wherein the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers, poly(methyl methacrylate) (PMMA), acrylonitrile butadiene styrene (ABS), polyamide (PA), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, sulfonated tetrafluorethylene copolymer, and any combination thereof.

15. The system of claim 11, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane, and wherein the selective transfer membrane comprises a barrier layer comprising a polymer or polymer composite that is permeable to high dipole moment material.

16. The system of claim 11, wherein the membrane assembly comprising a selective transfer membrane having a first surface and a second surface and further comprising a porous, hydrophilic support having a first surface and a second surface, the second surface of the selective transfer membrane being positioned adjacent to the first surface of the porous support, the first surface of the membrane assembly being the first surface of the selective transfer membrane and the second surface of the membrane assembly being the second surface of the porous support.

17. The system of claim 12, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane, wherein the ionomeric polymer domains of the selective transfer membrane form contiguous conduits suitable to provide for travel of high-dipole liquids or gases from one face of the membrane to the other face, and wherein the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers, poly(methyl methacrylate) (PMMA), acrylonitrile butadiene styrene (ABS), polyamide (PA), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, sulfonated tetrafluorethylene copolymer, and any combination thereof.

18. The system of claim 12, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane, and wherein the selective transfer membrane comprises a barrier layer comprising a polymer or polymer composite that is permeable to high dipole moment material.

19. The system of claim 12, wherein the membrane assembly comprising a selective transfer membrane having a first surface and a second surface and further comprising a porous, hydrophilic support having a first surface and a second surface, the second surface of the selective transfer membrane being positioned adjacent to the first surface of the porous support, the first surface of the membrane assembly being the first surface of the selective transfer membrane and the second surface of the membrane assembly being the second surface of the porous support.

20. The system of claim 13, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane, wherein the ionomeric polymer domains of the selective transfer membrane form contiguous conduits suitable to provide for travel of high-dipole liquids or gases from one face of the membrane to the other face, and wherein the ionomeric polymer has a base resin and the base resin before ionomerization of the ionomeric polymer is selected from the group consisting of: polyethylene (PE), polypropylene (PP), polyethylene oxide (PEO), polystyrene (PS), polyesters, polycarbonate (PC), polyvinyl chloride (PVC), nylon, halogenated polymers or copolymers, poly(methyl methacrylate) (PMMA), acrylonitrile butadiene styrene (ABS), polyamide (PA), polytetrafluoroethylene (PTFE), polylactic acid (PLA), polyvinylidene chloride (PVDC), styrene-butadiene rubber (SBR), styrene-ethylene/butylenes-styrene (SEBS); styrene-ethylene/propylene-styrene (SEPS), ethylene-styrene interpolymer (ESI), styrene acrylate, polyetherether ketone (PEEK), polyethylene terephthalate (PET or PETE), polybenzimidazole (PBI), phosphoric acid based membranes, sulfonated tetrafluorethylene copolymer, and any combination thereof.

21. The system of claim 13, wherein the membrane of the membrane assembly comprises a selective transfer membrane having a first surface and a second surface, the first surface of the mass exchanger being the first surface of the selective transfer membrane and the second surface of the mass exchanger being the second surface of the selective transfer membrane, and wherein the selective transfer membrane comprises a barrier layer comprising a polymer or polymer composite that is permeable to high dipole moment material.

22. The system of claim 13, wherein the membrane assembly comprising a selective transfer membrane having a first surface and a second surface and further comprising a porous, hydrophilic support having a first surface and a second surface, the second surface of the selective transfer membrane being positioned adjacent to the first surface of the porous support, the first surface of the membrane assembly being the first surface of the selective transfer membrane and the second surface of the membrane assembly being the second surface of the porous support.

* * * * *

UNITED STATES PATENT AND TRADEMARK OFFICE
CERTIFICATE OF CORRECTION

PATENT NO.       : 8,500,960 B2                              Page 1 of 1
APPLICATION NO. : 12/523470
DATED            : August 6, 2013
INVENTOR(S)      : Ehrenberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this

Fifteenth Day of September, 2015

Michelle K. Lee
*Director of the United States Patent and Trademark Office*